Dec. 2, 1958 F. KALWAITES 2,862,251
METHOD OF AND APPARATUS FOR PRODUCING NONWOVEN PRODUCT
Filed Feb. 23, 1956 25 Sheets-Sheet 1

INVENTOR:
FRANK KALWAITES
BY
Schneider & Dressler
ATTORNEYS.

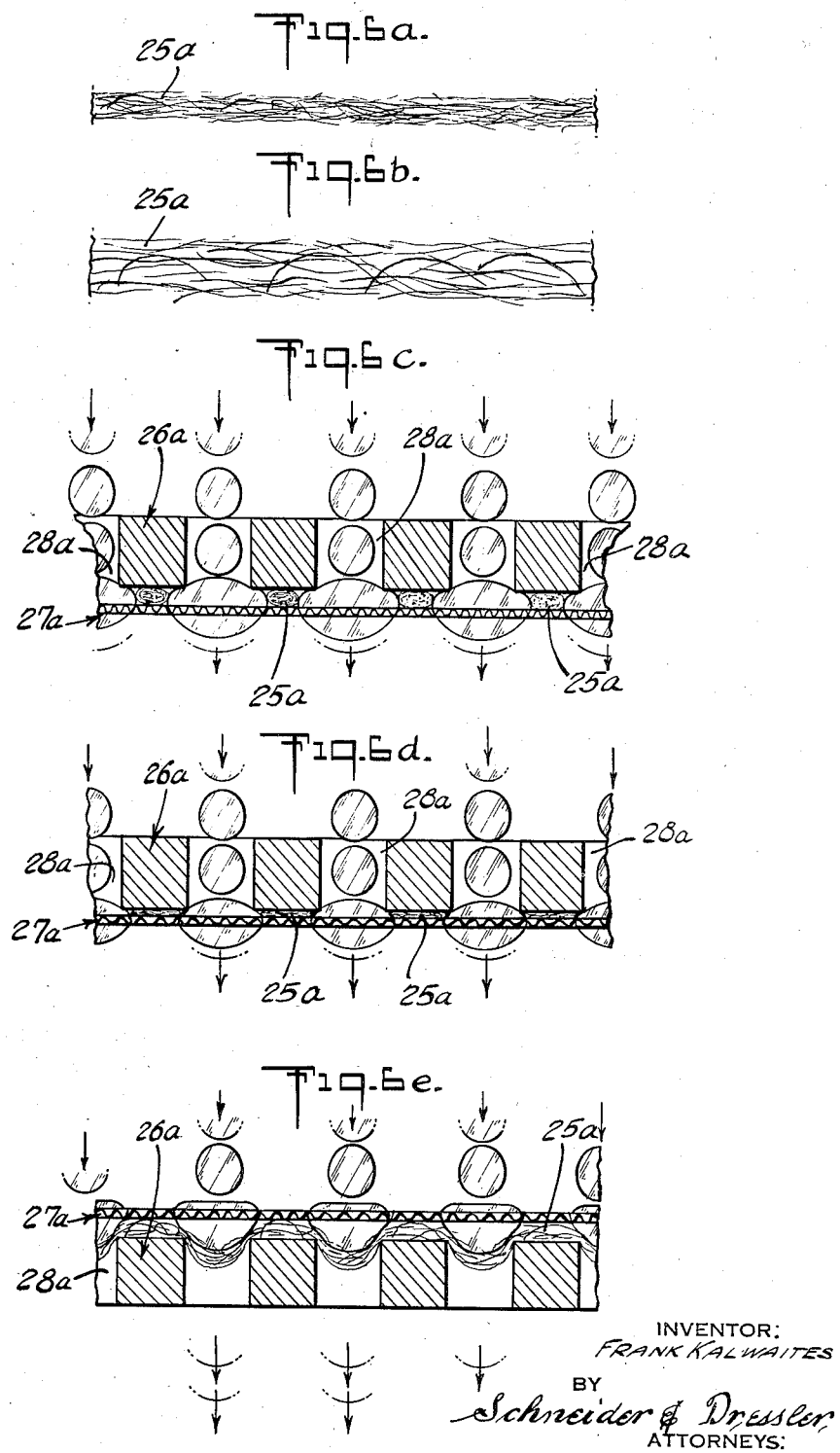

Dec. 2, 1958     F. KALWAITES     2,862,251
METHOD OF AND APPARATUS FOR PRODUCING NONWOVEN PRODUCT
Filed Feb. 23, 1956     25 Sheets-Sheet 3

INVENTOR:
FRANK KALWAITES
BY
Schneider & Dressler
ATTORNEYS:

Dec. 2, 1958 F. KALWAITES 2,862,251
METHOD OF AND APPARATUS FOR PRODUCING NONWOVEN PRODUCT
Filed Feb. 23, 1956 25 Sheets-Sheet 4
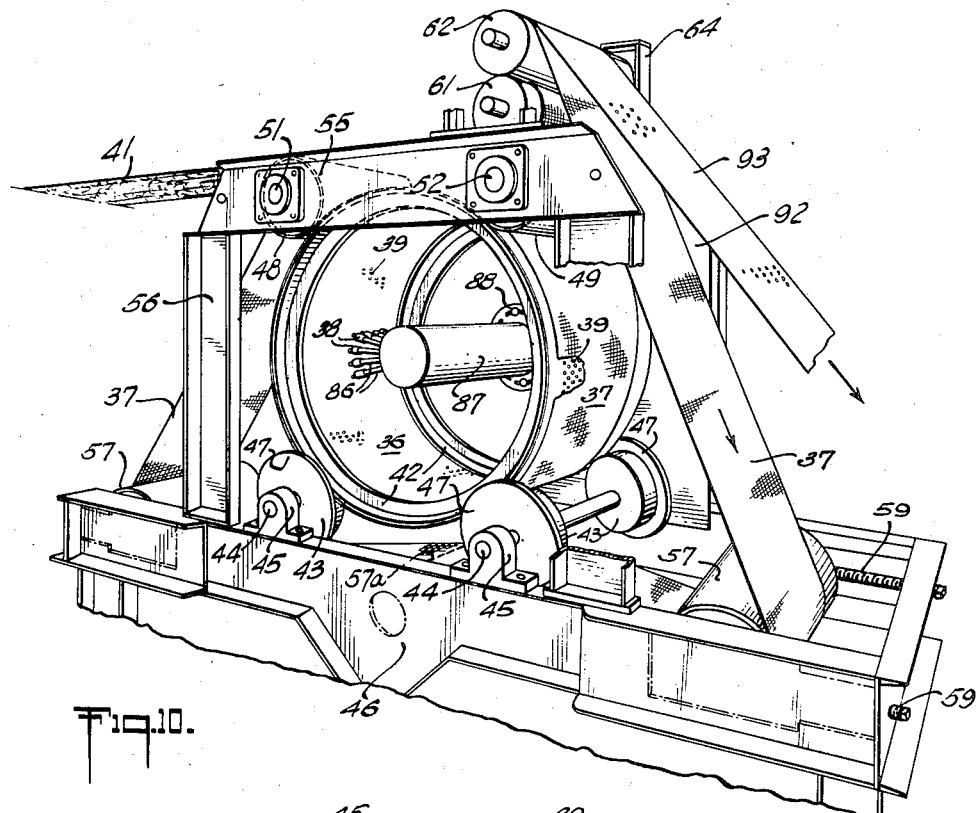
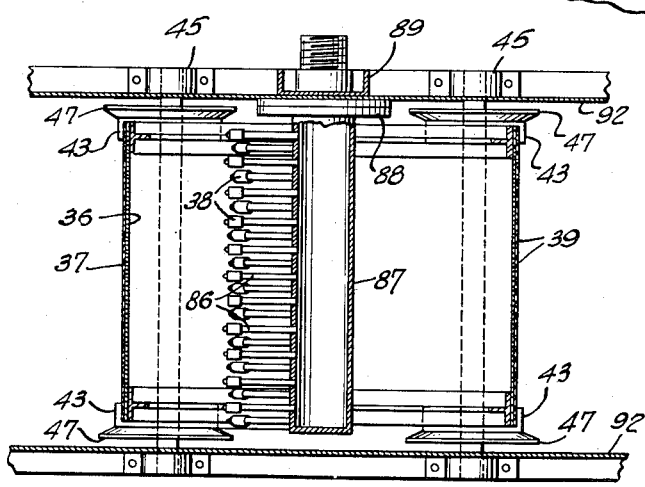
INVENTOR
FRANK KALWAITES
BY
Schneider & Dressler
ATTORNEYS

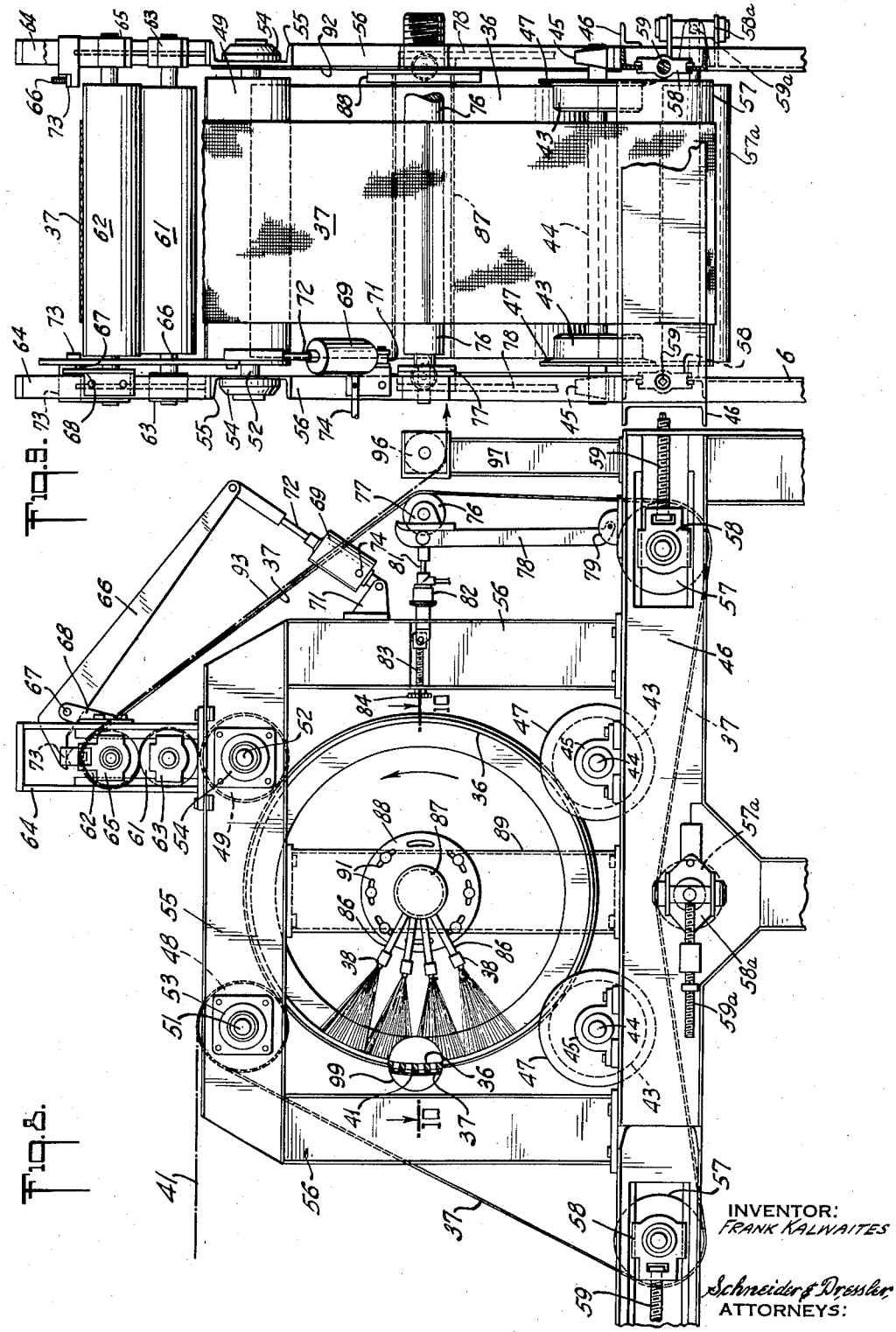

Dec. 2, 1958 F. KALWAITES 2,862,251
METHOD OF AND APPARATUS FOR PRODUCING NONWOVEN PRODUCT
Filed Feb. 23, 1956 25 Sheets-Sheet 6
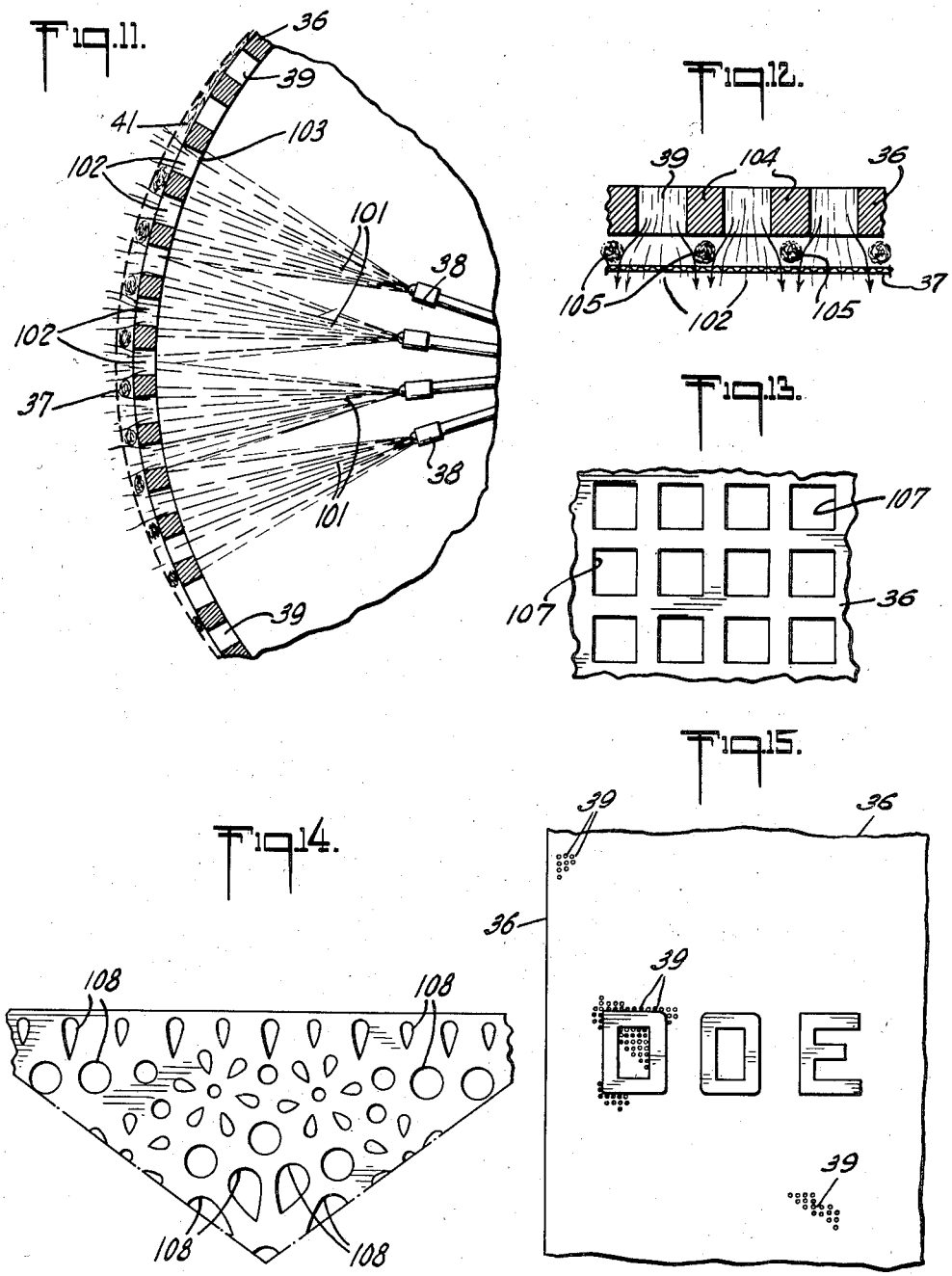
INVENTOR:
FRANK KALWAITES
BY
Schneider & Dressler
ATTORNEYS Dec. 2, 1958　　　F. KALWAITES　　　2,862,251
METHOD OF AND APPARATUS FOR PRODUCING NONWOVEN PRODUCT
Filed Feb. 23, 1956　　　25 Sheets-Sheet 7
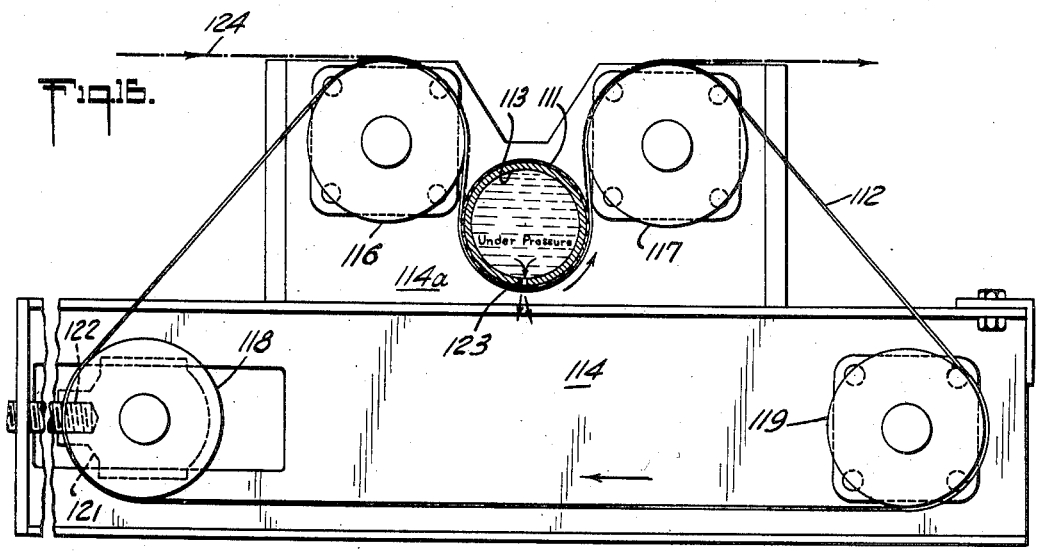
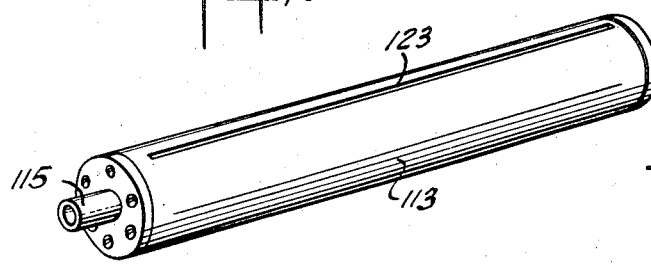
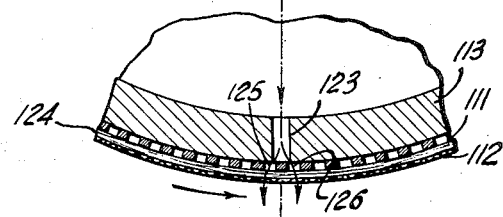
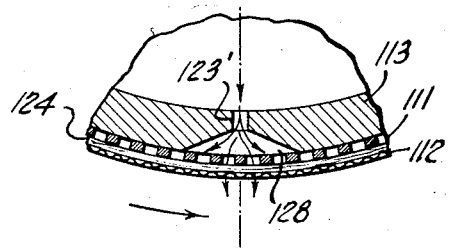
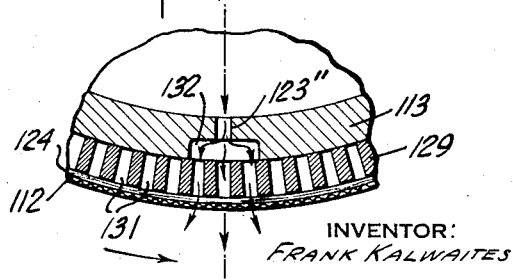
INVENTOR:
FRANK KALWAITES
BY
Schneider & Dressler
ATTORNEYS.

Dec. 2, 1958 F. KALWAITES 2,862,251
METHOD OF AND APPARATUS FOR PRODUCING NONWOVEN PRODUCT
Filed Feb. 23, 1956 25 Sheets-Sheet 8

INVENTOR:
FRANK KALWAITES
BY
Schneider & Dressler
ATTORNEYS.

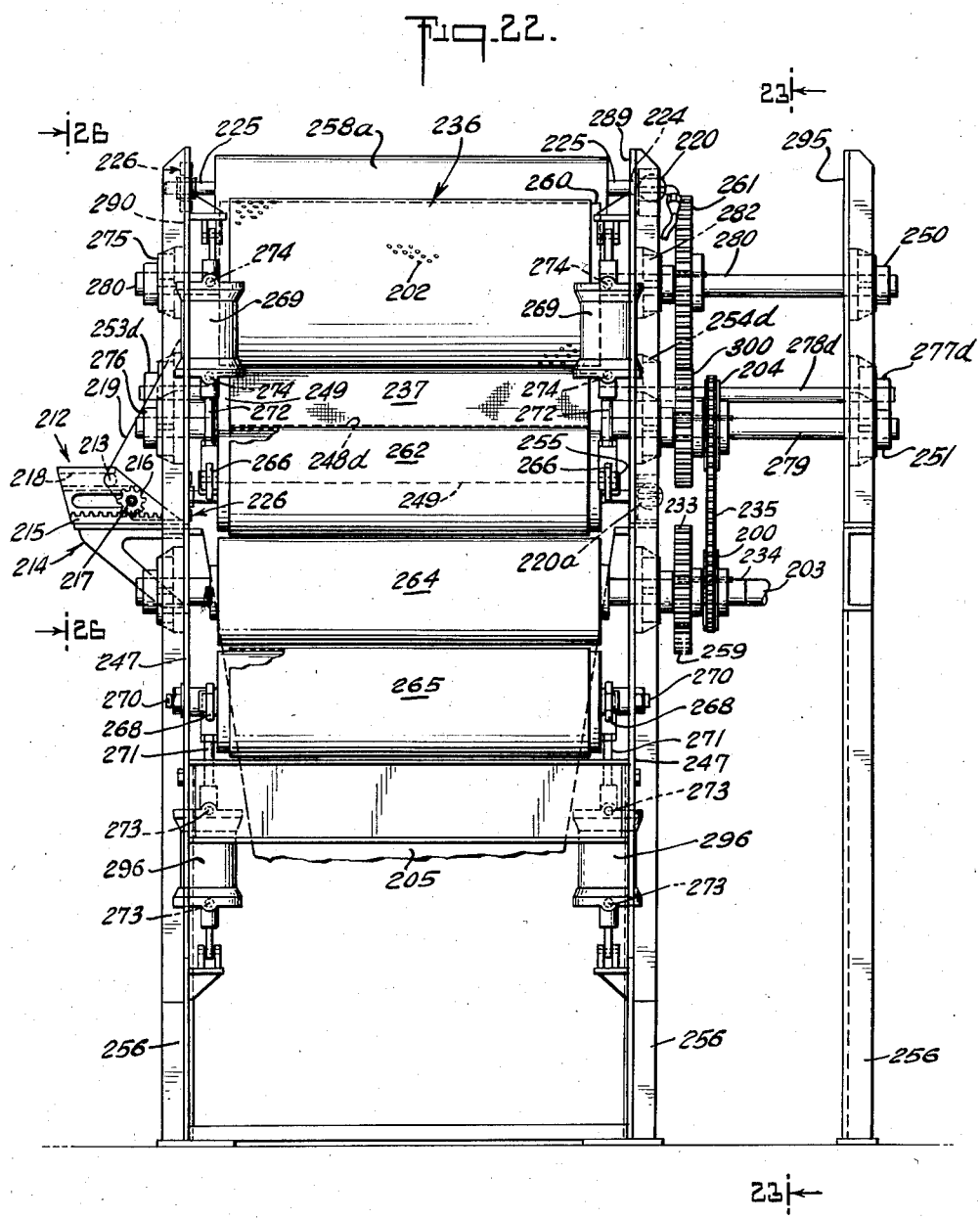

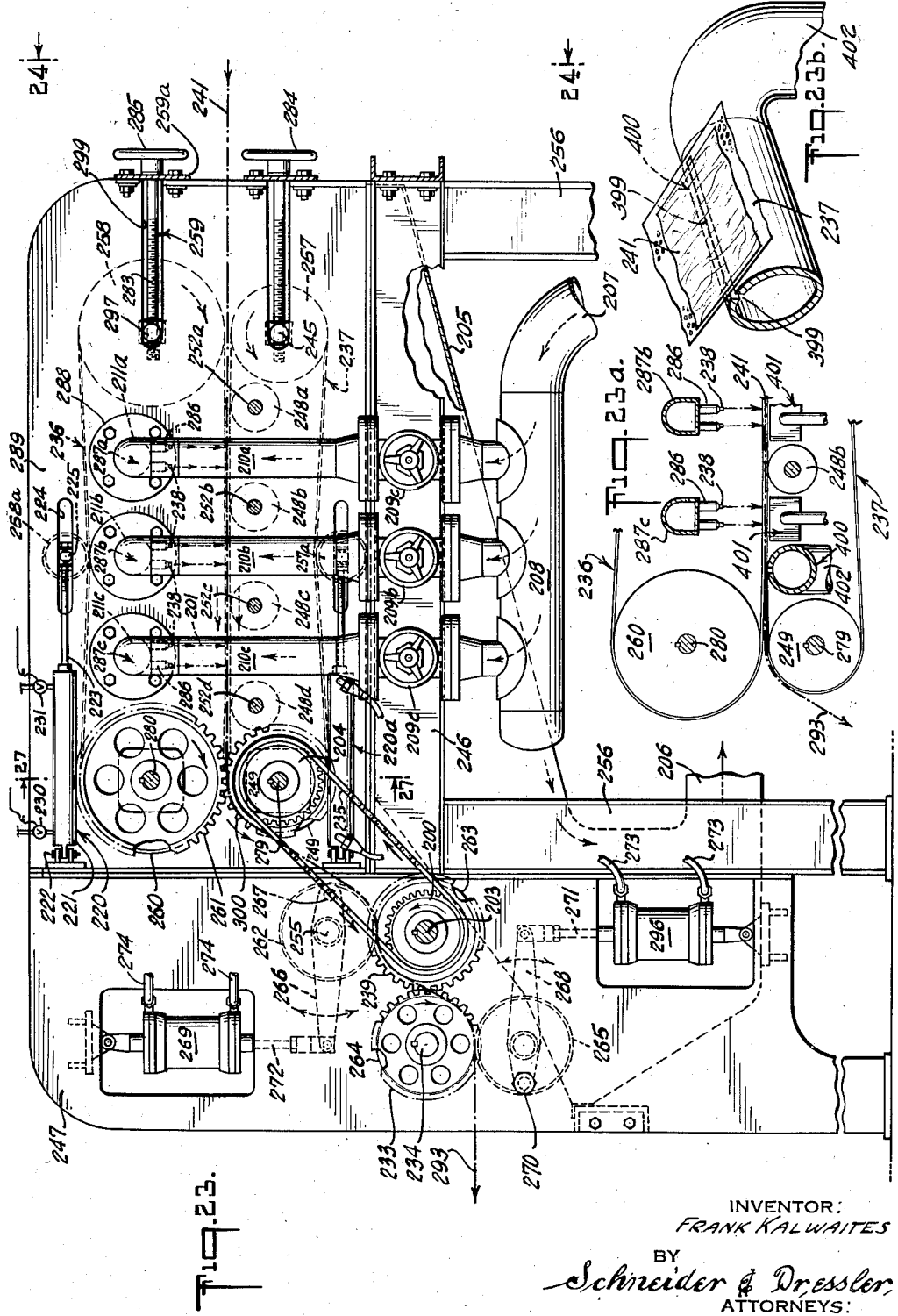

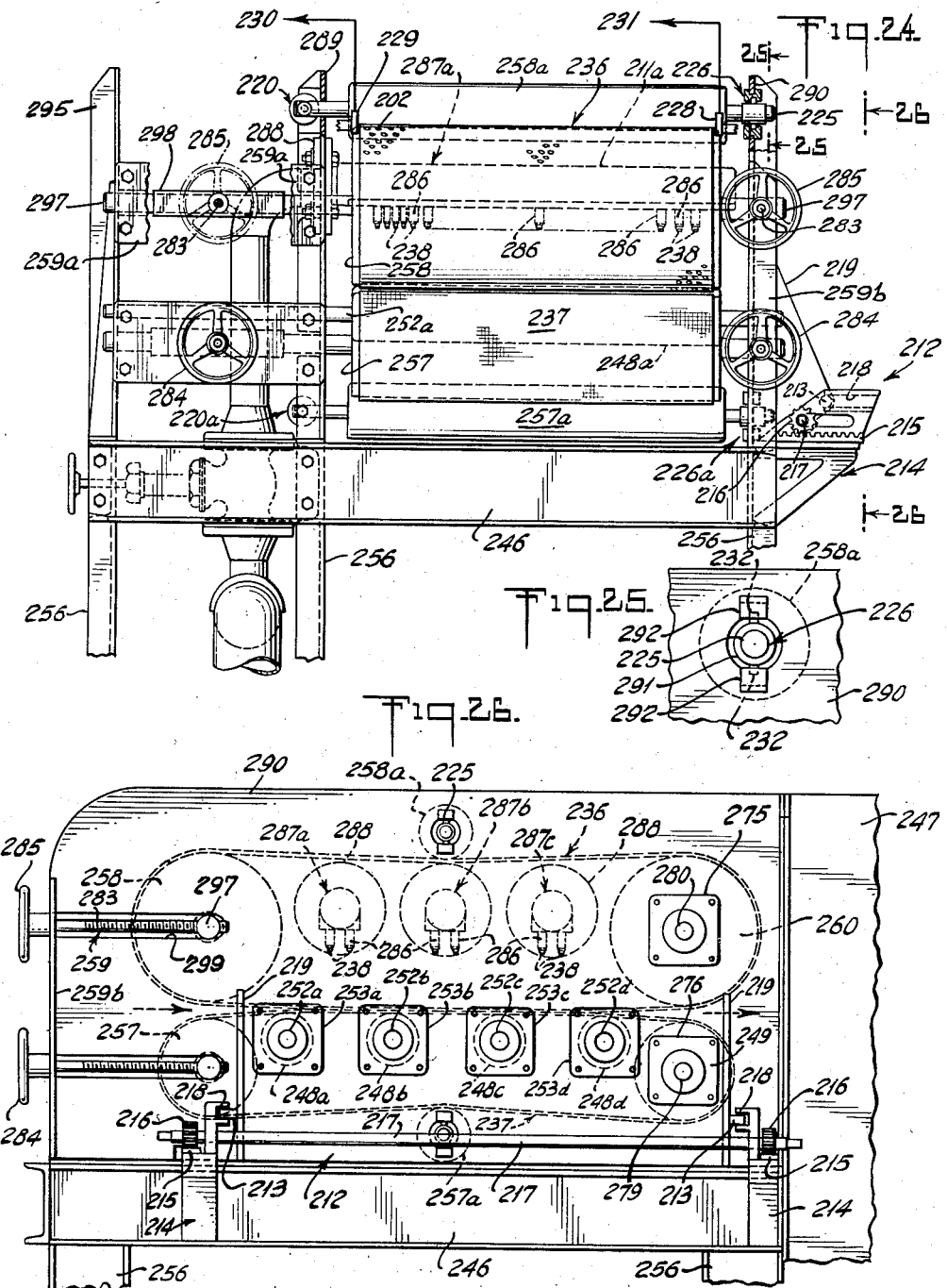

Dec. 2, 1958   F. KALWAITES   2,862,251
METHOD OF AND APPARATUS FOR PRODUCING NONWOVEN PRODUCT
Filed Feb. 23, 1956   25 Sheets-Sheet 12
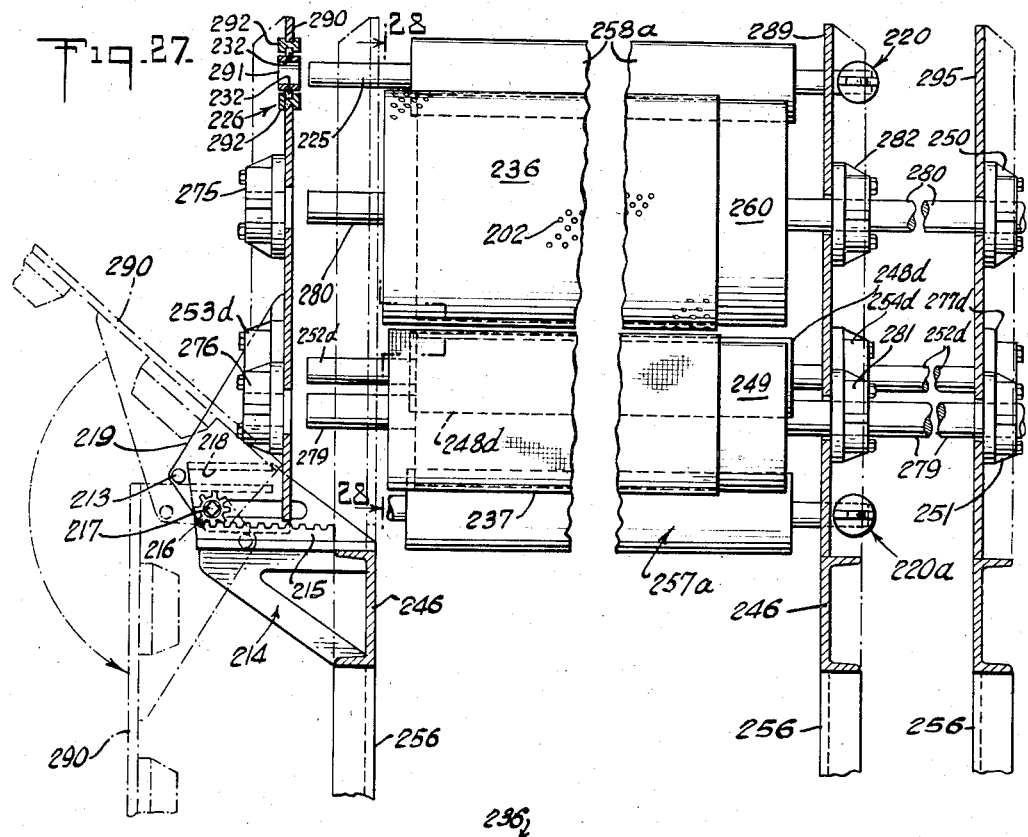
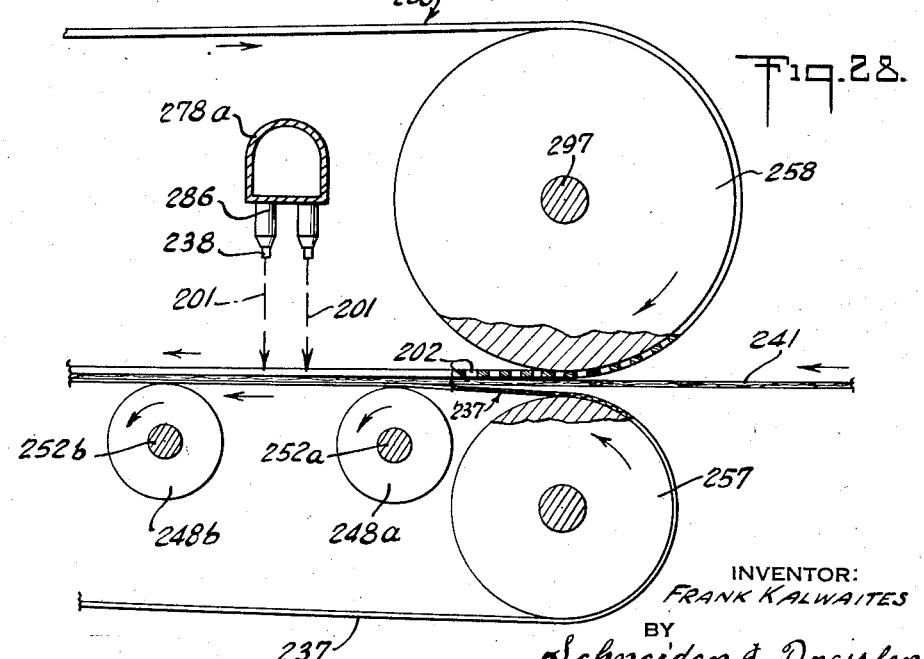
INVENTOR:
FRANK KALWAITES
BY
Schneider & Dressler,
ATTORNEYS:

Dec. 2, 1958 F. KALWAITES 2,862,251
METHOD OF AND APPARATUS FOR PRODUCING NONWOVEN PRODUCT
Filed Feb. 23, 1956 25 Sheets-Sheet 13
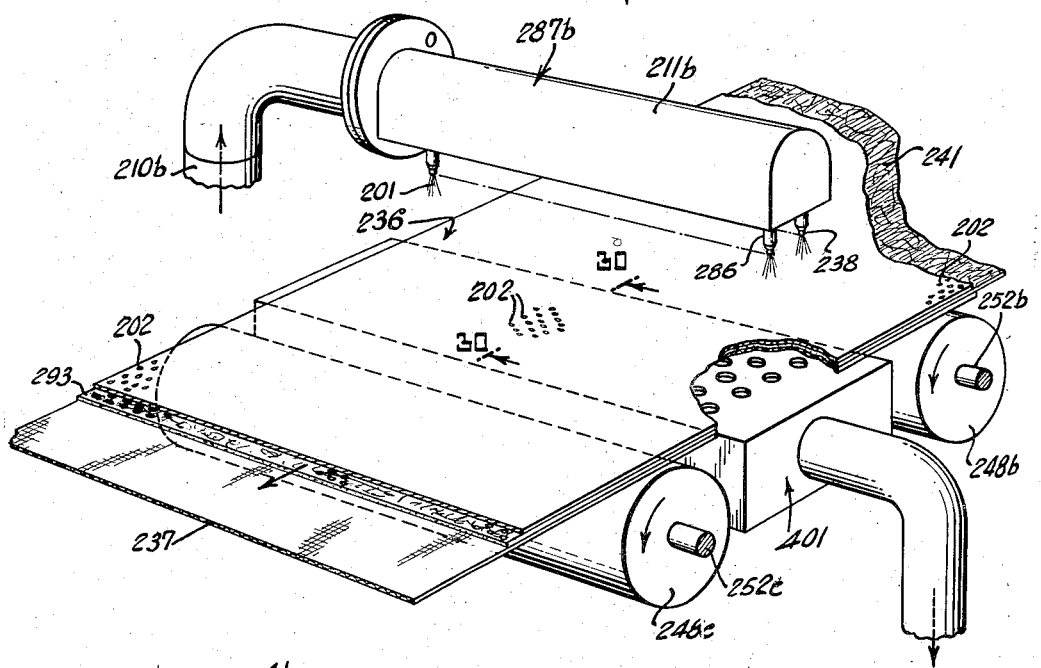
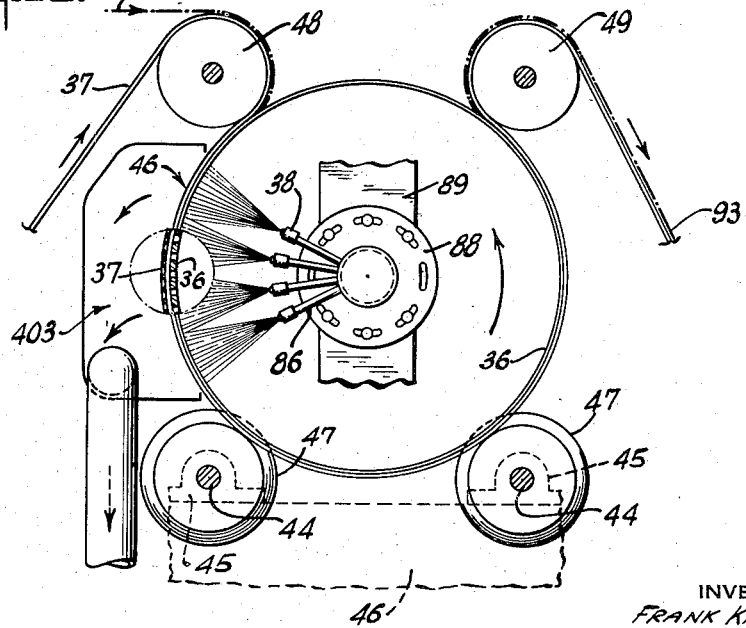
INVENTOR.
FRANK KALWAITES
BY
Schneider & Dressler,
ATTORNEYS.

Dec. 2, 1958   F. KALWAITES   2,862,251
METHOD OF AND APPARATUS FOR PRODUCING NONWOVEN PRODUCT
Filed Feb. 23, 1956   25 Sheets-Sheet 14
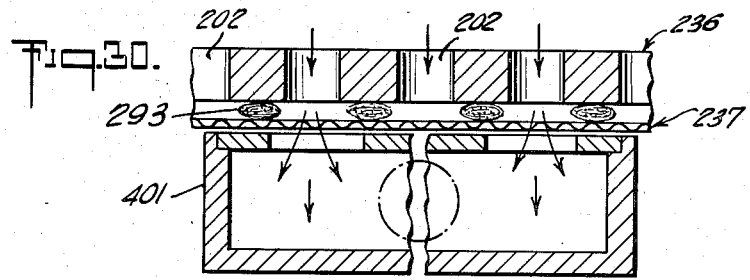
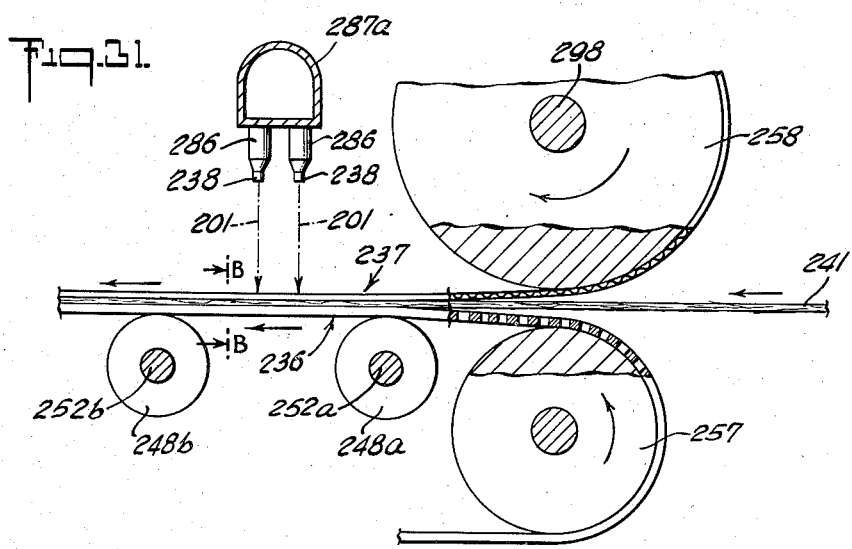
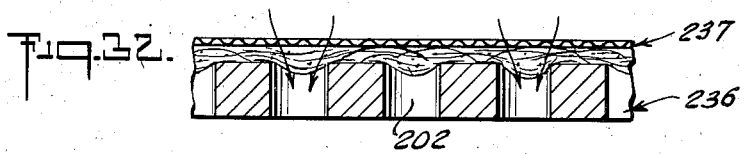
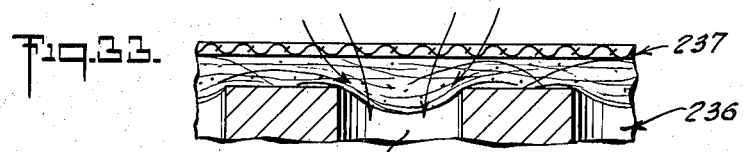
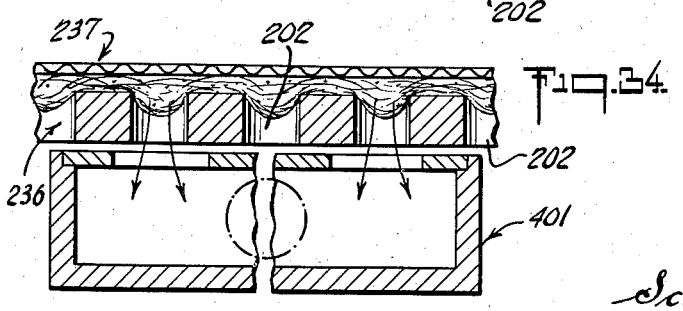
INVENTOR:
FRANK KALWAITES
BY
Schneider & Dressler,
ATTORNEYS:

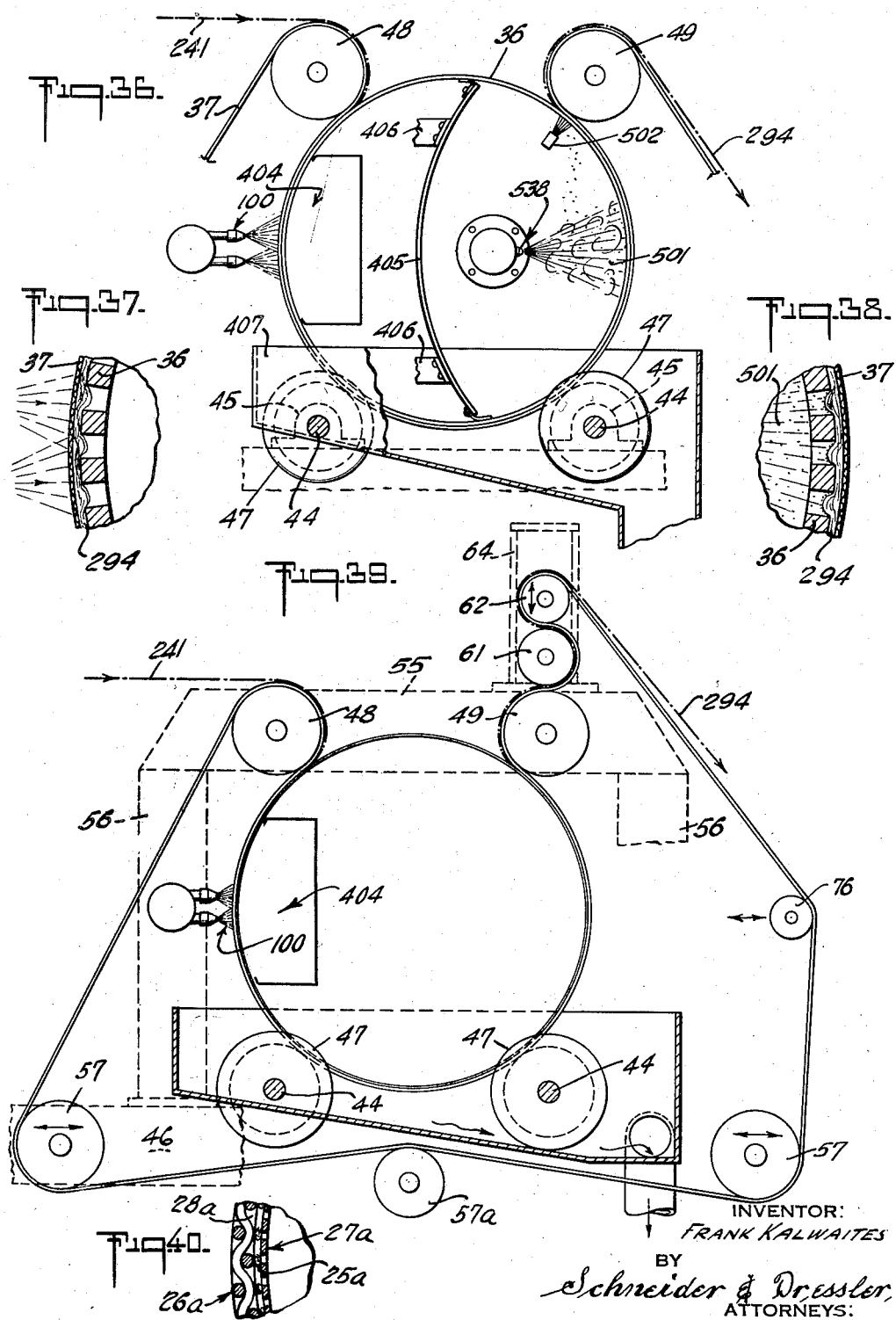

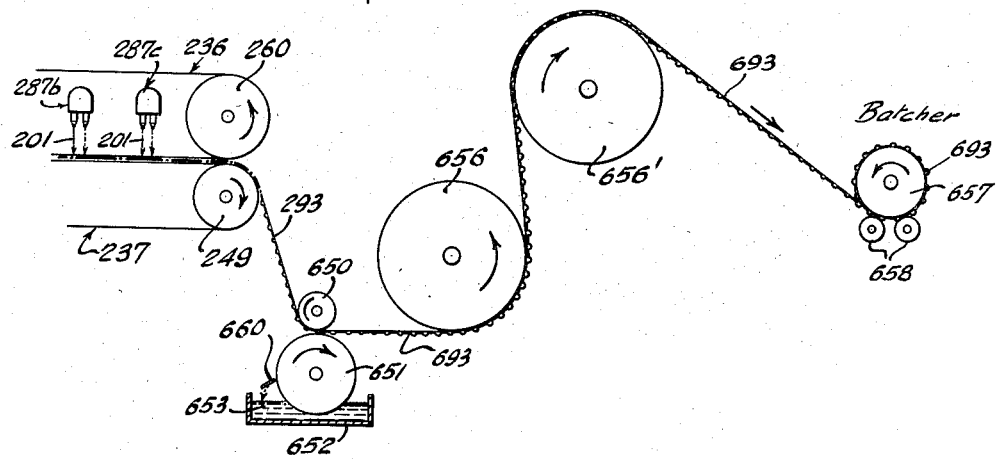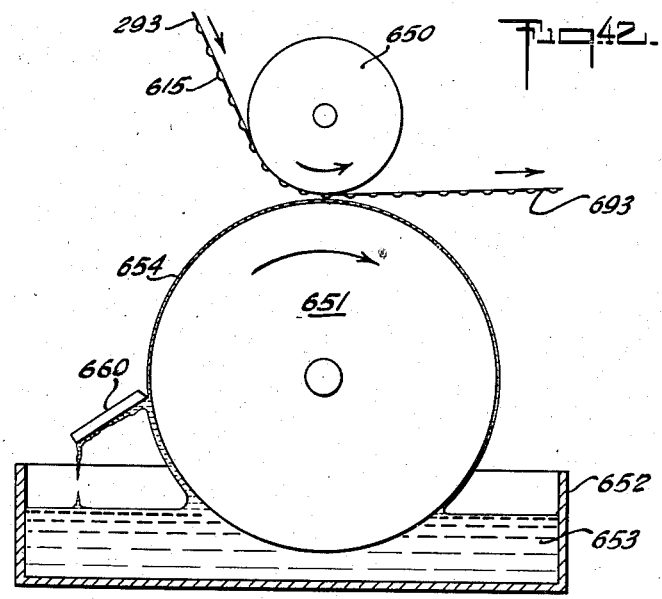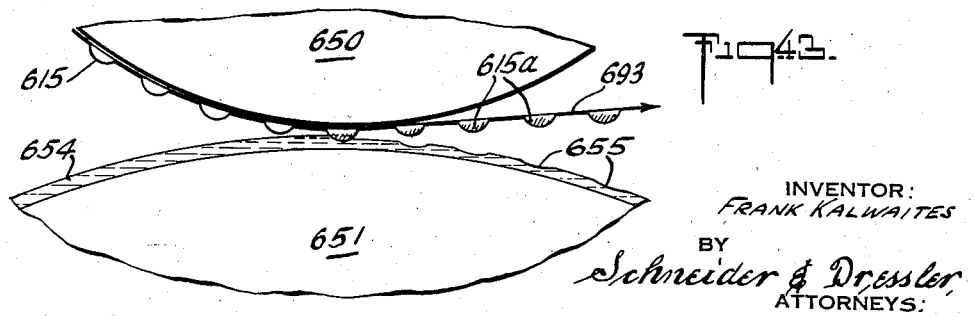

Dec. 2, 1958 F. KALWAITES 2,862,251
METHOD OF AND APPARATUS FOR PRODUCING NONWOVEN PRODUCT
Filed Feb. 23, 1956 25 Sheets-Sheet 18
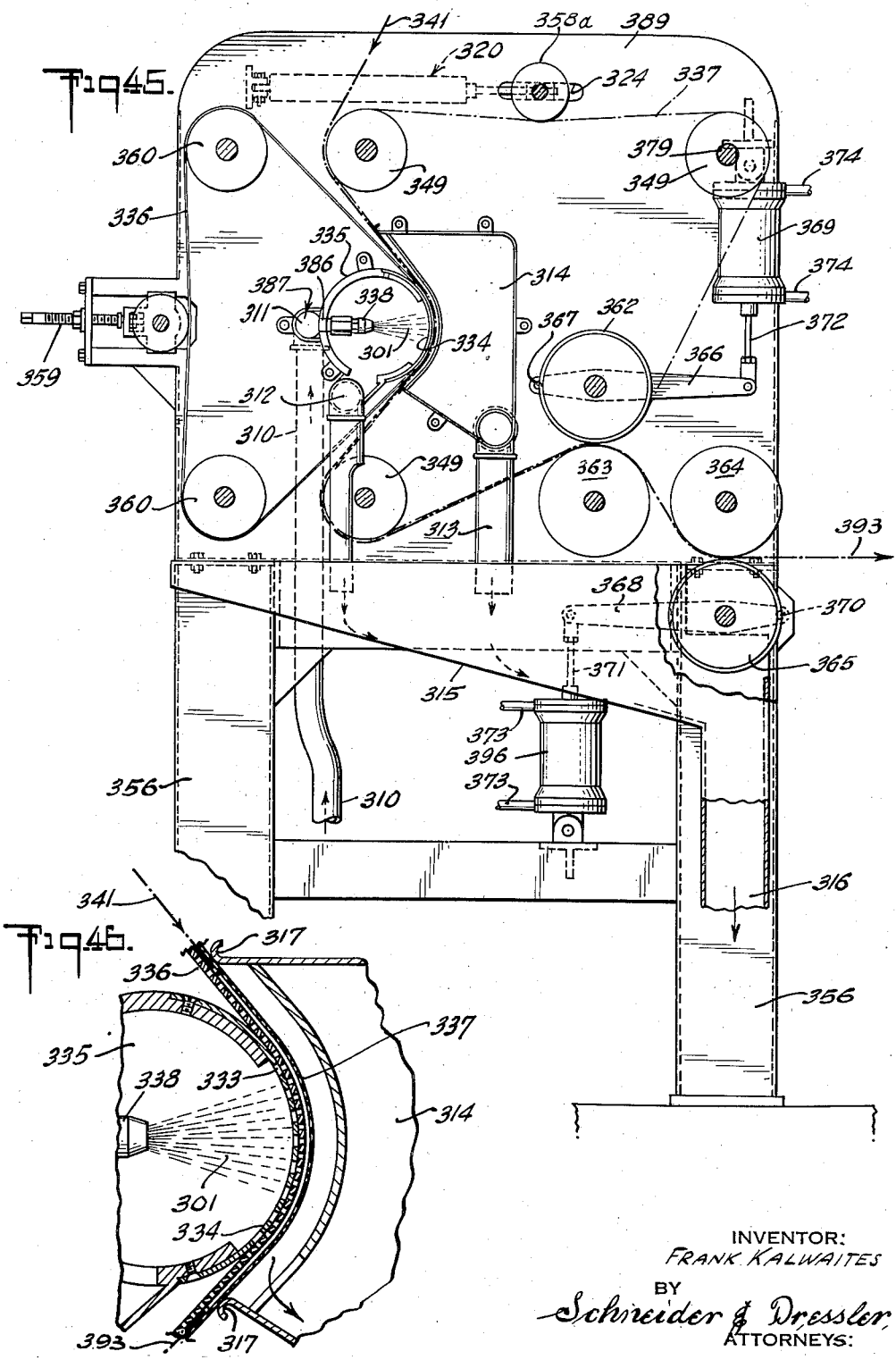
INVENTOR:
FRANK KALWAITES
BY
Schneider & Dressler
ATTORNEYS Dec. 2, 1958  F. KALWAITES  2,862,251
METHOD OF AND APPARATUS FOR PRODUCING NONWOVEN PRODUCT
Filed Feb. 23, 1956  25 Sheets-Sheet 20

INVENTOR
FRANK KALWAITES
BY
Schneider & Dressler,
ATTORNEYS

Dec. 2, 1958 F. KALWAITES 2,862,251
METHOD OF AND APPARATUS FOR PRODUCING NONWOVEN PRODUCT
Filed Feb. 23, 1956 25 Sheets-Sheet 21

INVENTOR:
FRANK KALWAITES
BY
Schneider & Dressler
ATTORNEYS

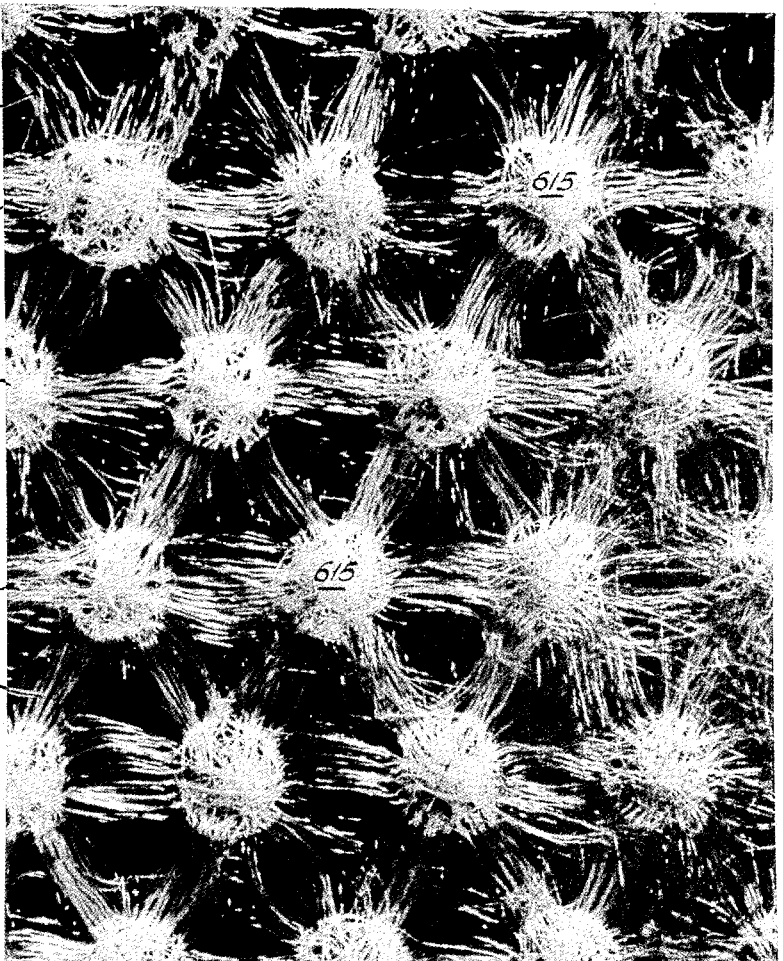

2,862,251

METHOD OF AND APPARATUS FOR PRODUCING NONWOVEN PRODUCT

Frank Kalwaites, Longmeadow, Mass., assignor to Chicopee Manufacturing Corporation, a corporation of Massachusetts Application February 23, 1956, Serial No. 567,275

77 Claims. (Cl. 19—161)

The present invention relates to new methods and apparatus for producing foraminous fabrics, more particularly to methods and apparatus for producing such fabrics from a layer of fibrous material such as a fibrous web wherein the individual fiber elements are capable of movement under the influence of an applied fluid force, and to the resulting novel products.

This application is a continuation-in-part of my copending application, Serial No. 500,735, filed April 12, 1955, now abandoned.

According to the invention the application of fluid forces rearranges a layer of fibrous material, such as a web of fibers, for example, rayon, cotton, etc., into a foraminous unitary nonwoven fabric structure comprising spaced interconnected packed fibrous portions of the starting material, and openings arranged in a predetermined pattern which are separated by said interconnected packed portions.

A layer of starting material having individual fibrous elements which are capable of movement under the influence of an applied fluid force is positioned in a rearranging region, located in one embodiment of this invention between rigid means defining spaced apertures arranged in a pattern and tensioned flexible means defining foramina smaller than said apertures, wherein the individual fibrous elements are free to move under the influence of the applied fluid forces. The starting fibrous layer is confined in the region between said apertured and foraminous means, but the individual fibrous elements of the starting fibrous material are in a condition in which they are free to move laterally under the influence of an applied fluid force, preferably an intermittently applied force.

The layer of starting material in the form of a web of fibers is then subjected to streams of a fluid, preferably a stream of water particles, as from a jet, applied over an area of said web. The apertured means and foramina defining means provide in the plane of the web spaced regions of differential permeability to the flow of said fluid through said web. The said means are spaced somewhat one from the other during the application of the fluid force and thereby individual fibrous elements of the web are free to move under the influence of the applied fluid forces.

The fluid passes through the apertures and through the openings of the foraminated means to displace the individual fibrous elements in the rearranging region, whereby the fibrous elements of the web are packed into groups of elements which interconnect with each other in a pattern determined by the pattern of differential permeability.

When the action of the fluid on the apertured and foraminous means is intermittent, the confining region between said means may vary in spacing to facilitate movement of the fibers.

With a liquid, preferably water, as the fluid, the fibers within the fibrous layer are lubricated. In the case of water absorbent fibers such as rayon, cotton, etc., the water tends to plasticize the same and make them more workable. Thus, from either or both of these factors, the fiber to fiber friction is reduced, the fiber to apertured and foraminous means friction is reduced, and the fibers are permitted to move even more readily into the desired position. Water also has a compacting action on rearranged bundles of fibers during drying.

The amount of water is preferably such that the fibers can be more or less readily moved by the forces applied in and through the liquid in the rearranging region to overcome the frictional or cohesive tendency of the fibers to adhere to each other and to the means defining the rearranging region, and thereby place the fibers in the desired position and in a relaxed condition, to produce the nonwoven fabric. In this rearranging region, the fluid forces are applied through said spaced apertures and against the starting material so as to move and rearrange the individual fibrous elements into a pattern determined by the pattern of said apertured means.

During the application of the fluid force through the spaced apertures, the starting layer, and the foramina defining means, the individual fibrous elements move in a direction generally parallel to the surface of the foramina defining means, while said means serves to retain the starting material against destruction from said force. The fluid force causes this lateral movement by applying to the individual fibrous elements of the starting material a component of force in a direction generally parallel to the surface of the foramina defining means.

In this way, groups of fibers are packed together and are interconnected into a unitary fabric having a pattern corresponding to the pattern of said apertures.

A solid stream of a fluid, water for example, may be used to rearrange the fiber elements in the layer, but an intermittently applied stream, such as a stream of discrete particles, is more effective in causing the desired rearrangement. As a result of the projection of particles of the fluid stream, preferably a rapid succession of water droplets, there is an intermittent bombardment of the fibers in the region wherein they undergo rearranging movement. This provides a more distinct and a better defined reorientation of the fibers in packed bundles than would be the case where the solid stream of water was used.

Both the apertured rearranging means and the foraminos means may be flexible, so that by suitably tensioning both of these means under impingement by strong fluid jets, such as water, the applied intermittent forces from the bombardment of these flexible means by the fluid particles permits the foraminous means to "belly out" under the influence of these applied forces, in providing the rearranging region wherein the individual fibrous elements of the starting material are enabled to be moved or rearranged into the desired pattern. After the confining foraminous means and the apertured means leave the zone of fluid bombardment their original spacing is more or less restored, thereby precluding the further displacement of the fibers from the desired pattern regions.

Care is taken that the amount of water and the depth of the rearranging region each be less than would tend to flood the region and thereby displace the rearranged fibers from the desired pattern regions which they are to occupy or have already occupied. In general "flooding" results in a loss of web identity. By flooding is meant a condition wherein the forces exerted by the motion of the water upon the fibers in their rearranged state exceed the forces upon these fibers arising from fiber-to-fiber friction; fiber-to-apertured means friction and fiber-to-foraminous means friction; and other restraining forces that may be present. Accordingly, the spacing defining the rearranging region and the amount of water employed are such as to provide a rearranged unitary nonwoven fabric. The optimum spacing and quantity of water employed—depending upon the physical characteristics of the particular fiber used (such as fiber weight, denier, fiber length, frictional characteristics, etc.), the size and spacing of the apertures and foramina, the speed at which fiber rearrangement is to take place, etc.—lie below the flooding condition causing loss of web identity and above the minimum condition, depending upon the same factors, for a desirable rate of fiber rearrangement. These conditions are set out in additional detail in a later part of the description.

In general, it is preferred that the dimension of the openings in the foraminous backing means be substantially less than the dimension of the apertures in the apertured rearranging means. For example, with an apertured means having uniform apertures in the order of about $\frac{1}{32}$ of an inch in diameter, good results may be obtained where openings in the foraminous backing means (screen) vary from about 900 openings per square inch to about 50,000 openings per square inch or more, preferably from about 10,000 openings to 40,000 openings per square inch. The smoothness or evenness of the backing means or screen affects the production of the rearranged fabric or other desired material in accordance with the invention. When woven screening is employed, the evenness or smoothness of the screen is in part a function of its mesh. Thus, a finer screen will tend to be more even and thereby more readily allow the motion of fibers along its surface. A coarse screen may trap fibers and cause them to stick in the screen in the way of the apertures in the apertured means.

The foraminous backing means may be made of any suitable material. A screen belt in woven form gives excellent results. However, a woven belt is not essential since the belt may have the openings punched or etched in the material. The belt, in screen form, may be made of stainless steel, bronze, copper, alloy, nylon, synthetic resinous fibrous materials such as fibers sold by the E. I. du Pont Co., under the trademark "Orlon," or the like. It can be in the form of a flexible punched plate of steel, plastic or other material which is sufficiently foraminous to allow passage of the fluid but sufficiently impervious and smooth to permit the action of the fluid to effect the desired rearrangement of the fibers over its surface without washing them away.

The fluid forces may be applied from either side of a sandwich unit comprising the apertured means, the foraminous means and the starting layer of fibrous elements positioned between them. A water stream directed from above the apertured means into the fibers underlying said means, as in the embodiment so far described, moves the individual fibrous elements in a direction parallel to the surface of the foraminous means, which is farthest from the source of the fluid force, so that the group of fibers, rearranged, pack together and interconnect into a unitary pattern of fabric on the foraminous means in the regions behind the land areas of the apertured means.

In another embodiment of the method of this invention, fluid streams are directed from above the foraminous means into the underlying web and then through apertured means underlying the web, the foramina in the foraminous means being smaller than the apertures in the apertured means. In this embodiment the forces move the fibers in a direction generally parallel to the apertured means and into the apertures so that there is produced a packing of buds or tufts in the apertures, which are outside of the plane of the layer of starting material and which are interconnected by bands of fibers on the lands between the apertures. Thus, three-dimensional fabrics of a great variety of patterned arrangements may be provided in which packed, tufted, budded, or otherwise consolidated fibers out of the plane of the interconnected groups of fibers are joined by said interconnecting fibers in bands to provide highly desirable properties in the finished fabric.

In general, the starting layer may comprise any material the individual fibrous elements of which are capable of movement under the influence of an applied fluid force. Although fibrous materials are preferred, non-fibrous particulate materials and plastic masses such as resin particles and similar suitable materials may be employed, so long as they are of appropriate dimensions and made up of discrete separable particles capable of undergoing movement under the influence of applied fluid forces to produce the unitary nonwoven fabric. Accordingly, it is seen that the term "nonwoven fabric" refers to a resulting fabric which is produced directly from the fibers or resin particles or similar elements without the use of conventional spinning, weaving, felting, or knitting operations.

The finished fabric is the result of the rearrangement of the individual fibers subjected to components of fluid forces in a direction generally parallel to the surface of the apertured rearranging member. In the embodiment first described above, these components of fluid forces are in equilibrium in the fiber packing areas adjacent said apertured member. The groups of fibers in such areas are packed together in a predetermined pattern throughout the resulting web in a relaxed condition. The rearrangement of the individual fibers into groups and the packing of these groups into the pattern determined by the apertured rearranging member takes place as a result of the balance of the components of force acting at each opening in the apertured rearranging member. If the number of apertures per unit of area is maintained constant, then the use of fiber of relatively shorter length has been found to permit a more rapid rate of rearranging of the fibers into a general condition of relaxation.

In the second embodiment referred to above in which fluid forces are applied to the fibrous starting layer from the side on which the foramina defining means is located, the individual fibers again lie in their rearranged positions in the resulting fabric in a relaxed condition. In this embodiment there is no substantial tendency for any fiber to return to its original position in the fibrous starting layer because each fiber has been individually moved by fluid forces into a position where strong currents flowing into the passages through the apertured member cause the fiber to be bridged across the intervening land areas between adjacent tufts or buds.

The density increase of the fibers packed in the interconnecting portions enhances the strength of the web.

The packing of fibers by fluid forces may be efficiently applied to very thin webs or quite thick webs in accordance with the invention.

For producing a fabric having the characteristic hand and drape of a textile fabric, the layer of starting material or base web may comprise natural fibers, such as cotton, flax, wood, silk, wool, jute, asbestos, ramie, "rag," or abaca; mineral fibers such as glass; artificial fibers such as viscose rayon, cupra-ammonium rayon, ethyl cellulose or cellulose acetate; synthetic fibers such as polyamides, i. e., nylon, polyesters, i. e., "Dacron," acrylics, i. e., "Orlon," "Acrilan" and "Dynel," polyethylene, vinylidene chloride, i. e., Saran, polyvinyl chloride, polyurethane, etc., alone or in combination with one another. Viscose rayon has been found to give excellent results in producing the fabric of this invention. While relatively long textile-type fibers above normal papermaking lengths and close to normal textile length, say of about ¼ inch to 2 inches or longer, are preferred for textile applications, shorter fibers, below ¼ inch in length and within the papermaking range, may be used for these and other applications. It is preferred, however, that the shorter papermaking fibers be unbeaten or substantially unhydrated if a textile-like fabric is desired as the end product. In this connection, shorter hydrated fibers of woodpulp in a papermaking length, for instance, may be mixed with longer fibers in such a way that the longer fibers will contribute the strength desired in the resulting fabric while the shorter wood fibers will decrease its cost. Good results can also be obtained with a layer of hydrated woodpulp fibers which would introduce elements of a plastic mass into the fibrous sheet. Mixtures of fibrous materials, natural and/or synthetic, alone or in combination with resinous and similar plastic particulate materials, arranged in the layer at random (helter-skelter) or in more or less oriented form, such as carded web form, can be rearranged in accordance with the present invention.

Satisfactory rearranged webs may be produced according to this invention from fibrous starting webs weighing between about 80 grains/sq. yd., or slightly lower, and about 1200 grains/sq. yd., or even higher.

For commercial use, the preferred apparatus embodiments of the invention are constructed to provide continuous, efficient, relatively high-speed, fiber rearrangement by the application of fluid forces to the layer of fibrous starting material positioned or "sandwiched" in a region between the means presenting spaced apertures defining a pattern and the foraminated backing means having foramina smaller than said apertures.

Advantages of the invention other than those generally described above will be apparent from the following description and claims taken together with the drawings, wherein:

Fig. 6(a) is a schematic edge view of the fibrous web showing a relative thickness when wet.

Fig. 6(b) is a schematic edge view of the web as in Fig. 6(a) showing a relative thickness when dry.

Fig. 6(c) is a schematic section view of the apertured rearranging plate, backing screen, and web showing the action of particles of liquid in a loose spacing.

Fig. 6(d) is a schematic view as in 6(c) but with a tighter spacing.

Fig. 6(e) is a schematic view as in 6(c) but with the plate and screen reversed to produce three-dimensional fabrics.

Fig. 7 is a view in perspective of preferred apparatus for producing fabric according to the invention, portions being omitted for the sake of clarity.

Fig. 8 is a side elevation of the apparatus of Fig. 7 with splash plates 92 (Figs. 7 and 10) removed.

Fig. 9 is an end view of the apparatus of Fig. 8 with a portion of the apparatus on the right hand side of the figure broken away to show details of construction.

Fig. 10 is a view in section along the line 10—10 of Fig. 8.

Fig. 11 is an enlarged radial fragment showing a portion of the apparatus of Fig. 7 during the rearranging operation.

Fig. 12 is a still further enlarged developed view of a portion of the apparatus of Fig. 11 during the rearranging operation.

Fig. 13 illustrates a portion of an apertured rearranging member (drum) comprising a pattern of square holes.

Fig. 14 illustrates a portion of an apertured rearranging member (drum) comprising holes arranged in a lace-like pattern.

Fig. 15 illustrates an apertured rearranging member with apertures to define an irregular design.

Fig. 16 is a view partly in section and partly in elevation of apparatus according to a different embodiment of the invention.

Fig. 17 is a view in perspective of a portion of the apparatus of Fig. 16.

Fig. 18 is an enlarged fragmental view of a portion of the apparatus of Fig. 16 showing portions of the apparatus and their relationship to the starting material.

Fig. 19 is an enlarged fragmental view similar to Fig. 18 showing a modified form of the apparatus.

Fig. 20 is an enlarged fragmental view similar to Fig. 18 showing still a different modification.

Fig. 22 is an end elevational view of a preferred flexible belt apparatus according to the invention.

Fig. 23 is a sectional view of the apparatus of Fig. 22 along section lines 23—23, with parts broken away for greater clarity.

Fig. 23a is a fragmentary view in section of a modification of the apparatus of Fig. 23 illustrating vacuum assist in the fabric production.

Fig. 23b is a perspective view of a dryer element shown in Fig. 23a.

Fig. 24 is an end elevational view from the right side of the apparatus of Fig. 23 in the direction of arrows 24—24, with certain parts broken away for clarity.

Fig. 25 is a fragmentary detail of a mounting (tracking roll) along the line 25—25 of Fig. 24.

Fig. 26 is a rear elevation of the apparatus of Figs. 22 and 24 in the direction of arrows 26—26 in those figures.

Fig. 27 is an enlarged vertical sectional view taken along line 27—27 of Fig. 23, and illustrating access for changing a belt or other purposes.

Fig. 28 is a vertical schematic section of the details of the belts, web and jets, taken along section line 28—28 of Fig. 27.

Fig. 29 is a perspective of a portion of the apparatus shown in Fig. 23a, illustrating vacuum assist in fabric production.

Fig. 30 is a fragmentary vertical section along section line 30—30 of Fig. 29 illustrating vacuum assist.

Fig. 31 is a fragmentary section the same as in Fig. 28 but with the belts reversed.

Fig. 32 is an enlarged fragmentary view in vertical section taken along the line B—B transverse to the direction of web travel in Fig. 31, showing the early stages of the production of a three-dimensional fabric.

Fig. 33 is a fragmentary portion of Fig. 32 on an enlarged scale.

Fig. 34 is an enlarged fragmentary view in section as in Fig. 32 but at a later stage in the production of a three-dimensional fabric and with vacuum assist.

Fig. 35 is a diagrammatic elevational view illustrating the apparatus shown in Fig. 8 provided with a vacuum assist.

Fig. 36 is a diagrammatic elevational view of a modification of the apparatus of Fig. 8 in which both a vacuum assist and additional spray adhesive applying means are illustrated and in which the water jets are on the outside of the drum.

Fig. 37 is a fragmentary detail in section of the portion of the drum, belt, and web in Fig. 36 where fabric production takes place.

Fig. 38 is a fragmentary detail in section of the portion of the drum, web, and belt as in Fig. 36 where the bonding adhesive is applied.

Fig. 39 is a diagrammatic view of a portion of apparatus similar to that shown in Fig. 8 except that the jets are positioned outside the drum.

Fig. 40 is a fragmentary detail in section of a portion of the drum, coarse screen and web, showing fabric production in Fig. 39 which is similar to that in Fig. 3.

Fig. 41 is a diagrammatic view in outline of applying adhesive to the protuberances of a three-dimensional rearranged fabric by a "kissing" technique.

Fig. 42 is an enlarged view of the kissing roll detail of Fig. 41.

Fig. 43 is a further enlargement of a portion of the view shown in Fig. 42.

Fig. 45 is a vertical section of the apparatus of Fig. 44 along section line PP.

Fig. 46 is a fragmentary enlarged detail of a portion of the plate and drum of Fig. 45.

Fig. 55 is a photomicrograph at an original enlargement of approximately 20 times of the fabric illustrated schematically in Fig. 51.

Fig. 56 is a photomicrograph of a cross-section of a tuft shown in Fig. 54, further enlarged about two times.

Figure 1:
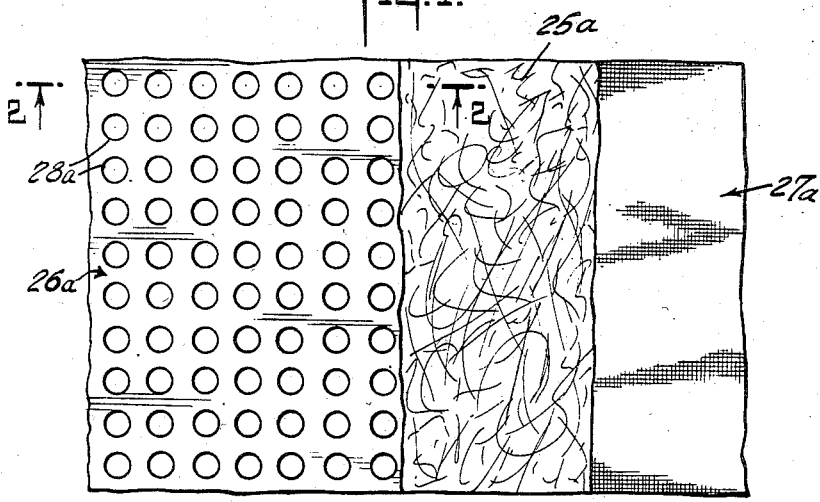
Fig. 1 is a fragmentary partially cut away schematic plan view of the apertured rearranging member and the foraminous supporting means portion of apparatus according to this invention, with the fibrous web to be transformed into a rearranged fabric interposed therebetween to form the aforesaid sandwich.
Figure 2:
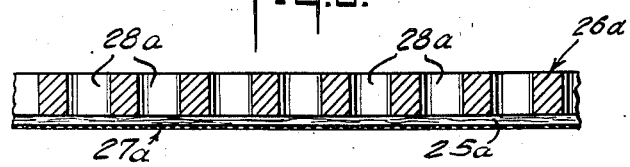
Fig. 2 is an enlarged fragmentary sectional view taken along the line 2—2 of Fig. 1, showing the fibrous web in position for production of a flat foraminous fabric.

Referring to Figs. 1 and 2 of the drawings, by way of illustration there is shown a web or layer 25a of mechanically engaged fibers, in a state of balanced equilibrium, such as may be formed by carding, garnetting, air-laying, by techniques such as disclosed in United States Patent 2,676,364, papermaking techniques, etc., sandwiched between an apertured rearranging plate 26a and foraminous supporting means 27a such as a fine mesh screen. The plate may comprise apertures or holes 28a arranged in a definite pattern. The size of these apertures is substantially larger than the openings in the foraminous supporting means, screen belt 27a.

Figure 47:
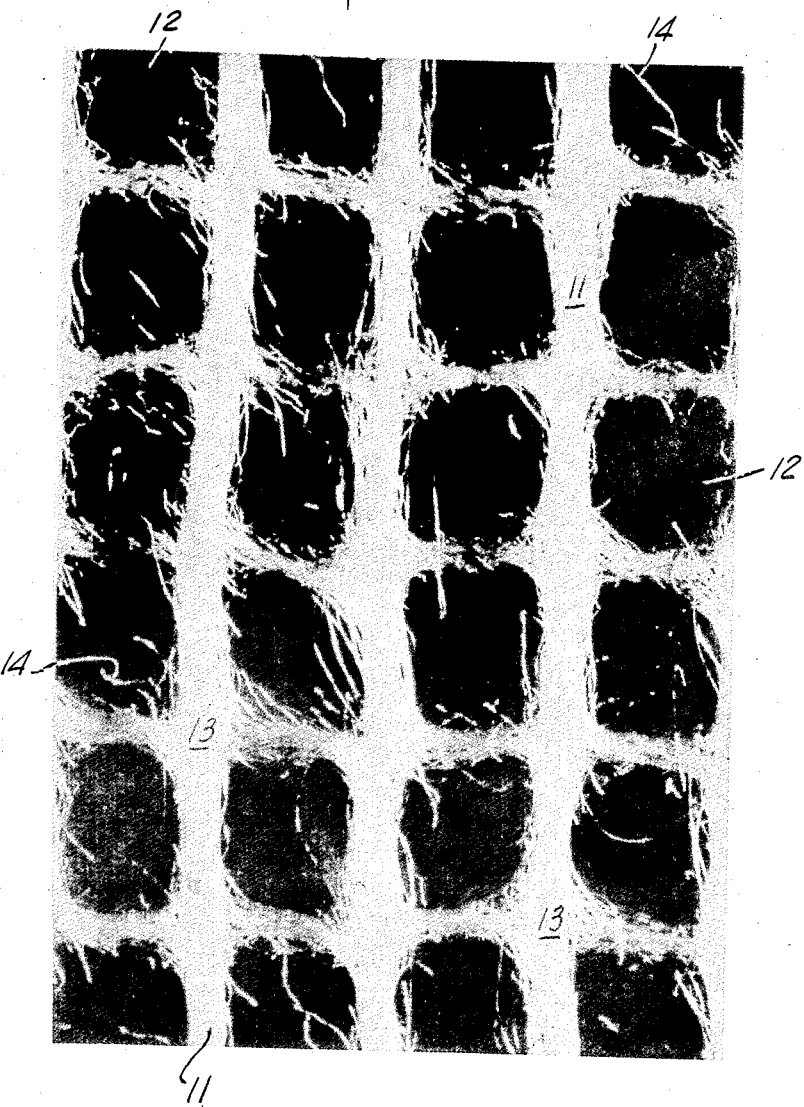
Fig. 47 is a photomicrograph of a typical non-woven fabric according to one embodiment of the invention at an original enlargement of approximately 24 to 1.
Figure 48:
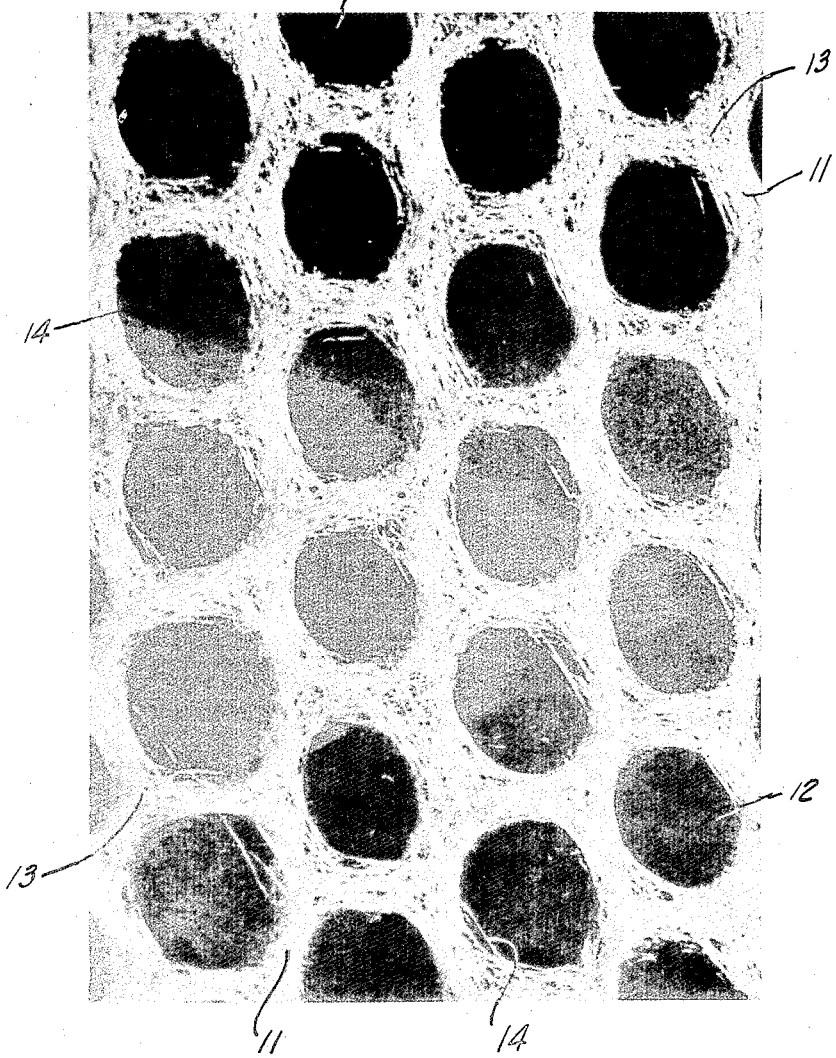
Fig. 48 is a photomicrograph of another nonwoven fabric according to this invention at an original enlargement of approximately 14 to 1.

As shown by the schematic edge views of the fibrous web when dry and when wet with a liquid, in Figs. 6b and 6a, respectively, the starting layer 25a upon being wet with water is reduced in thickness. The general surface tension of the water in the web draws the fiber closer together. The fibers themselves may swell to a degree, depending on their attraction for water. Rayon fibers, for example, will swell markedly, whereas nylon fibers will not. The degree of fiber swelling, however, is of relatively minor importance. Of greater importance is the effect of the water upon the crimp or spatial configuration of the fibers. Fibers that are water sensitive, such as rayon, will tend to become much limper when wet and lose any crimp that they possess in the dry state. Water insensitive fibers, on the other hand, such as nylon, will tend to retain their crimp and resist compacting when the web is wet.

Where the plate 26a and screen belt 27a are as shown in Figs. 2, 3, 6c, and 6d, the applied fluid force is directed against the sandwich from the exposed side of apertured plate 26a and the rearranged fibers are grouped on screen belt 27a in the land areas behind plate 26a in bundles to form a relatively flat, two-dimensional rearranged fabric as shown in Figs. 47 and 48, for example.

Figure 6:
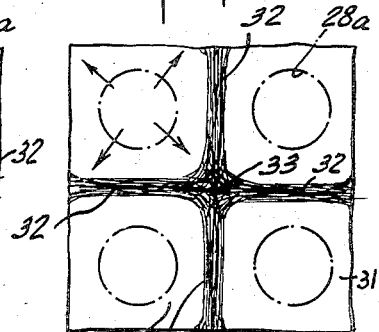
Fig. 6 is a view similar to Fig. 4 under still different conditions, namely, a still wider spacing between said parts.
Figure 6F:
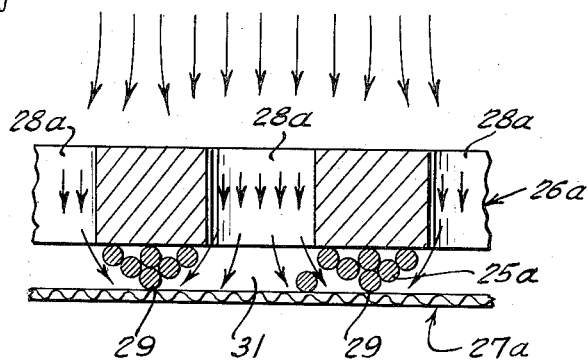
Fig. 6(f) is an enlarged view of a portion shown in Fig. 6(c) illustrating the packing component of force from the liquid particles.
Figure 6G:
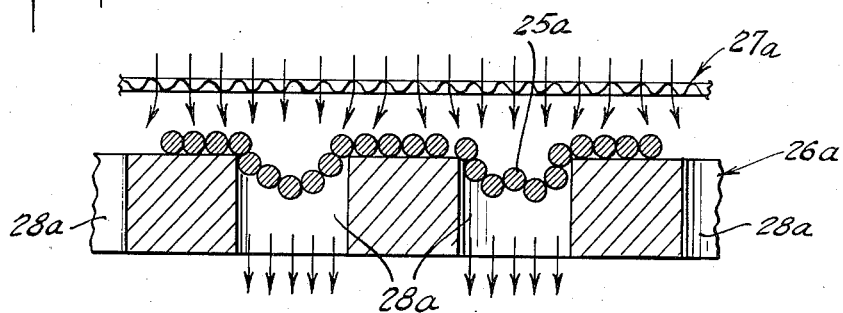
Fig. 6(g) is an enlarged view of a section taken at right angles to the view shown in Fig. 6(e) illustrating the packing component of force as in Fig. 6(f) but to produce a three-dimensional fabric.

If the plate 26a and the screen belt 27a of Figs. 2, 3, 6c and 6d are reversed with respect to the direction of passage of fluid through the web sandwiched therebetween, the belt acts as a spray diffusing member as shown in Figs. 6e and 6g, and an inverted three-dimensional fabric is produced in and between the apertures of plate 26a.

Figure 53:
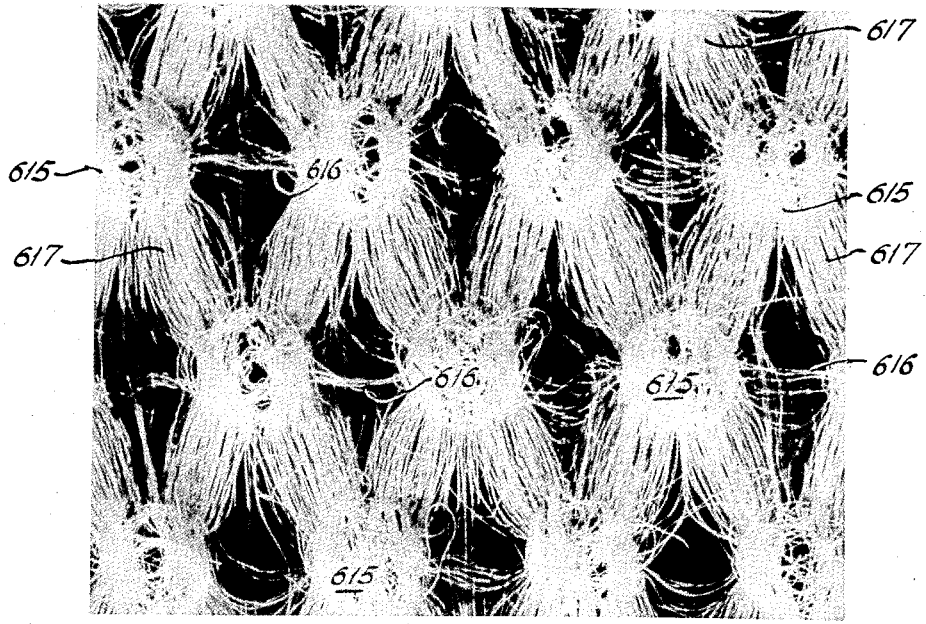
Fig. 53 is a photomicrograph at an enlargement ratio of approximately 20 times of the fabric illustrated schematically in Fig. 50.
Figure 54:
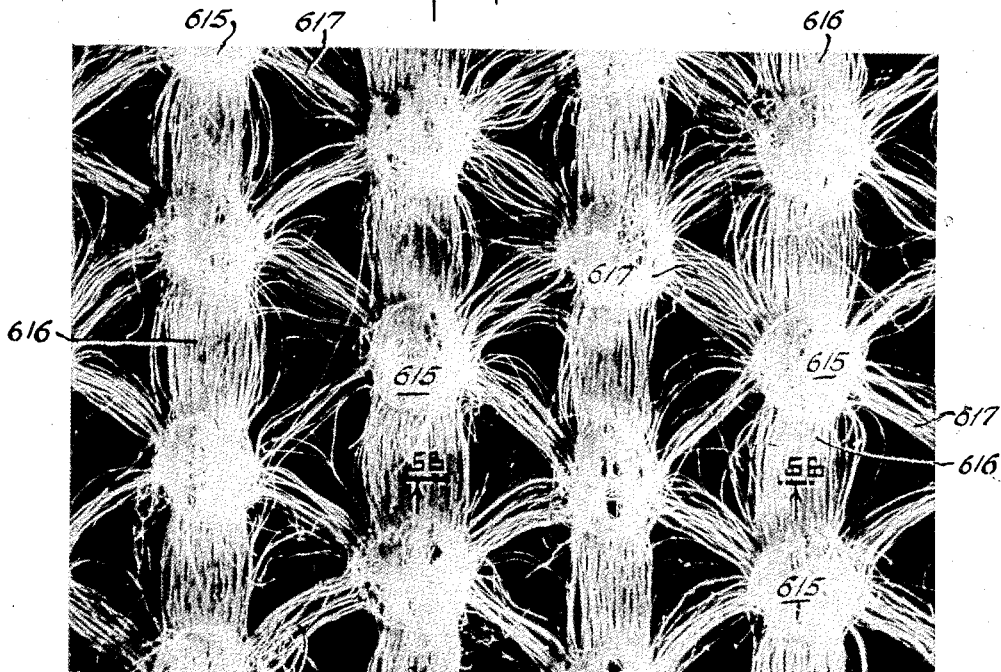
Fig. 54 is a photomicrograph at an original enlargement of approximately 20 times of the fabric illustrated schematically in Fig. 49.

The fluid, preferably water, is projected against the spray diffusing or control member, then passes through the intermediate web to be rearranged, and finally passes through the rearranging plate to carry into the apertures of that plate a portion of the fibers of the web. As the fibers are carried into the apertures they tend to intermingle in random arrangement and become interlocked into a three-dimensional tufted or budded formation with individual fibers from this formation extending in various directions into the adjacent fabric structure as shown in Figs. 53, 54, and 55, for example.

Whether the spacing between the apertured rearranging plate 26a and belt 27a is loose or tight with respect to the wet layer 25a, as shown in Figs. 6c and 6d, respectively, the intermittent bombardment of water particles against the wet sandwiched web forces the fibers into bundles or groupings by the component of sidewise force exerted by said fluid particles. The spacing should not be so tight as to prevent rearrangement of the fibers. The spacing should not be so loose as to permit a condition of flooding in which the rearranged fibers are subjected to such strong and unregulated currents that the rearranged web loses its identity. Between the limits of tight and loose spacing of the sandwich elements, as indicated above, the fibers are packed into bundles of a flatness and tightness of packing which vary with increase in said spacing as is schematically illustrated in Figs. 6c and 6d, the former showing a tighter packing of the interconnecting fiber bundles and a higher profile therefor.

Figure 3:
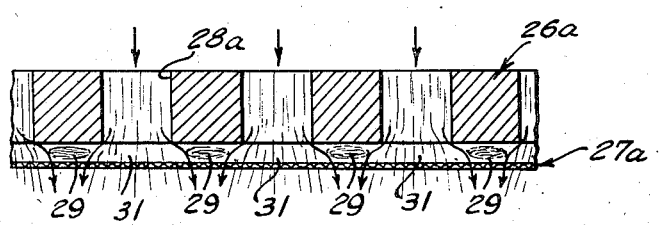
Fig. 3 is a view similar to Fig. 2 but somewhat enlarged, showing the behavior of these parts during the production of a fabric in accordance with this invention.

As shown diagrammatically in Fig. 3, the fluid, such as water, steam, air, another liquid or gas, or the like, is projected through the apertures in the plate 26a to pass through the fibrous layer 25a and the foraminous supporting means 27a. The liquid may contain an adhesive or a liquid waterproofing or fireproofing composition, etc., where it is desired to apply the properties of these materials to the finished product. The liquid may also contain a dye if it is desired to impart a color to the fabric. The liquid may thus serve a plurality of functions in accordance with this invention. The fluid may be emitted from the apertures in the plate in spaced streams arranged according to the aforementioned pattern.

The liquid streams projected through the fibrous web move fibers out of their way and into portions 29 of the zone between the streams. The rearranged fibers form a reticular foraminous structure comprising openings or holes 31 arranged in a pattern corresponding in general with the pattern in the apertured plate. By the method and apparatus of the present invention the fibers in the fibrous starting material are relocated into new, relatively unstressed positions where they lie in a state of mechanical equilibrium. In the relocated positions, the fibers are mechanically engaged, both frictionally and/or by interlocking of the fibers. Of basic importance in the product produced by the method and apparatus of this invention is the fact that the new arrangement of the fibers is one of balanced equilibrium, the rearranged or relocated fibers having substantially no in-built tendency to revert to their original arrangement. Thus, in this product the fibers are in a new state of balanced equilibrium and exhibit substantially no tendency to spring back to the original balanced state of equilibrium of the fibers in the starting web.

Figure 4:
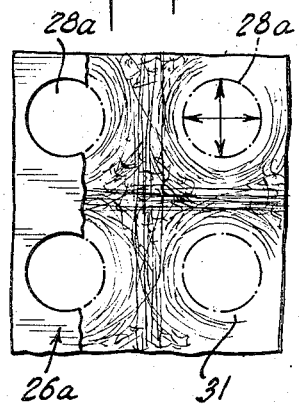
Fig. 4 is an enlarged fragmental schematic view of a portion of Fig. 1 illustrating the positioning of the fibers of a fibrous starting material when treated with fluid in accordance with one set of conditions; namely, a relatively narrow spacing between the apertured rearranging member and the foraminous supporting means.

The action of the fluid upon the fibers and the extent to which the fibers are moved is a function of the hydraulic or other fluid forces acting in the plane of the starting material. The distance between the adjacent surfaces of the perforated plate and the foraminous supporting means, the velocity of the fluid, the weight of the starting web, the nature of the fibers, and other factors, as hereinafter set forth, affect these forces. If the screen belt 27a is maintained fairly tightly against the under surface of the perforated plate 26a the fibers formerly in the way of the holes 28a will not move much farther than the edges of the holes and the openings 31 produced in the fibrous layer will correspond quite closely with the holes in the perforated plate, as shown in Fig. 4.

If the apertured means 27a is moved away slightly from the perforated plate 26a, the space within which the streams may move sidewise is increased. These streams which move sidewise are constituted of the streams passing through the apertured means which are deflected in a sidewise direction from the edges of the apertures and the streams which are deflected in a sidewise direction from the foraminous supporting means. The resulting increased sidewise motion of these streams causes the fibers to move away from the edges of the holes 28a and into closer contact with one another in the areas surrounding the holes, in the manner shown in Figs. 5 and 6.

It appears that the foraminous supporting means with its relatively small openings resists the passage of the streams therethrough and diverts a portion thereof in a sidewise direction. The sidewise components of adjacent streams act in opposition on the fibers between them, balancing one another as the fibers are compacted, and then pass through the openings in the foraminous means. Those portions of the streams which are not diverted in a sidewise direction pass directly through the openings in the foraminous means. If the space between the perforated plate and the foraminous supporting means is increased sufficiently, the sidewise components of the fluid will move the fibers into even closer association with one another forming yarn-like groups 32 of substantially parallel fiber segments half way between the holes.

The space between the perforated plate and the foraminous supporting means may be adjusted to vary the resistance of the fibers to sidewise motion. For a given set of conditions, this spacing may be adjusted to provide an area within which the fibers cease movement away from the edges of the holes 28a and come to rest in new positions between them. The width of the fiber areas between holes may be narrowed to the point where fibers are in extremely close and parallel relationship with one another in the shortest spans between holes. With the pattern of equally spaced round holes arranged in parallel lines intersecting at right angles, illustrated in Figs. 1–6, this phenomenon may be employed to produce a gauze-like (pseudo-woven) fabric comprising virtually square holes (Fig. 6).

Figure 5:
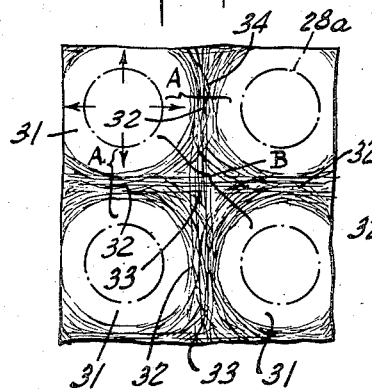
Fig. 5 is a view similar to Fig. 4 under slightly different conditions, namely, a wider spacing between the apertured and foraminous parts.

In Fig. 4 the fibers in the way of the holes have been moved into the surrounding areas of the layer to produce openings therein corresponding closely to the apertures in perforated plate 26a. As illustrated in Fig. 5, as the distance between the apertured plate and the foraminous supporting means is increased, the fibers may be moved away from the centers of the holes to produce closely assembled substantially parallelized groups 32 lying in the shortest spans (A in Fig. 5) between holes, interconnected by fibers extending in a plurality of diverse directions in web-like areas 33 lying in the longest spans (B in Fig. 5) between the holes. The fiber portions at 34 in Fig. 5 have been moved quite closely together, but the openings 31 produced in the fibrous layer still are substantially round, corresponding in shape to the holes in the apertured plate. The distance between the plate and the supporting means may be increased to the point where further movement of fibers in the shortest spans between holes can no longer take place, but the fibers are free to move together to minimize the web-like areas 33 in the longer spans between holes, with the result shown in Fig. 6. Thus, the openings 31 in the fibrous layer tend to become square, as shown in Fig. 6, and the fibers between holes tend to achieve a maximum degree of parallelism in the groups 32.

If the apertured plate 26a and the foraminous means 27a are moved much farther apart, while maintaining the same flow conditions as would cause the formations illustrated in Figs. 4 through 6, the streams will tend to flow together, produce flooding, and destroy the reticular fibrous structure. The optimum range for spacing these means will depend upon the velocity of the fluid passing through the plate, the nature of the foraminous means and the size and extent of its openings, as well as other factors including the thickness or density of the layer of starting material.

The effectiveness of the process described above is to a large extent dependent upon the nature of the foraminous supporting means and the size of the holes it contains. The foraminous means 27a must be capable of supporting the layer 25a and yet pass the fluid streams through it. Its openings or holes, not shown, must be small enough to prevent fibers from being washed through it. However, if they are too small or perhaps too widely spaced, so much resistance may be offered to the passage of fluid that it may back up or flow sidewise to too great an extent and prevent the production of the desired rearranged web structure. For given fluid velocities, as the foraminous means offers more resistance to passage, the sidewise components of the streams may increase in intensity with the result that the maximum practical spacing between the apertured plate 26a and the supporting means 27a must be decreased.

It also is important that the inner surface of the supporting means be sufficiently smooth to allow movement of fibers along its surface. If the surface is too uneven or rough, as might be the case with relatively large mesh screening, fiber rearrangement may be retarded and clear openings may not be produced due to fibers which stick on the supporting means in the way of the holes 28a in the perforated plate.

In Figs. 7–10 and 35 there is illustrated a machine in which a layer of starting material is sandwiched between a patterned apertured means, for example, a rigid drum, and a foraminated backing means such as a screen. The layer of starting material and the screen may be wrapped partly around the drum and the sandwich formed by the assemblage is advanced at suitable speeds as the drum rotates. The fluid may be projected through the holes of the rearranging drum by a row or rows of spray nozzles arranged inside and in the axial direction across the drum.

The patterned apertured means may also be a flexible belt having apertures larger than the holes in the screen backing member such as in the flexible belt machine illustrated in Figs. 22–29, based on a principle similar to that used in the drum machine. In the flexible belt machine, the spray nozzles are arranged in a row or rows spaced from the rearranging belt as will be described more fully hereinafter.

The spray nozzles may also be outside of the drum, as shown in Figs. 36 and 39, as will hereinafter be described.

Figure 44:
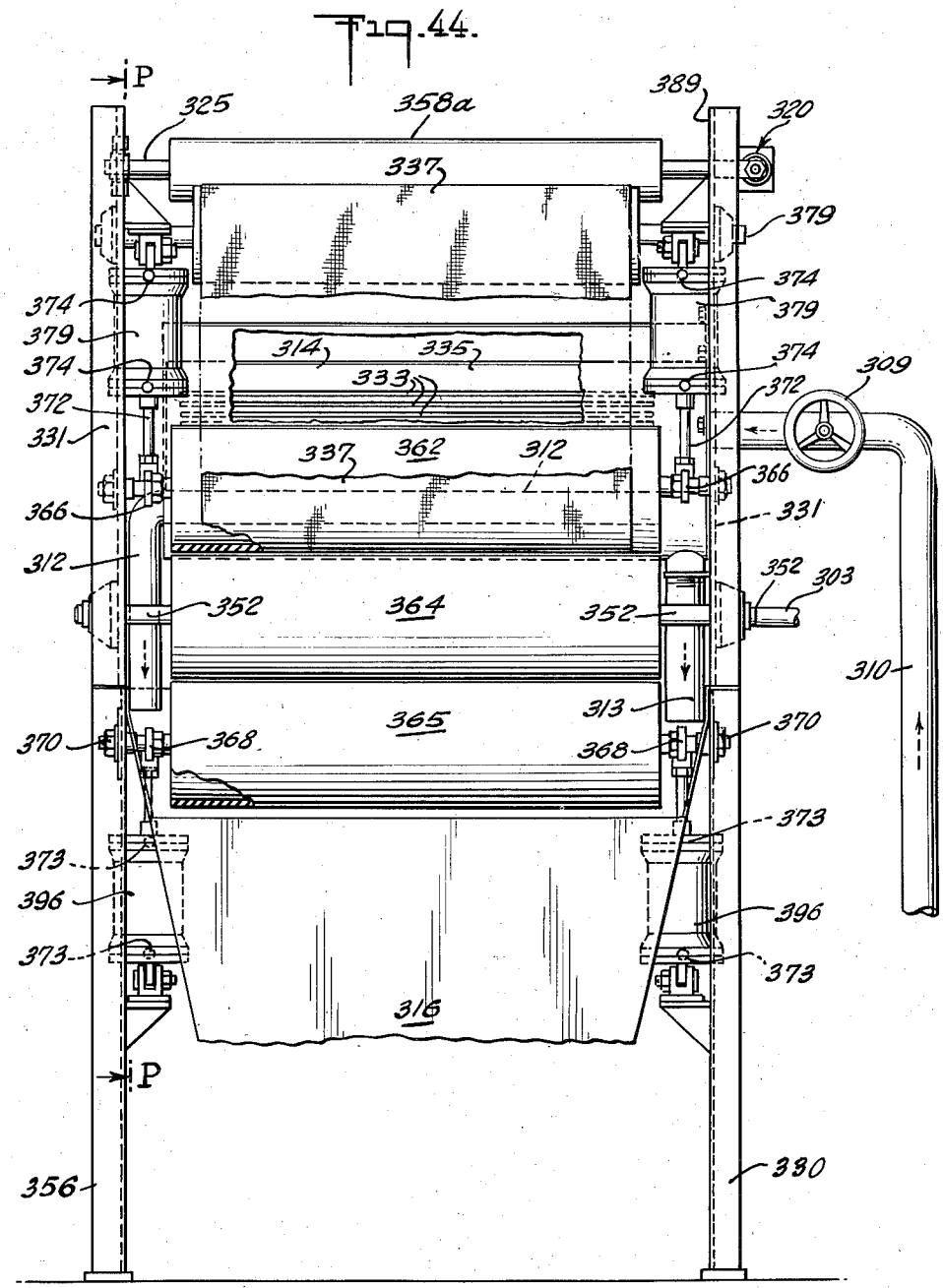
Fig. 44 is an end elevational view of another embodiment of apparatus, a machine having a movable rearranging belt supported by a plate mounted on a stationary drum.

A fixed drum with spray means mounted therein may be used in combination with a double flexible belt rearranging means, in which a rigid horizontally slotted supporting plate is mounted on said drum and interposed between the spray jets in the drum and a sandwich of the flexible belts on opposite sides of the starting material as shown in the double belt machine illustrated in Figs. 44, 45, and 46.

A rotating apertured drum may be used with a fluid applying means other than spray jets, as for example, in the drum machine utilizing an intermittent liquid slot feed as shown in Figs. 18–20.

In each of these machines, the starting web is subjected to the jets of the applied fluid, preferably water, which are applied intermittently and simultaneously over an area of the web transverse to the belt or the travel of the web. The rearrangement of the web into the desired pattern may occur when the sandwich is at rest or when it is moved intermittently or when it is moved continuously. Furthermore, the production of the rearranged web according to this invention may occur at any of a plurality of spray regions or at a particular segment of the rotative or linear travel of the sandwich.

In Figs. 7–10 there is shown an illustrative embodiment of preferred drum apparatus according to this invention capable of continuous operation at relatively high speeds. This apparatus comprises a cylindrical apertured drum 36, a foraminous backing member in the form of a continuous screen belt 37, and spray nozzles 38 inside the drum for projecting streams of liquid such as water through the drum apertures 39. A layer 41 of starting material, suitably in the form of a three-ply laminate of webs of carded cotton fibers, for example, may be sandwiched between the cylindrical drum wall and the belt to be rearranged into a fabric of this invention by the liquid being projected through the drum apertures.

The drum, which may have flanges 42 at each end for reinforcing purposes, is mounted in the cradle formed by two pairs of spaced flanged wheels 43. Each pair comprises a wheel 43 at each end of the drum fixed to a common shaft 44 which in turn is free to rotate in stationary bearings 45 mounted on a fixed foundation frame 46. The axles or shafts 44 supporting each pair of wheels are spaced to provide stable support for the drum 36. Each wheel includes an external flange 47 extending upwardly from its supporting surface beyond one of the ends of the drum 36 and adjacent thereto, thereby holding the drum in position axially.

The screen 37 passes around a major segment of the drum and is held in position thereon by positioning rollers 48 and 49 (Fig. 8) located above the drum and close to its surface. These rollers are fixed to shafts 51 and 52 which are free to rotate in bearings 53 and 54 mounted on horizontal frame members 55 supported from the foundation frame member 46 by vertical uprights 56 at each end of the drum. The belt also passes around adjustable guide rollers 57 below the drum, mounted on shafts free to rotate in bearings 58 which are slidably mounted in the foundation frame member 46. The position of the bearings 58 may be adjusted by positioning bolts 59 which are threaded through the foundation. The position of one or more of these rollers may be adjusted to remove or replace a belt and tension it in position.

Tracking means to maintain alignment of belt 37 are provided by tracking roller 57a which is mechanically tensioned similarly as the tensioning rolls 57, by means of threaded positioning bolt 59a which may be screwed forward or backward to position one of the pair of bearings 58a in which the roller is journalled. Tracking roller 57a is in contact with belt 37, and veers to the left or to the right of the direction of travel of the belt in accordance with the setting of the positioning bolt. Roller 57a pivots from an end pivot at bearing support 58a shown on the near side of Fig. 8, employing the same general mechanical mounting as the tracking device 220 shown in Fig. 23. Manual adjustment of bolt 59a varies the position of the axle of tracking roller 57a, to maintain the alignment of belt 37 on the fixed rollers and tensioning rollers.

The screen belt 37, after passing around the drum 36, turns around the second positioning roller 49 and thence around squeeze roller 61, through the nip between roller 61 and squeeze roller 62 and around roller 62. The bottom squeeze roller 61 is mounted in a fixed position on a shaft rotating in bearings 63 which in turn are mounted on vertical supports 64 extending from the upper frame member 55. Preferably, this roller is driven from a power source, not shown, through conventional means such as a belt, chain, or a chain of gears, also not shown. The top squeeze roller 62 is mounted on a shaft which is free to rotate in bearings 65 at each end which are slidably mounted for vertical movement in the supports 64.

The pressure at the nip is controlled by the position of the bearings 65, which in turn is determined by lever arms 66 acting on the bearings on each side of the drum. The lever arms 66 are pivoted on pins 67 extending from ears 68 mounted on the vertical supports 64. The levers are pneumatically controlled through air cylinders 69 (Fig. 9) supported from the vertical uprights 56. The cylinders are secured at one end of ears 71 extending from these members and through shafts 72 attached to pistons (not shown) in the cylinders, to the lower ends of the levers 66. The other ends of the levers bear down upon contact surfaces 73 extending from the slidable bearings 65 supporting the top squeeze roller. Air, under pressure, is supplied to the cylinders 69 through air lines 74 extending from a suitable pressure source, not shown. In Fig. 9 only one lever arm 66, together with its associated air cylinder 69 and shaft 72, are shown. The corresponding parts are omitted for clarity on the other side of the apparatus, where support 64 is shown broken away for practically its entire height and fixed foundation frame 46 is shown broken away in part.

Preferably, the operating tension on the screen belt 37 also is controlled pneumatically. This is accomplished as shown in Figs. 8 and 9 by a roller 76 adjustably mounted to press outwardly against the belt. The roller is mounted on a shaft journaled in fittings 77 extending from lever arms 78 pivoted from ears 79 fixed to the foundation frame member 46 on each side of the drum. The upper end of each of the arms 78 is pivotally attached to a shaft 81 extending from an air cylinder 82 mounted from one of the vertical uprights 56. The position of the cylinder 82 may be adjusted by a screw 83 passing through the upright. An adjusting knob 84 is provided for this purpose. The tension on the screen 37 is determined by the position of the roller 76 which in turn may be adjusted inwardly or outwardly by adjusting the pressure in the cylinders 82 by control means not shown.

Nozzles 38 for projecting streams of liquid droplets toward the inner surface of the cylindrical wall of the perforated drum 36 are mounted at the ends of tubes 86 arranged in banks along the length of a pressure cylinder 87 which in turn has a flange 88 at one end attached to the main frame through a vertical upright 89 seen in Fig. 8 on the far side of the apparatus. The flange 88 possesses slotted bolt holes 91 to allow the cylinder 87 to be properly positioned angularly about the axis of the drum. The nozzle assemblage is stationary and the drum revolves about the same. The nozzle assemblage extends from upright 89, through an opening provided in the end of the drum, into the space within the drum. The ends of the drum may if desired be closed except for this opening, although if this is done it is convenient to form the closure of glass or other transparent material for easy observation of the operation of the apparatus.

Fluid under pressure may be applied to the interior of cylinder 87 from any suitable source, not shown. There may be one line or bank of nozzles positioned partly or entirely across the perforated wall of the drum, but it is preferred that at least two banks of nozzles be employed. Three, four, or even more banks of nozzles may be advantageous under certain conditions since they tend to increase the range of speed of the machine. Conventional forms of nozzles may be employed, solid cone nozzles being preferred. As shown in Fig. 8, the fiber rearrangement in the fabric web 41 sandwiched as at inset 99 between the drum 36 and screen 37 occurs at a side of the drum adjacent the entry of web 41 into the nip between first positioning roll 48 and the drum. However, such rearrangement may occur at any position of the sandwich of the drum web and screen, such as at the opposite side of the drum 37 by turning the adjustable spray nozzles 38 in the opposite direction against the right inner surface of drum 37 instead of the left inner surface as shown in Fig. 8. The preferred positioning of the nozzles is such as provides the desired distinctness, clarity and integrity of the rearranged fibrous web in view of the weight of the starting web, the kind of fibers, the spray conditions, the pattern, etc.

The foundation frame member 46 itself may act as a sump for the liquid passing through the portions of the screen in the way of the nozzles, or falling from the screen, drum, or the pressure nip. However, separate means (not shown) defining a pan or sump in or around the foundation frame may be employed. Splash plates such as shown at 92 in Figs. 9 and 10 may be attached to the frame at both ends of the drum and similar plates or shields may be designed to fit around the screen to provide a splashproof enclosure.

In operation, a layer of starting material 41 such as a web of carded cotton fibers, for example, may be passed over the first positioning roller 48 and into contact with the continuous screen 37. The screen, carrying the web, may be passed around the portion of the drum 36 in the way of liquid being projected through the perforations 39 of the drum, then around the drum, over the second positioning roller 49, and thence through the nip formed by the squeeze rollers 61 and 62. The bottom squeeze roller 61 drives the screen 37, and the screen carries the web and drives the drum 36 with no slip between the drum and the screen. The web 41 of material is rearranged into a fabric 93 according to this invention as it passes in the way of the liquid being projected through the perforations in the drum.

The fabric retains some of this liquid as it passes around the drum, although most of it passes through the screen, as described above, and drops into the collecting sump before the screen carrying the rearranged layer reaches the pressure nip. At the pressure nip the major portion of the remaining liquid is squeezed from the fabric 93. Doctor blades 94 and 95, shown schematically in similar positions on another embodiment illustrated in Fig. 21, may be employed for wiping liquid from the screen or other parts in the way of the pressure nip.

Fabric 93 and backing screen 37 continue around squeeze roller 62, and as they begin their descent from the top of that roller the fabric is separated from the backing screen so that it may be drawn off to the output end of the machine while the backing screen moves on to the lower or return reach of its continuous path. Referring again to Fig. 8, a guide roller 96 may be provided adjacent the point where the screen 37 bends around the roller 76 for leading the fabric 93 gradually away from the screen. The roller 96 may be mounted for rotation in the upper ends of vertical stanchions 97 supported from the foundation frame 46.

At 99 in Fig. 8 there is shown an enlarged portion of the sandwich formed by the perforated drum 36, the layer of starting material 41 and the foraminous backing screen 37. At this position, rearrangement of starting material 41 into the end product, fabric 93, has already been partially completed. Fig. 11 is a somewhat schematic view of a radial fragment including this same portion of the sandwich. In it is shown the perforated drum 36, the foraminous backing screen 37, and a fibrous layer of starting material 41 between them in progressive stages of rearrangement into a fabric according to this invention. Four banks of spray nozzles 38 are shown inside the drum, spaced from its inner surface to allow the streams of liquid droplets 101, water in the case of the preferred embodiment, projected from them to form and diffuse somewhat by the time they reach the adjacent surface of the drum. For a drum having an inside diameter of about 30 inches, a nozzle spacing of about 6 inches from the inside of the drum has been found particularly satisfactory. However, this spacing can be varied over a wide range. Preferably, the nozzles 38 are radially directed to cause the streams passing through the perforations 39 in the drum to strike the layer of starting material in a direction substantially normal to its inner surface. It also is preferred that the radial velocity of these streams be substantially greater than the rotative speed of the drum 36 and the rest of the sandwich. For instance, with a drum driven at a surface speed of 50 feet per minute, a desirable velocity for the water leaving the nozzles is approximately 100 feet per second.

The layer of starting material 41 is affected directly by the fluid streams 102 formed by the perforations 39 in the drum. As shown in Fig. 11, these streams are formed by passing the drum through a zone wherein streams or sprays 101 of a fluid traveling at a relatively high velocity are caused to strike its inner surface in a direction substantially normal thereto. The fluid arriving in the way of a hole or perforation 39 in the drum will tend to pass directly through this hole into contact with the fibrous layer, assuming that velocities are maintained substantially as described above. It is these portions of the sprays, passing directly through the perforations of the drum, which do most of the work in producing a fabric according to this invention.

As mentioned above, solid cone type nozzles are preferred. In other words, it is preferred that the sprays 101 projected from the nozzles spread somewhat in a substantially uniform fashion. However, with most spray nozzles there is a greater diffusion at the outer edges of the spray than at its center. This edge diffusion is believed to be advantageous. For instance, as shown at 103 in Fig. 11, the perforations in the drum first are exposed to the relatively diffused outer edge of the uppermost spray before they become exposed to the full force of the first bank of sprays. Thus, the motion of the fibers in the starting material, under the influence of the streams and their sidewise components acting in opposition in the plane of the fabric, is begun gradually and then intensified until a rearranged fabric is produced according to this invention. Spaced fluid streams 102 are projected through, or emitted from the perforations in the drum wherever the inside surface of the drum is exposed to the sprays within the zone or area wherein the drum 36 passes through the sprays emitted from the four banks of spray nozzles. Preferably, the nozzles 38 are arranged in rows or banks along the length of the pressure cylinder 87 and are staggered with respect to the nozzles in adjacent banks in the direction of rotation of the drum. This makes for complete and substantially uniform coverage of the inside surface of the drum as it rotates.

Referring again to the spaced fluid streams 102 emitted from the perforations 39 in the drum, it is to be noted in this embodiment of the invention that there is no relative motion between these streams and the layer of starting material 41 which is rotating with the drum. As each individual hole 39 in the drum enters the spray area, a stream 102 of liquid begins to pass through it and then into the fibrous layer 41. A portion of this stream passes directly through the fibrous layer and through the backing screen 37. The remainder is diverted by the backing screen in sidewise directions and then passes through the backing screen, as pointed out above. Since the stream 102 is defined by a hole in the drum, it flows through the drum and moves with the layer and the rest of the sandwich from the time it begins flowing and continues to do so as long as the hole is exposed to one of the sprays. The motion of the stream 102 will be substantially continuous throughout the spray area if the hole is exposed to one of the sprays throughout this area.

As shown in Fig. 11, the fibers in the layer 41 begin to move out of the way of the streams 102 passing through the drum when the drum first enters the spray area and continues this motion as the drum becomes exposed to the full effect of the sprays, until complete rearrangement of the fibers is achieved in accordance with this invention. The extent of rearrangement of the fibers depends largely upon the material of the layer 41, the thickness and density thereof, the spacing between the drum 36 and the screen 37, the size of the holes 39 in the drum and the openings in the screen, the surface characteristics of the backing screen (namely, smooth or rough), the speed of rotation of the sandwich and the character and velocity of the streams.

As already mentioned, the screen 37 is held against the drum 36 by tension on the screen. Normally this tension is such that as the drum-fibrous layer-screen sandwich enters the spray zone the screen is forced slightly away from the drum forming a bulge, as is illustrated in Fig. 11. A certain amount of "bellying out" by screen 37 to momentarily increase the spacing between the apertured plate and the foraminous screen is essential.

Fig. 12 illustrates a developed portion of the sandwich of Fig. 11, and indicates a typical relationship between the drum 36, the screen 37, and the fibers between them. Of course, the size and shape of the streams 102 striking the layer of starting material initially are determined by the size and shape of the holes 39 in the drum. As described more fully earlier in the application, the sidewise components of these streams and their effect upon the starting material depend upon several factors, including the spacing of the drum and the screen and the resistance of the screen to the passage of the fluid. In general, when the screen is under high tension and held tightly against the drum, the passage of the fluid through the fibrous layer tends to provide openings in the layers substantially comparable in size and shape to the openings in the drum. As the screen tension is decreased and the screen is moved away from the drum aided somewhat by the force of the sprays, thereby increasing the spacing between the drum and the screen, the streams passing through the drum tend to displace the fibers laterally under the solid portions 104 of the drum, thereby creating openings in the fibrous layer somewhat larger than the openings 39 in the drum. The latter is illustrated roughly in Fig. 12. Also, as discussed hereinbefore, the spacing between the drum and the screen may be increased to a point where optimum tightness of the fiber groups 105 between the holes of the drum may be achieved. However, beyond this point increased spacing between the drum and the screen only tends to destroy the stream pattern and therefore the fabric structure.

Fabrics of various patterns may be produced by the apparatus of Figs. 7 through 12, depending upon the pattern of perforations in the drum and the orientation of the fibers in the starting web. For instance, a fabric having substantially square holes may be produced more readily by a drum having square openings 107 arranged as shown in Fig. 13, as compared with a drum having round openings arranged in the same pattern. A lace-like fabric may be produced by a drum having openings 108 shaped and arranged as shown in Fig. 14. The "lace" may be made somewhat coarse with its openings corresponding quite closely to the size and shape of the openings shown in Fig. 14, or it may be made finer by releasing the tension on the foraminous screen and thereby effecting an increase in the tightness of the fiber groupings between the holes 108.

Fig. 15 illustrates how an odd shape or design may be defined in a fabric produced according to this invention. In this figure, the perforations 39 in the drum are blocked off (or the drum is formed without perforations) in the way of the desired shape or design, in this case the comparatively large letters D, O, and E.

The drum 36 may be made of any desirable material, for example, plastic, metal, rubber, or any other self-sustaining material capable of retaining the desired perforations or foramina therein. It is preferred that the drum 36 be of metal, preferably stainless steel or other suitable material capable of withstanding corrosion. The thickness of the drum may vary rather widely, and in general it is preferred that it be characterized by rigidity.

As noted above, the screen belt 37 may be made of any suitable material. Screen belts in woven form are preferred.

Referring to Figs. 16 through 20, there is shown another embodiment of apparatus according to this invention. This apparatus employs a perforated drum or cylinder 111 and a foraminous belt 112 passing around the drum over a major segment of its travel. The drum 111 is rotatably mounted in close fitting relationship on a hollow pressure cylinder 113. Cylinder 113 is mounted in a fixed horizontal position by attachment at each of its ends to structural supports 114a, which are in turn mounted on side members 114. The cylinder 113 may be connected to any suitable source (not shown) of fluid under pressure, water, for example, through a pipe 115 extending from one of its ends.

The drum 111 fits on the cylinder in rotative relationship therewith for movement with the foraminous screen 112. The path of the screen is determined by the drum and four guide rollers mounted on shafts turning in bearings secured to the fixed supports 114 and 114a. Two of the guide rollers 116 and 117 are positioned adjacent to the drum and above its center line and the other two rollers 118 and 119 are located below the drum and outwardly of the first two rollers. The rollers 116 and 117 adjacent the drum guide the screen 112 around the lower half of the drum 111 as it rotates around the pressure cylinder 113.

The screen may be tensioned to keep it in close contact with the drum. This may be accomplished by adjusting the position of the lower guide roller 118. This roller is mounted in a bearing 121 at each end which may be adjusted slidably in the structure 114 by screw 122 threaded through a section of the supporting structure.

The pressure cylinder 113 contains a longitudinal throttling slot 123 through which a stream of water or other fluid may be projected in the form of a sheet. This slot is shown in section in Figs. 16 and 18 and in its full length in the isometric view of the cylinder in Fig. 17. As shown, the slot is on the bottom of the vertical center line of the pressure cylinder 113.

The operation of this embodiment and various alternate forms thereof will be explained with reference to the enlarged detail views of Figs. 18 through 20. In Fig. 18, the sandwich formed by the drum 111, starting material 124 and the foraminous belt 112 is shown passing in the way of the throttling slot 123. As shown, the sandwich is rotating around the cylinder from left to right with the result that the perforation 125 in the drum 111 immediately to the left of the center line is just being opened to the slot 123 while the perforation 126 immediately to the right of the center line is just being closed to the slot. As the drum 111 continues to rotate, each perforation becomes open to the slot 123 as it passes between the positions occupied by the perforations referred to immediately above. During this time a stream of liquid is projected through the perforation into the layer of starting material and then through the foraminous belt. Thus, the streams are of short duration if the drum rotates at any appreciable speed. It is evident that in this embodiment the starting material is subjected to more limited fluid forces than in the case of the hereinabove described preferred embodiment and, consequently, the rate and character of the fiber rearrangement obtained by the apparatus shown in these embodiments may vary.

Since the slot 123 is always full of liquid, being itself at all times exposed to the main body of liquid under pressure in the cylinder, liquid is ready to force its way into a particular perforation and thence into and through the layer of material 124 as soon as any part of the perforation is exposed to the slot. This may at times cause the liquid to enter the perforation obliquely and strike the layer of material to be rearranged in a direction inclined sharply thereto, with the result that it may push the material in the layer away from the perforation in this direction. This may be desirable where it is desired to produce a fabric having at least some holes or openings which are oblong in the direction of travel.

Fig. 19 illustrates an alternate form of the apparatus of Figs. 16 through 18 wherein the bottom 128 of the slot 123' in the pressure cylinder 113 is widened to diffuse the stream passing through the slot. With this apparatus the layer 124 of starting material is exposed to the action of the streams of fluid for a longer period of time with the result that clearer formation is generally obtainable.

Another form of this embodiment is illustrated in Fig. 20. The drum 129 employed has a wall which is considerably thicker than heretofore with the result that oblique flow as described in connection with Fig. 18 may be prevented even if the throttling slot is as shown in that figure. This is because the longer perforations 131 in the drum of Fig. 20 now become channels or orifices for directing the flow of the fluid and even if fluid initially should enter these holes at an oblique angle it will tend to straighten out and flow in a direction substantially parallel to the axes of the perforations 131. In addition, there is shown a throttling slot 123" having a recessed chamber 132 in contact with the drum for diffusing the liquid to a greater extent than the inclined chamber of Fig. 19, thereby tending to improve flow characteristics.

Figure 21:
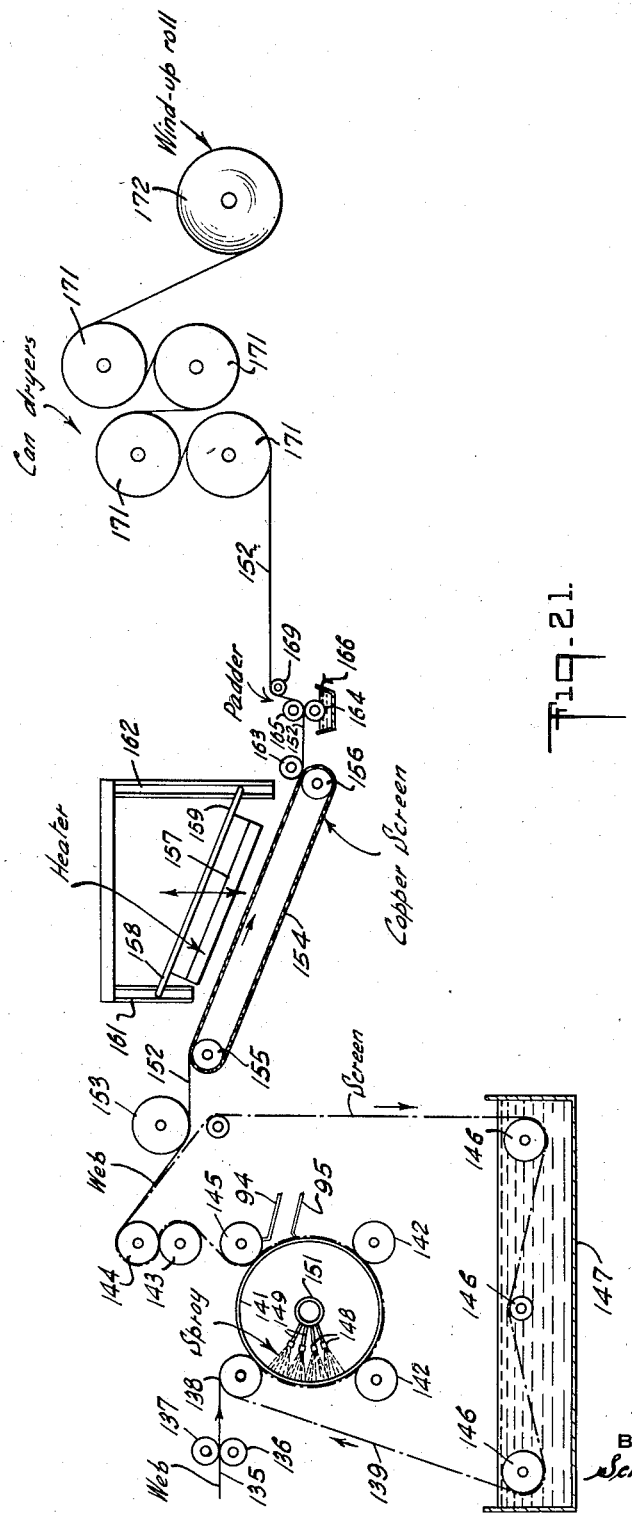
Fig. 21 is a schematic view of a modification of the apparatus of Figs. 7–10 for treating the fabric after the rearranging operation.

The apparatus illustrated in Fig. 21 employs the rotative perforated drum 141 and screen belt 139 arrangement as in Figs. 7–12 to sandwich the web 135 of starting fibrous material between said drum and screen belt as the web leaves the first positioning roller 138.

The drum is supported between spaced wheels 142 and is driven by contact with the screen 139, which in turn is driven by the bottom roller 143 of a dewatering pressure nip formed by rollers 143 and 144, as described in connection with Figs. 7 through 12. The belt 139 is shown passing around the drum 141 over a second positioning roller 145 through the pressure nip and around guide rollers 146 back to the first positioning roller 138. A pan or sump 147 is shown for collecting water projected through the sandwich and dropping from the unit in general. As mentioned hereinbefore, doctor blades or wipers 94 and 95 are shown for wiping water from the back of the screen 139 and from the bottom of the second positioning roller 145, respectively.

Water is projected through the apertures in drum 141, through fibrous web 135 and through screen 139 by nozzles 148 arranged radially inside the drum. The nozzles 148 are arranged in overlapping relationship with respect to one another in banks at the ends of tubes 149 connected directly to a pressure cylinder 151, as described in connection with Figs. 7 through 12.

After movement of the sandwich through the sprayed fabric rearranging area, the resulting fabric 152 is carried on the screen up over second positioning roller 145, and through the pressure nip between rollers 143 and 144 to decrease the water content as has been already described.

The jets of water which are delivered from the spray nozzles 148 cause the web to compact as illustrated in Figs. 6a and 6b. Depending upon the kind of fiber, its physical properties, density, water absorption, etc., its dimensions, denier, and length, its surface properties and also depending on the relative spacing between the apertured rearranging drum with relation to the backing belt, the amount of water which is contained in the web in the fiber rearranging region may vary from as little as about 50 percent to as high as about 3,000 percent or more without encountering conditions which prevent fiber rearrangement.

Dry formed webs of 1⅛ inch, 1.5 denier viscose rayon fiber appear to retain their integrity in this machine when about 30 or more times their own weight of water is present in the rearranging area. This water should be squeezed out between the belt and drum to less than about 15 times the fiber weight, as the web is carried away from the drum, to prevent distortion of the web. Contrarily, the same dry formed web containing as little as about 200 percent water can readily be rearranged by air or steam jets, although these fluids are known to be less efficient than water. Even with very low web moistures, less than about 50 percent, successful rearrangement of these webs with air has been accomplished although the results are not as good and the product is inferior to that in which larger amounts of water have been used.

With webs of shorter fibers, such as ⅜ inch 1.5 denier viscose rayon, the limits of moisture appear to be only about 20 times (or more) of fiber weight in the rearranging area before the web loses its integrity, decreasing to less than about 12 times fiber weight as the web leaves the drum. On the other hand, these ⅜ inch fibers can be readily rearranged by air or steam jets when the web contains as little as about 150 percent moisture.

Woodpulp fibers, 2 to 3 mm. (3/32 inch to ⅛ inch) average length, will handle properly in the rearranging area with about fifteen times their own weight of water present. These fibers are relatively stiff and coarse, However, before leaving the drum the belt tension should reduce the moisture content to less than about eleven times fiber weight. About 200 percent to 300 percent of liquid is the lower range for satisfactory rearranging by air, steam, or similar fluids.

Referring again to Fig. 21, the fabric 152, as it leaves the screen, passes around a guide roller 153 in a generally horizontal direction to the upper end of a continuous copper screen conveyor 154 which turns around upper and lower supporting rolls 155 and 156, one of which is driven at the same linear speed as the fabric. A heater 157 is mounted above the conveyor for slidable movement towards and away from the upper flight of the conveyor supporting the fabric. The heater has extensions 158 and 159 at each of its ends which fit into vertical tracks 161 and 162, respectively, for moving the heater vertically with respect to the conveyor. The positions of these extensions can be adjusted along the tracks to provide the desired heat intensity at the fabric 152. A bottom guide roll 163 is provided adjacent the lower supporting roll 156 of the conveyor to allow the fabric to be removed from the lower end of the conveyor without lifting it prematurely from the copper screen.

The fabric 152 is dried to any desired moisture content or it may be completely dried by heater 157. The dried fabric may be treated with an adhesive, dye, or other impregnating or coating material by passing it between rolls 164 and 165 of a conventional padder 166. A guide roller 169 is provided to cause the fabric to lead away from the padder.

If desired, there are a number of suitable adhesive bonding materials or binders which may be employed in aqueous or non-aqueous media in the padder to further strengthen the rearranged web. For instance, water-softenable materials in water solution may be used, these including: beaten cellulose jellies of woodpulp, caroa, ramie, etc.; natural gums including karaya, locust bean, gum arabic and others; starches; and synthetics, such as polyvinyl alcohol, carboxymethylcellulose, polyvinyl acetate, etc. Suitable binders or adhesive materials softenable by solvents other than water, are exemplified by polyvinyl chloride and polyvinyl butyral and their copolymers. Nonreversible binders may be used if the rearranging occurs before the binders are set; such binders may include urea-formaldehyde and melamine-formaldehyde condensation products which are in a lower stage of condensation.

Thermoplastic binders may, if desired, be applied to the rearranged web 152 in powder form and then fused to bond the fibers, including tufted fibers as hereinafter described; such powdered material include ethyl cellulose, nylon 6, nylon 11, other nylons, polyvinyl chloride, polyvinyl butyral, polyvinyl formal, cellulose acetate, and the like.

The optimum binder content for a given fabric according to this invention depends upon a number of factors including the nature of the binder material, the size and shape of the binder members and their arrangement in the fabric, the nature and length of the fibers, total fiber weight, and the like. Upwards of about 2 percent, preferably 6–15 percent, of binder based on fiber weight is satisfactory.

From the padder, in Fig. 21, the fabric may be led over a double bank of conventional steam heated drying cans 171. It then may be wound on a reel or drum 172 by conventional techniques for later use.

If the fabric produced by this invention requires no additional impregnating or coating material, then the portion of the apparatus following the heater 157 may be dispensed with. If heat for drying is objectionable, the fabric leaving roll 153 may be dried in air as by festooning.

In Figs. 22, 23, 24, 25, 26, 27, and 28 there is shown another preferred embodiment of apparatus according to this invention, which is suitable for the production of a variety of patterned, rearranged fabrics including flat, two-dimensional nonwoven fabrics and tufted or budded three-dimensional fabrics. This illustrated embodiment, termed the flexible belt machine, operates on a principle similar to and under conditions which are substantially the same as that of the apparatus in Figs. 7–12 but there is substituted for the rotative perforated drum a flexible perforated moving belt which in cooperation with the other foraminated belt sandwiches the layer of fibrous material and moves the sandwich at high linear velocities through one or more rearranging zones while under application of fluid forces.

Improved control of the factors affecting the fiber rearrangement in the region where the fluid forces are applied is obtained due to the feature that each of the belts may be separately adjusted in defining the fiber rearranging region. A further important advantage lies in the ease with which both of the belts may be changed to provide a variety of different web patterns.

An important feature of the flexible belt machine embodiment of the invention is the construction of a portion of the supporting structure to provide an access wall 290 and to further provide a cantilever construction which improves the operation and serviceability of the machine. This is best seen in Figs. 24, 26, and 27. Removal of the access wall permits ready dismantling of the machine, substitution of belts, repair of damaged belts, adjustment of the spray nozzles, replacement of spray nozzles where desired, and the insertion of adjuncts or auxiliary mechanisms to facilitate fiber rearrangement or dewatering of the web, as will be described in greater detail hereinafter.

As shown in the flexible belt machine, Fig. 23, the machine is mounted on vertical frame members 247 (at the left of Fig. 23) and support members 256 at the right and left. Fixed to support members 247 and 256 is the horizontal fixed frame member 246 which carries at its upper flange, the fixed wall 289 to which the manifolds 287a, 287b, and 287c of the spray jets are attached, by the respective flange mountings 288.

The upper and lower belts 236 and 237 are mounted on the respective drive rolls 260 and 249, and on the corresponding upper and lower follower rolls 258 and 257, respectively, within the framework provided by the vertical supports 247, the horizontal fixed frame member 246, access wall 290 and the first fixed wall 289. The top flight of the upper belt 236 travels under and in contact with belt tracking roll 258a. The bottom flight of belt 237 travels above and in contact with a belt tracking roll 257a. Tracking rolls 257a and 258a are mounted for rotation on shafts which extend transversely of the machine. The shafts are pivotally mounted at one end for angular adjustment to permit the proper travel of belts 236 and 237 with respect to the faces of the rolls on which they are mounted.

As shown in Fig. 27, access wall 290 may be rolled back from its operative position (broken line) to a retracted position (solid line) from which it may then be tilted back and swung down to a third position (broken line) in which it is entirely out of the way. The frame member 246 is provided at its upper edge with bracket 214. Bracket 214 carries rack 215 and an upper portion having channel means 218 (Figs. 24 and 26) projecting outwardly from vertical support 256. Access wall 290 carries a pair of mounting brackets 219, in which is journaled axle 217. This axle carries a pinion gear 216 at each end which engages with rack 215 to provide a means for supporting and retracting the access wall.

As seen in Figs. 24, 26, and 27 the upper portion of bracket 214 also comprises a locking and unlocking mechanism 212 for access wall 290. Said mechanism includes locking pin 213 attached to each supporting bracket 219 so as to ride in the channel portion of the corresponding channel means 218 and thereby keep access wall 290 locked in the vertical position. When access wall 290 is moved back into its fully retracted position, pins 213 slide free of their respective channel means 218, and the access well is free to be swung down out of the way.

Thus, in the closed position as shown in Figs. 26 and 27 (in broken line in the latter), the access wall is flush with the adjacent vertical frame member 247. The mating flange edges of access wall 290 and member 247 prevent water from the sprays in the machine from being projected to an area outside of the machine.

A cantilever mounting of the upper and lower fixed rollers for the belts is illustrated in Fig. 27. Shafts 280 and 279 of the upper and lower fixed rollers for the belts are mounted in bearings 282 and 281, respectively, in fixed wall 289. These shafts 280 and 279 project through the bearings in the fixed wall to the bearings in wall 295. As seen in Fig. 27, access wall 290 is taken as the first wall, fixed wall 289, which is the supporting wall for the manifolds for the jet sprays, is the second wall and the third wall 295 is located beyond this second wall 289. Bearings 250 and 251 for shafts 280 and 279 are the respective end bearings for these shafts in the third wall 295.

A similar mounting is provided for the shafts of the table rolls 248a, b, c, and d which are cantilevered through the rigid second wall 289 to the third wall as shown in Fig. 27. As shown in Fig. 23, table rolls 248a, b, c, and d serve to support the sandwich of the upper and lower belts 236 and 237 between which the web 241 is interposed. The table rolls prevent sagging of the belts during the impingement of the jet streams on the sandwich in the fiber rearranging areas. The cantilevered mounting of the shafts 252a, b, c, and d of the table rolls is similar to that described with respect to the mounting of the shafts 280 and 279 of the upper and lower fixed rollers for the belts. These table roll shafts 252a, b, c, and d, respectively, are cantilvered through bearings 254a, b, c, and d in the second wall 289 and bearings 277a, b, c, and d in the third wall 295. In Fig. 27, only shaft 252d of table roll 248d is shown with its associated bearings 254d and 277d, but the remaining shafts of the table rollers are mounted as is shaft 252d.

As shown in Fig. 25, there is provided a bearing assembly 226 comprising a bearing 291 for one end of shaft 225 of the tracking roller 258a. Bearing 291 is provided at the top and bottom with pivot pins 232 mounted in member 292 fixed in access wall 290. A corresponding bearing and mounting 226a for the lower tracking roller 257a are also shown in Fig. 24. Bearing 291 is shown broken away in Figs. 24 and 27, and in enlarged end elevation in Fig. 25. The construction and mounting of the bearing for lower tracking roller 257a is the same.

It is seen from the above that three sets of bearings are provided in access wall 290 which move with the wall when the wall is swung outwardly to open the machine. These bearings are the bearings 253a, b, c, and d for the table roller shafts, the bearing 226 and 226a for the upper and lower tracking roll shafts, and the bearings 275 and 276 for shafts 280 and 279, respectively, of the upper and lower drive rolls for the belts.

Hydraulically operated and electrically controlled tracking device operating mechanism 220 and 220a maintain the upper and lower belt alignment in improved manner over that which is obtained by the manually operable mechanical adjusting member 59a, roller 57a, and bearing 58a in the drum machine of Figs. 7-10. As shown in Figs. 23 and 24, the upper tracking mechanism 220 comprises a hydraulic air cylinder 221 connected at one end by pivot element 222 to the vertical flange of frame member 239. The tracking mechanism also includes a push-pull cylinder device whose piston rod 223 is connected at its outer end to shaft 225 of roller 258a at the end of said shaft opposite its journal mounting 291. Shaft 225 is located for sliding fore and aft movement in a slot 224 cut in the fixed wall 289 adjacent the position of the connection of the shaft with piston rod 223.

In order to effect the lateral adjustment of belt 236 there is provided adjacent each edge therof a limit switch 228 and 229. These switches are connected in an electrical circuit, switch 228 with solenoid valve 231 and switch 229 with solenoid valve 230.

With the arrangement fo the tracking mechanism as shown in the drawings, when belt 236 moves to the right (as seen in Fig. 24) beyond its proper alignment on the rolls on which it is mounted, limit switch 228 is closed to actuate valve 231, thereby admitting air under pressure to the front end of air cylinder 221. As a result of this, piston 223 moves inwardly in the cylinder (to the left as seen in Fig. 23) and thereby angularly adjusts the position of tracking roller 258a to move the belt in contact therewith to the left (as seen in Fig. 24).

When the belt 236 moves to the left beyond its proper position of alignment on the rolls on which it is mounted, it actuates limit switch 229 and operates valve 230, thereby admitting air pressure behind the piston in air cylinder 221. This causes piston rod 223 to move to the right (as seen in Fig. 23), and thereby angularly adjust the position of tracking roller 258a to move belt 236 to the right (as seen in Fig. 24) to its proper position of alignment on the rolls on which it is mounted.

As shown in Fig. 23, the starting web 241, suitably in the form of a three-ply laminated card web of cotton or viscose rayon fibers, or a mixture of such fibers with other fibers, is fed into the nip of the lower roller 257 and the upper roller 258 to be sandwiched between the flexible apertured rearranging belt 236 and the flexible foraminous backing belt 237. The apertured belt is preferably a metal screen whereas the foraminous backing belt is preferably of nylon. The sandwiched web 241 is subjected during its travel with the apertured rearranging belt 236 and the backing belt 237 to the action of jet sprays 201 of a fluid, preferably water, which impinge upon and through the sandwich, first through the larger apertures 202 in belt 236, then through the web and finally through the smaller foramina in the belt 237. The jet sprays from the three successive nozzles 238 provide three successive rearranging zones. However, more or less of these rearranging zones may be utilized as desired depending upon the fineness of the fiber rearrangement which is desired, the density of the web, the material of which the web is formed, and other factors.

As seen in Figs. 23, 24, and 26, the upper apertured rearranging belt 236 is tensioned during its travel by means of upper roller tensioning devices 259 at each end of shaft 297 for upper belt tensioning roller 258. One tensioning device 259 is mounted on panel 259a attached to upright frame member 256 and wall 289, and the other is mounted on flange 259b of access wall 290. Shaft 297 does not rotate, roller 258 being rotatably mounted upon it. The shaft slides within slot 299 in wall 289 (Fig. 23) and a similar slot in outer wall 295 at one end, and at the other end within a similar slot in access wall 290 (Fig. 26). In like manner, the lower belt 237 is provided with the same kind of tensioning means. There wheel 284 operates to pull back shaft 245 for lower roll 257. The upper roller tensioning device 259 is fitted to the shaft 297 of the upper belt tensioning roller 258. The lower tensioning device is fitted to the shaft 245 of the lower tensioning roller 257. Each of these tensioning devices moves the respective tensioning rollers 258 and 257 in a direction away from the corresponding fixed roller 260 and 249, respectively. Tensioning device 259 comprises an adjusting screw member 283 which is keyed into shaft 297 and also at one end of the shaft, into a square sleeve around the shaft. At the other end of screw member 283 there is provided an adjusting knob or wheel such as wheel 285 for the upper roll, which serves to thread the screw member into the shaft 297 to move the shaft in the desired direction.

At the exit of the rearranged fabric from the end nip of upper belt 236 and lower belt 237 around upper and lower rolls 260 and 249, respectively, the fabric passes through a first set of mangle rolls 262 and 263 and then through a second set of mangle rolls 264 and 265, after which it is dry enough to be used for further processing or storage. Pneumatically operated devices 269 and 296, respectively, duplicated on each side of the machine, are employed for regulating pressure on the two sets of mangle rolls. The first such device comprises an air cylinder pivotally attached at one end to a bracket mounted on vertical supports 247 and provided with a piston (not shown), a piston rod 272, and a lever arm 266 articulating with said piston rod in a pivotal connection about fulcrum pin 267. The first rubber-covered mangle roll 262 at its ends is mounted on lever arm 266 and moves therewith about the fulcrum to regulate the pressure at the nip. The retraction of piston rod 272 tends to move the shaft of the rubber covered roll upwardly and thereby increase the opening or nip between the rubber-covered mangle roll and the metal-covered mangle roll 263.

In like manner, the nip control device comprising air cylinder 296, lever arm 268, fulcrum pin 270 and piston rod 271 serves to control the nip opening between the second rubber-covered mangle roll 264 and the second metal-covered mangle roll 265. The air pressure in air lines 274 of the upper cylinder 269 and in air lines 273 of the lower cylinder 296 controls the force exerted by the associated piston to provide the desired nip pressure for rolls 262 and 265, respectively. Easy adjustment of each of the mangles in the two sets of mangle rolls is thereby provided to permit uninterrupted rapid movement of the rearranged fabric from the belt exit to the first and second drying operations performed at those mangles.

To drive the flexible belt machine, a power source (not shown) such as an electric motor drives the shaft 203 of the first metal mangle roll 263. On the same shaft 203 of the first metal mangle roll 263 there is mounted a sprocket gear 200 which is fitted with a chain 235, said chain connected at its other end to the lower belt driving gear 204 on the shaft 279 of the lower fixed roll 249. Gear 204 in turn drives gear 261 fixed to the shaft 280 of the upper belt fixed roll 260 to provide uniform movement of both upper and lower belts of the machine. As shown by the direction of the arrows in Fig. 23, the web and belts travel to move the web 241 in its starting condition, through the successive rearranging zones and out of the nip at the belt exit into the manglers 262 and 263 for drying the rearranged web. The drive effectively pulls the web sandwich of the fibrous material and upper and lower belts from the feed zone through the rearranging zones, from whence the rearranged web passes to the four drying rollers, of which one is the driving roller for the whole machine.

On the same shaft 203 of the first metal mangle roll 263 is mounted gear 239 which drives spur gear 233 on the second metal mangle roll 264, to operate the two pairs of mangle rolls as a unit.

A common header for the water manifold 208 is fed from a water inlet 207 which may be either from a pump (not shown) or optionally from a water reservoir (not shown) which may include a filter and pump in which the liquid from the flexible belt machine is filtered and recycled by pumping to be returned to feed the nozzle jets 238. Respective valves 209a, 209b, and 209c are provided in the three connecting conduits 210a, 210b, and 210c for independent control of water from the common header 208. Each of the spray devices 238 is provided with its own manifold 211a, 211b, and 211c corresponding to the locations and constructions above described.

The preferred nozzle is the solid cone nozzle as described with relation to the preferred embodiment of the rotative drum machine, Figs. 7–10.

Water from the spray nozzles which passes through the belts and web is collected in water pan 205 and from there flows to an outlet. If desired, the water from the outlet may be recycled after filtering it to remove filters lost from the sandwich. The pressure in the common header 208 is maintained at a desired value for the purpose of the particular fabric production desired in commercial operation.

In the removal of the web after it has been rearranged between the upper belt 236 and the lower belt 237, the web in the rearranged patterns is a self-sustaining fabric which may contain from about 1,200 percent to about 3,000 percent of water. It drops into the nip between rubber covered mangle roll 262 and metal covered mangle roll 263, wherein the water content is reduced to about 600 percent to 1,500 percent. Due to the greater attraction of the wet web for the steel surface of the metal mangle roll, it follows around along the surface of the metal roll into the second mangle rolls comprising a rubber covered roll and a metal roll similar to the first mangle roll. In this second mangling operation the amount of water in the web is reduced to less than about 300 percent, and the fabric is in a condition to be readily handled for other processing operations.

Although only three zones for fiber rearrangement are shown, any number of zones may be employed simply by supplying more jets and using longer belts. The number to be used depends upon the type of control required in view of the thickness of the fibrous starting material and the clarity, distinctness and packing density off the interconnecting packed bands between fabric intersections which are desired.

The flexible belt machine may be used with a variety of starting materials to produce a great variety of desirable textile-like patterns. It has been found that fabric may be produced at speeds of about 150 feet per minute with fiber rearrangement taking place in three or more zones wherein the fabric is subjected to the jet action of the spray.

Tension on the belts is regulated to provide the necessary spacing in the region where fabric rearrangement occurs. The adjustment of this spacing is desirable particularly since the production of two-dimensional or three-dimensional fabrics each imposes different requirements on the amount of water used and other variables which have been mentioned above.

The conditions of operation of the flexible belt machine may be controlled within wide limits in order to provide the suitable region for fabric rearrangement of the incoming web of fibrous material.

As an aid to the production of fabric, the removal of water after the final stage of fiber rearrangement facilitates the more rapid removal of the web from the machine. It has been found that the vacuum dewatering device 400 illustrated in Fig. 23b, comprising a slotted pipe having cylindrical vacuum connection 402 is effective for this purpose. The sandwich passes over the slot 399 of dewatering device 400 and the vacuum diminishes the web moisture to about 150 percent in a web containing about 1,200 percent water at this stage of operation. The employment of this vacuum dewatering device as shown in Fig. 23a, permits a degree of dryness to be attained in the finished web which renders the second mangling operation unnecessary.

As illustrated in Figs. 23a, 29, and 35, the provision of a vacuum assist means 401 or 403 directly below the zone of fabric rearrangement (directly below the area impinged upon by the particles of water from the jets), in either the drum machine of Fig. 7 or the belt machine of Fig. 23, permits greater clarity of web rearrangement to be attained and also dewaters the web. In view of the fact that higher speeds at the exit of the belt may be attained by the dewatering of the rearranged web without damaging the rearranged structure, the use of the vacuum dewatering device and the vacuum assist in fabric rearrangement is a preferred modification for commercial use. As many of these assists for each zone may be used as desired, in the light of the spray conditions which are found desirable.

The flow of water projected at the assemblage of spray control belt, the web to be rearranged and the rearranging screen, is controlled to provide sufficient force to move the fibers readily into the desired formation and at the same time to avoid an amount of water which would cause flooding at the region of the rearranging screen. Flooding is objectionable since it serves to carry away fibers and prevent their rearrangement into the desired fabric structure.

Flooding at the region of the rearranging screen may be avoided in a number of ways. For example, flooding may be avoided by draining away the water from the rearranging screen as rapidly as it begins to build up at the screen despite the open formation of the screen. This draining may be aided by suction, for example, by the expedient of suction boxes immediately beneath the rearranging screen and intermediate the table rolls, where table rolls are used to support the rearranging screen. With the aid of vacuum assists 401, such as suction boxes, as illustrated in Figs. 29, 30, and 34, it is possible to project the water to produce a rearranged fabric as shown in Figs. 47 and 48 at pressures varying from about 70 to 100 pounds per square inch and amounts of water from about 1.1 gal. to about 1.7 gal. per minute per nozzle.

It is also possible to control flooding at the region of the rearranging screen by controlling the amount of water which is projected at the aforesaid assemblage. Where no suction boxes are used, then it is necessary to cut down the amount of water projected at the assemblage from that set forth above.

Dewatering of the product is thus seen to be effected by the mangles or vacuum of a combination of both the mangles and vacuum.

The fluid force conditions for producing the rearranged fabric as shown in Figs. 47 and 48 may be slightly more severe than in the production of budded three-dimensional fabrics shown in Figs. 53 and 54. In the latter case vacuum assists 401 (Figs. 23a and 29) are useful in achieving the three dimensional tuft structure while simultaneously dewatering the product to prevent flooding during fabric rearrangement.

In general, where vacuum is utilized to avoid flooding conditions and to aid fabric rearrangement, the amount of vacuum to be applied to the web is preferably that corresponding to a vacuum equivalent to about ½ inch mercury to about 3 inches mercury. It is, of course, to be understood that the amount of vacuum to be applied to the web to assist in draining water from the web in the production of the three-dimensional budded fabric must be limited to avoid disruptive forces on the fibers within the web of such magnitude as to pull them entirely away from the web and thus destroy the unity of the web. It is important that the unitary construction of the web be maintained concomitant with the rearrangement of the fibers from the original carded form into the rearranged three-dimensional, bud arrangement of the present invention.

A particularly preferred fabric producing operation of the flexible belt machine of the present invention which is illustrated in Figs. 31, 32, 33, and 41 is the rearrangement of a web of fibers into a rearranged three-dimensional fabric by the utilization of the pair of opposed flexible foraminated belts, the upper belt being a spray diffusion belt for the liquid jets and the bottom belt being the three-dimensional apertured rearranging belt.

With the aforesaid assemblage utilizing a rearranging screen having perforations as mentioned above, uniformly spaced openings, 50 per square inch and 1/16 inch diameter, the nozzles suitable for use in producing the three-dimensional budded structure may be of the conventional solid-cone type described with reference to Figs. 7-10. With these nozzles and with the rearranging screen of the above construction and the spacing and number of nozzles as shown and with the aid of vacuum, if the nozzles deliver an amount of water onto the assemblage varying approximately from .5 gal. per min. to 2 gal. per min. for each nozzle there is no flooding. Proper web rearrangement takes place with this amount of water where the nozzles deliver the aforesaid amount of water at a rate of about 50 ft. per sec. to 200 ft. per sec. at the delivery end of the nozzles, when the delivery end of the nozzles is spaced about four inches from the assemblage.

It is of course understood that the spray control belt must not be in such close contiguity to the rearranging belt as to preclude the movement of fibers under the influence of the water forces into the three-dimensional budded structure. In general, it is preferred that there be the minimum spatial relationship between the two belts which would permit sidewise movement of the fibers into the three-dimensional budded structure and yet at the same time avoid displacement of fibers from the plane of the web as a result of upward components of forces resulting from the impact of the liquid on the imperforate portions of the rearranging screen. It is to be noted that the problem of proper spacing of the two belts is substantially similar to that set forth with reference to the screen and drum as described for Figs. 7-10.

The use of vacuum has been mentioned with respect to the flexible belt machine, as constituting an assist in dewatering the fabric after it is formed as well as an assist in promoting fiber rearrangement during the rearranging process under the action of the applied fluid from the jet means. The application of vacuum for the purpose of aiding fiber rearrangement is applicable to all of the machines of the present invention. For example, in Fig. 35 there is shown the application of vacuum in the rearranging zone 46 wherein the vacuum assist 403 which is maintained at a vacuum preferably of about 3 inches of mercury or lower, subtends the entire area of fiber rearrangement at the outside of flexible belt 37. A more distinct and better defined fiber rearrangement takes place while at the same time the advantage of a dryer web is obtained which prevents impairing the desired fabric rearrangement during handling while the web is moist.

However, using a plurality of vacuum assists as shown in the flexible belt machine in Figs. 23a and 29 permits the handling of larger amounts of water and effects more rapid fabric production in each rearranging zone.

The function of vacuum in the operation is schematically illustrated in Figs. 30 and 34 with respect to the production of flat and three-dimensional fabrics, respectively.

In Fig. 30 there is shown the production of a foraminated fabric of the type as shown in Figs. 47 and 48, in which the rearranged bundles of fibers are packed behind the land areas of the apertured rearranging means 236. Vacuum assist 401 in contact with and below foraminous backing means 237 assists in drawing off the water particles through the openings in the foraminated screen. As a result, additional components of force as shown by the arrows in the vacuum assist 401 are provided in addition to the components of force of the fluid particles into the apertures in the rearranging means 202.

In this connection, Figs. 6c, 6d, and 6e illustrate what is believed to be highly idealized conditions for the passage of water droplets through the apertures 28a in the rearranging means 26a, the holes in the foraminated backing means 27a and the spreading of the droplets as they pass through the sandwich of the web 25a and these means. Depending upon the spacing between the apertured means 26a and the backing means 27a, as shown in Figs. 6c and 6d, the bundles of fibers are packed in accordance with the sidewise components of force exerted by the droplets of water to assume a tight packing which may have a relatively high profile as shown in Fig. 6c or a flat profile as shown in Fig. 6d. By employing the vacuum assist 401 of Fig. 30, the droplets are each permitted to move faster as separate bombarding particles through the upper apertures and through the lower openings in the backing member, and there results thereby a more rapid intermittent bombardment of the fibers in a sidewise direction.

Turning now to the reversal of belts in Fig. 31, which is shown for the flexible belt of the Fig. 23 machine, the upper roller 258 is provided with the foraminated backing belt 237 having smaller openings than the lower belt 236, the apertured flexible belt member, on roll 257. The jet 201 impinges on web 241 in a reversed position as compared to that in Fig. 23.

In Figs. 32 and 33 there are shown diagrammatically different stages of three-dimensional fabric rearrangement which may be obtained as a result of the reversal of the belts. By the action of the intermittent bombardment of the fluid particles, fibers bridge the larger apertures 202 of the apertured rearranging belt 236. The smaller foramina in the foraminated belt 237 serve as spray diffusing means to break the fluid stream or particles into even smaller particles. Sidewise components of force are exerted to push some of the fibers into areas immediately adjacent the apertures and between immediately neighboring apertures while other portions of the fibers are pushed into the aperture 202 in a downwardly tufted pattern.

This reversal with an illustration of the water-droplets is illustrated in Fig. 6e wherein it is seen that the web 25a assumes a "sinusoidal" shape in cross section, having areas in cross section showing a packed appearance above the land areas of the apertured rearranging means 26a and also having the tufted portions representing a greater concentration of fibers which protrude downwardly between the side walls of apertures 28a.

It is important that fiber movement be permitted to occur easily on the inner surface of the apertured rearranging means 26a. For this reason its surface should be smooth and have no sharp corners to facilitate movement of the fibers into the desired position.

Assisting the production of the three-dimensional fabric is the use of the vacuum assist 401 as shown in Fig. 34. Here, the droplets of water as indicated in Fig. 6e are quickly moved out of the tufted areas in the apertures of the rearranging member 236 and removed through the vacuum assist 401. Better packing of the three-dimensional fabric and improved dryness are attained by the use of such assist.

Figure 6H:
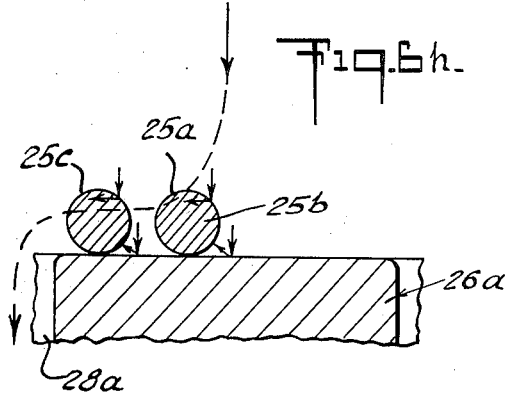
Fig. 6(h) is a schematic view illustrating the components of force from the liquid particles applied to the fibrous web to produce the fabric shown in Fig. 6(g).

Illustrated in Figs. 6f, 6g, and 6h are more highly idealized and exaggerated schematic views of the forces which are exerted during the projection of fluid particles through the sandwich. In Fig. 6f individual force components above the plane of the apertured member 28a are shown by arrows. These components enter the aperture illustrated, strike the solid portions of the foraminated backing member 27a and reflect from said solid portion to move fibers from the area below the aperture into packed bundles behind the land areas of apertured means 26a. Under the right land area there is shown a cross section of a single fiber which is moved to assume a position at the bottom of the bundle of fibers packed under the land area of the right hand land.

With the backing means 27a and the apertured means 26a reversed as shown in Fig. 6g, individual fibers of the web 25a are moved along the land areas and concentrated in the tufts or bundles which bridge the apertures across adjacent land areas of the apertured means 28a. The forces from the fluid applied through the apertures of the foraminated member 27a are illustrated by arrows passing through the openings in said foraminated member. These forces tend to move the individual fibers sidewise to pack them in the form of tufts across the apertures. In Fig. 6g there are still some fibers left on the land areas of aperture means 26a which have not yet been moved into a tuft, but if production of the fabric is carried to completion these will be moved laterally in one direction or another to join the tufts at one aperture or another.

As shown in Fig. 6h on a highly schematic basis, an individual droplet represented in terms of its applied force by the arrow strikes element 26a along a side of the fiber marked 25b to move it into a new location as indicated by fiber 25c. Assisting this sidewise component of force is the reflected force shown by the arrows at the base of fiber section 25b. The force reflecting from the land areas of 26a strikes the bottom profile of the fiber section to move it in the direction which is taken by the fiber section 25c. Such movement may continue until the fiber bridges the aperture. Because of the presence of fibers in appreciable amount which are in random relationship, even in carded webs having a degree of orientation of about 90 percent, there is sufficient intertangling of such fibers so that there is surprisingly little loss of fibers which are washed through the apertures 28a of member 26a under properly controlled spray conditions.

Such loss as may tend to occur may be minimized by controlling the tension between members 237 and 236 as shown in Figs. 32 and 33. Movement into the openings or apertures of the rearranging means 236 is enhanced by providing a larger spacing between the foraminated backing members 237 and 236 as shown in Fig. 33, and such movement is somewhat decreased with the smaller spacing as shown in Fig. 32.

It is to be understood that the production of three-dimensional fabrics may be carried out with the aid of vacuum in the flexible belt machine of Figs. 7–10. As shown in Fig. 36, such fabric production is obtained with substantially the same kind of rotative drum and belt mounting as in Figs. 7–10 except that the spray nozzles 100 are mounted on the outside of the drum and vacuum is employed on the inside of the drum by the use of vacuum means 404. As shown in the inset of Fig. 37, at the fiber rearranging section immediately adjacent the sprays into the vacuum receiver 404 tufted fabrics are produced from starting web 241. Belt 37 has smaller openings than the apertures in drum 36.

In the machine illustrated in Fig. 36, the tufts or bud portions of the three-dimensional fabrics are sprayed with a powdered adhesive from spray means 538 which applies a fine powder 501 to adhere to the moist bud areas as shown in Fig. 38. A guard 405 mounted on supports 406 prevents any of the powder which collects in the drum from falling back into the rearranging zone of the drum and a brush 502 is provided near the exit nip of the resulting fabric 294 over roll 49 to brush away excess powdered adhesive material from the tufts. A drain pan 407 is provided in order that water deflected by the outside of belt 37 may be carried away from the machine.

In Fig. 39 there is shown the production of a fabric of the type shown in Figs. 47 and 48 but in which the belt has the larger openings and the drum the smaller ones, see Fig. 40, and the spray nozzle jets 100 are positioned outside the drum. A vacuum dewatering means 404 is provided on the inside of the drum. In other respects, the machine is as shown in Fig. 8. The rearrangement of the fibers into a fabric is shown in the inset in Fig. 40, the method of rearrangement corresponding to that shown in Fig. 6d.

In Figs. 44, 45, and 46 are shown fabric rearranging apparatus comprising two flexible belts of the same type as shown in Figs. 22–27 between which is sandwiched the starting web 341 to pass in sandwich form with the belts over an open sector of a rigid drum 335, in which sector a rigid horizontally slotted plate 334 is interposed between the open sector and sandwich to support the sandwich and diffuse the fluid spray passing through the sandwich to receiver 314.

The apparatus of Fig. 45 is useful for producing the foraminous fabric illustrated in Figs. 47 and 48. The relationship of the apertured rearranging belt 336 to the flexible foraminated backing belt 337 in the belt machine of Fig. 45 is substantially the same as the relationship between the upper belt 236 and the lower belt 237 in Fig. 23. Both belts are flexible, the apertures in belt 336 are larger than the holes in belt 337, both belts are tensioned, and together the belts sandwich the web 341 through the rearranging zone to provide the finished fabric 393. However, in view of the geometry of the open sector of the drum 335, the travel of the sandwich in the fabric rearranging zone is for a shorter distance in the apparatus of Fig. 44 than in the belt machine of Fig. 23. The horizontal slots in member 334 serve to break up the droplets or particles of liquid from spray nozzle 338. A solid cone nozzle of the type shown for Fig. 7 is preferred.

The upper surface of belt 337 is provided with a tracking device 320 including tracking roller 358a, substantially identical to that which is employed for the upper and lower surfaces of belts 236 and 237 in the flexible belt machine.

Exit nip pressure devices 369 and 396 are provided which are similar to those utilized at the first pair of mangle rolls 362 and 363 in the flexible belt machine of Figs. 22–27. The upper one of these exit nip devices mounted on the frame comprises a cylinder 369, a piston (not shown), a lever 366, which is pivoted at its end opposite the piston rod 372 at fulcrum point 367. The lever arm 366 is fulcrumed about the point 367. In similar manner, lever arm 368 is fulcrumed about point 370 which is opposite the articulating end of lever 368 with piston rod 371 to control the pressure on rolls 364, 365. The pistons in cylinder 369 and 396 are of the push-pull type, the actuating fluid being air through inlets 373 into cylinder 396 and through inlets 374 into cylinder 369.

Manifold header portion 387 is supplied with water from water inlet 310 which may be to a pump or other pressure source and the nozzle 338, preferably of the solid cone type, emits a jet spray 301 against the horizontally slotted member 334 into the sandwich of belt 336, web 341 and backing belt 337. Water collecting in drum 335 is drained through outlet 312 into a pan 315 and common drain 316. The receiver 314 is likewise provided with a drain outlet 313 into the common pan. The mounting of the apparatus is quite similar to that in Fig. 23, vertical legs 256 supporting the upper horizontal wall member 389 upon which the drum 335, water manifold 387, spray assembly 338, and the hydraulic tensioning devices 369 and 396 are mounted.

As shown in Fig. 46, the upper and lower edges of the receiving member 314 are flanged outwardly in abutting relation to the lower belt 337, as at 317, to prevent water from spray 301 from being deflected from either the inside of drum 335 or the inside of receiver 314.

The orientation of the fibers in the starting web, 41, 241, 341, or 25a as shown in the various figures of the drawings is of importance with regard to the ease of fabric rearrangement. As illustrated in Figs. 49, 50, 51, and 52 with respect to the production of three-dimensional budded fabrics, different kinds of fiber orientation in the starting web with respect to the geometry and orientation of the rearranging apertures in spaced relation may produce different fiber rearrangement in the finished product.

There are several types of webs that can be used satisfactorily in the practice of this invention. A carded web contains a plurality of overlapping, intersecting fibers, generally arranged in the direction in which the web leaves the carding machine. If this web is subjected to a longitudinal stretch, the "degree of orientation" increases, so that the fibers become predominately arranged in this direction.

Another type of web is the "iso" web, wherein the fibers are arranged so that they extend in all directions, substantially in the plane of the web in essentially equal numbers. This type of web can be made by a variety of systems, as for example, an air-laying machine as described in U. S. Patent 2,676,364.

A wet formed web can be made by suspending fibers in a large volume of water and then passing the resulting slurry through a wire screen, as for example, Fourdrinier paper machine wire.

In accordance with the invention it is preferred to use a carded web, preferably with the fibers oriented predominately in a single direction or an iso web.

Referring to Figures 47 and 48, there are shown portions of typical fibrous nonwoven fabrics produced by techniques which force the fibers behind the land areas of the rearranging member such as described in connection with the machine illustrated in Figs. 7–10. These fabrics are shown and described in greater detail, and are claimed, in the prior copending applications of Griswold Serial No. 503,871 and Griswold and Pearce Serial No. 503,872, both filed April 26, 1955 and assigned to the same assignee as the instant application. These prior copending applications have a disclosure of a machine corresponding to that shown in Figs. 7–10, as an embodiment of a mechanism for making the fabrics.

The fabrics of Figs. 47 and 48 contain bunched fibers arranged in interconnected groupings 11 defining holes or openings 12 between them. The openings 12 and the groupings 11 both are arranged in accordance with a predetermined pattern corresponding to the pattern in the perforated plate or other rearranging member employed. The holes in Figure 47 are arranged in a more or less square pattern while those in Figure 48 are positioned as on the points of a diamond tilted to one side. The groupings 11 are connected by fibers common to a plurality of groups at junctures 13 wherein the fibers are oriented in a plurality of diverse directions.

Most of the fibers are oriented vertically in the photomicrograph in Fig. 47 and the vertically extending fiber groupings appear thicker and more dense than those extending horizontally. This is mainly due to the orientation of the fibers in the card web layer of starting material from which the fabric of this figure was produced. In this fabric a preponderance of those portions or segments of the fibers in the groups 11 are closely associated and substantially parallelized about the axes of the groups where they appear to be in substantial contact with one another along their length. The groups appear yarn-like in Fig. 47. In cross section many of the groups would possess yarn-like thickness in two dimensions, both in the plane of the web and perpendicular thereto.

In Figs. 47 and 48, the holes or openings 12 between the groupings are substantially free of fibers, and most of the fiber segments bordering the holes extend substantially tangentially of the hole perimeters. That is to say, they extend around the holes and do not present ends adjacent their perimeters. However, in both these figures, there are some random fiber segments 14 which extend across or into the holes from the fiber groupings surrounding them. Very few of these occur in Fig. 48. The relative number of random fibers, and the sharpness of the holes, may be varied somewhat to give different effects. When the resulting fabric is to be used in covering sanitary napkins, for instance, a fuzzy appearance may be advantageous. In Fig. 47, the holes 12 are substantially uniform and almost square in shape and uniformly spaced in a square pattern and the fiber groupings 11 between the holes extend at substantially 90 and 180 degrees to one another, generally in the plane of the fabric, forming a reticular gauze-like pseudo-woven fabric structure.

In general, the average length of the fibers is considerably greater than the lengths of the groups containing them with the result that the groups predominantly comprise only parts or segments of the fibers passing through them. The shapes of the fibers correspond to a large extent to the shapes of the groups containing them. Thus, the fibers in the structure of Fig. 47 may be bent or crimped in a sinuous fashion or they may turn back upon themselves and extend completely around one of the holes or attain a configuration akin to a letter S, etc.

Figure 49:
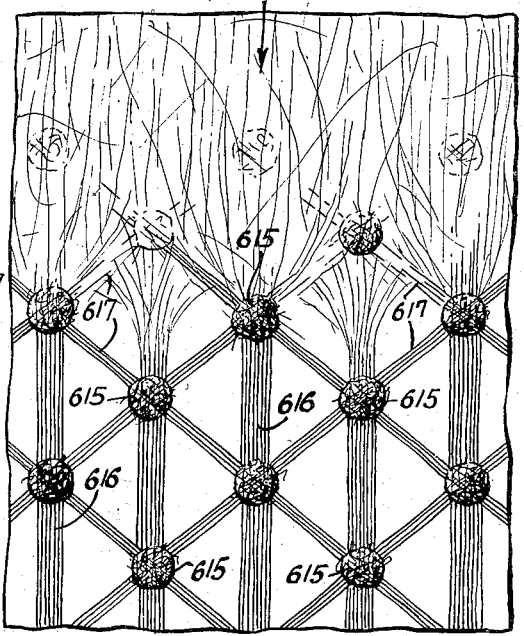
Fig. 49 is a schematic diagram showing the production of three-dimensional fabrics using a carded fiber web having the fibers generally oriented in the direction of travel of the web (indicated by the arrow).

Fig. 49 gives a diagrammatic showing of a web carded in the direction of the vertical axes passing through successive apertures in the fiber rearranging member just as the web passes through the fiber rearranging zone. The direction of travel of the web is, as indicated by the arrow, from the top of the figure to the bottom, the fibers being shown at the top of the figure before rearrangement takes place, their main orientation also being in the direction of the arrow, and at the bottom after passing through the fiber rearranging zone. In said zone, the fluid forces pass first through the smaller foramina of the foramina defining means and then through larger apertures in the apertured means to rearrange the fibrous carded web interposed between these means into a tufted three-dimensional fabric having bud portions 615, consolidated flat packed ribbons 616 extending in the direction of general orientation of the web fibers, and smaller consolidated transverse flat bundles 617 which extend between immediately neighboring buds 615 in a direction generally transverse to the direction of main fiber orientation.

In general, the consolidated fibers constituting the vertical bundles 616 or the transverse bundles 617 will tend principally to travel from a given hole in the perforated screen to the immediately adjacent hole having the least separation measured in the direction which is transverse to the general orientation of the fibers. Thus, in the web shown in Fig. 49 there is a greater concentration of fibers or a wider band 616 in the vertical direction than in the transverse direction. The photomicrograph in Fig. 54 shows an enlargement of a fabric prepared in this way.

Figure 50:
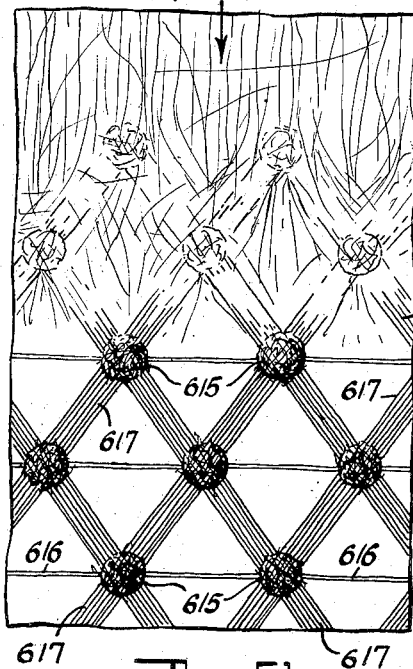
Fig. 50 is a schematic diagram showing the production of three-dimensional fabrics using a carded web as in Fig. 49, but with the pattern of the apertured rearranging means shown in Fig. 49 rotated 90 degrees.

By moving the apertured means in a direction 90 degrees from that which is used in Fig. 49, the condition which is shown diagrammatically in Fig. 50 is achieved. In Fig. 50 the same diamond pattern of the apertured rearranging means as in Fig. 49 is employed, but rotated 90 degrees, the orientation of the fibers remaining generally vertical. The ribbons 617 are now thicker in the diagonal directions because the buds 615 lying along axes oriented closest to the orientation of the fibers are closer together than they were in Fig. 49. For the same reason the horizontal bundles 616 are much narrower. A photomicrograph of the fabric thus obtained is presented in Fig. 53.

Figure 51:
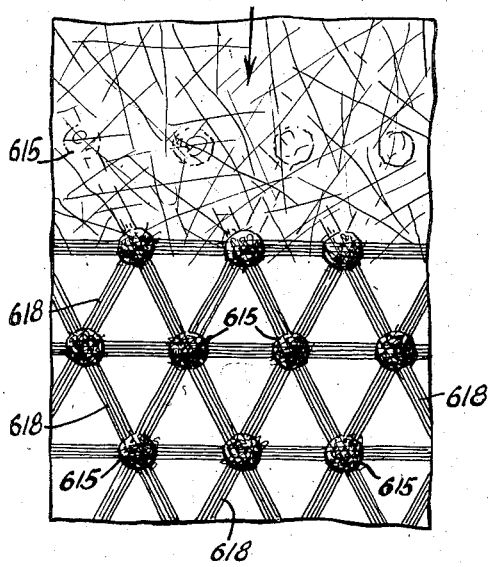
Fig. 51 is a schematic diagram showing the production of three-dimensional fabrics using a web with fibers extending in all directions, an iso web.

The use of an isotropic web as shown in Figs. 51 and 55 might be said to introduce an element of parallelism in every direction with respect to the orientation of any individual fiber, and significantly each bud structure 615 shown in those figures is joined by consolidated fibers extending to each immediately adjacent hole or bud 615 surrounding the bud in question. Referring specifically to Fig. 55, the consolidated fibers 618 radiate like spokes of a wheel to the hexagon defined by the six immediately adjacent three-dimensional bud structures. Each of the sides of the hexagon which join immediately adjacent bud structures is constituted by this same consolidation of fibers.

With regard to the geometry of the packing of the ribbons such as 618 and the production of the budded protuberances 615 in a direction perpendicular to the plane in which the consolidated ribbons of fibers lie, it is noted that the buds constitute pivot points or raised portions which impart surface softness, as well as distribute and strengthen the consolidated ribbons. As a result of the orientation provided, desirable patterned softness and strength characteristics similar to woven textile fabrics of the same weight may be obtained.

For three-dimensional fabrics, it is essential to use a rearranging screen which has a smooth surface upon which the web is to be supported and rearranged. Three-dimensional buds will be produced in the web with any sized opening and with any arrangement of openings, but voids in addition to three-dimensional buds are produced only where the distance between the openings, the size of the opening and the length of the fibers in the web are such as to enable the fibers to consolidate as bands in zones which extend between adjacent openings.

In the consolidation of fibers in adjacent zones between the three-dimensional budded structures the distribution of holes regularly spaced on the smooth plate with relation to the direction of carding of the web provides alternate geometric possibilities for the joining of adjacent fibers. For example, in a diamond pattern as illustrated in Fig. 53, the heavy consolidated fibers 617 joining adjacent three-dimensional buds 615 might in the general case be either between bud portions at a vertical apex or between bud portions 615 at opposite sides in the transverse line of the diamond. Due to the influence of the substantial parallelism of the fibers in the particular case shown, however, substantially all of the thick consolidated fiber bundles are in the form of the diamond which is in the general direction of parallelizing rather than transverse to this direction across the median line of the diamond. In addition, there is substantially no consolidation of fibers between the upper and lower apices of the diamond pattern shown in Fig. 53, resulting thereby in improved uniformity, definition and clarity of the diamond shape unmarred by diagonals between the upper and lower corners. There is, however, some consolidation between the transverse corners of the diamond.

It is, of course, understood that the above criteria are illustrative of one set of conditions for insuring proper three-dimensional budded rearrangement in accordance with the invention. It is to be understood that these conditions may be varied rather widely, depending upon the weight of the web, the speed of the web, the number and size and arrangement of openings, the rearranging criteria, nature of fibers, the velocity of the water delivered by the nozzles, the spacing of the nozzles from the web, and other variables which enter into the problems of proper web rearrangement and the matter of the avoidance of flooding at the region of the rearranging belt by insuring proper drainage of the water projected against the web assemblage.

The aforesaid conditions of belt structure and relationship, nozzle construction, water velocity and volume, and grain weight of the web, and other factors affecting three-dimensional bud fabric production, are effective for the production of a rearranged three-dimensional bud fabric from carded fibers in webs made from a mixture of for example approximately 75 percent rayon fiber and 25 percent cotton fiber.

In general, the invention lends itself for the rearrangement of fibers in webs having any orientation and wherein the nature of the fibers may vary widely.

In the foregoing description, the emphasis has been placed on making a fabric from a layer of textile-like fibers. It is to be understood that the invention is not to be limited to the production of fabrics from such layers, since the above-described method is applicable to the production of holes or openings of any desired configuration in any materials such as a coherent material which is capable of flow or movement under the influence of an applied fluid force such as the force of flowing water, gas, or other fluid. For example, the invention is applicable to the production of holes of a desired configuration in an all-paper pulp material or in a mixture of textile fibers and paper pulp material, alone, or in a mixture with a resin or other plastic material.

In the rearrangement of webs to produce the three-dimensional budded fabrics of the invention, the greatest concentration of fibers is found in the bud areas 615 as shown in the photomicrograph, Fig. 56, of a section along line 56—56 of Fig. 54. In the photomicrograph, it is seen that the fibers have been rearranged from a substantially uniform starting density to one in which the interconnecting band areas 616 have a minor concentration of the fibers and the budded portion 615 has a major concentration of the fibers.

It is thus seen that the individual fibrous elements of the web being rearranged tend to congregate or concentrate at the bud portions. This is of particular advantage in permitting modification of the bud portions by employing certain desirable additives such as particulate material in the starting web which is to be rearranged. This is caused by three things. First, the tufts constitute heavy fiber concentration points because a plurality of interconnecting bonds 616 intersect at these points. Second, the looping of fibers down into the apertures to produce the tufts consumes more fiber length than do the flat interconnecting bands in which the individual fibers lie substantially straight. Third, the fibers first swept into the apertures to form the tufts are apparently jumbled around additionally by the swirling fluid currents that follow, as these currents pass through tufts already partially formed.

As already explained, the tufted portions 615 may be bonded with adhesive applied in the form of particles. They may also be bonded by a liquid, or with a binder in the form of rods or the like as will hereinafter be described.

Figure 57:
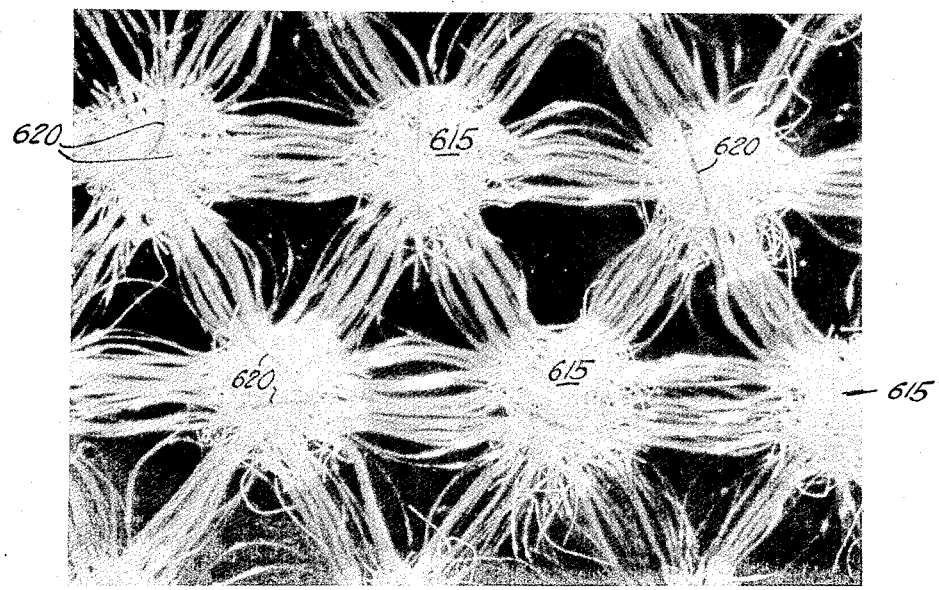
Fig. 57 is a photomicrograph at an original enlargement of approximately twenty times of the fabric illustrated schematically in Fig. 52.

As shown in Fig. 57, a small amount of adhesive rods 620 which have been included in the fiber mixture of the starting web have been congregated during web rearrangement at the bud areas 615. In this photomicrograph, the rods are $\frac{1}{32}$ inch long, 15 denier nylon. The base web is a 200 grain weight $\frac{3}{8}$ inch delustered rayon which is water-laid in an iso orientation before the three-dimensional fabric is made.

Figure 59:
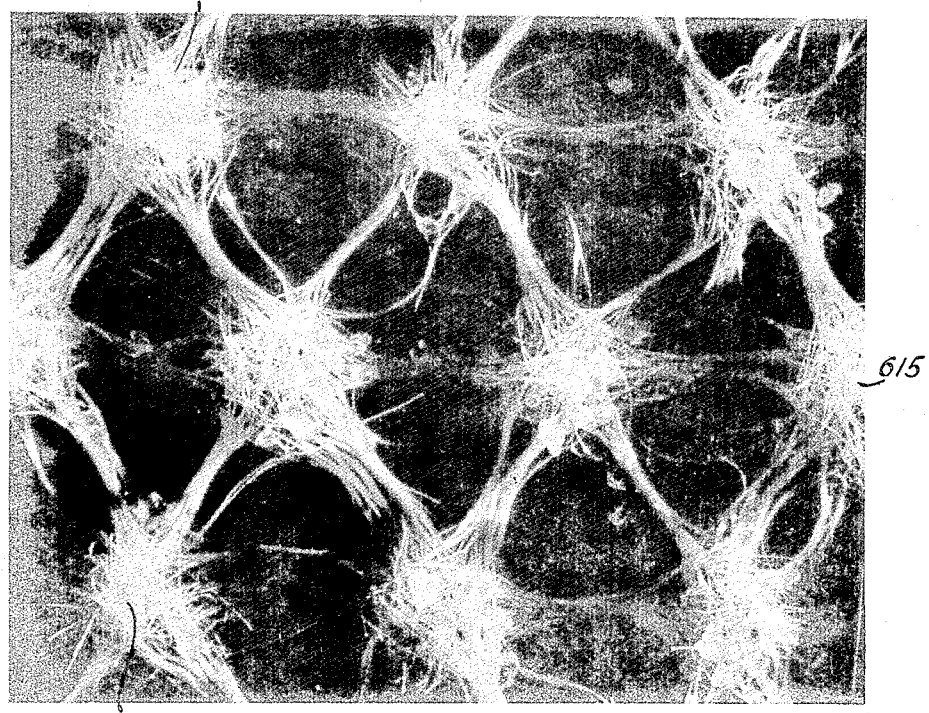
Fig. 59 is a photomicrograph at an original enlargement of approximately twenty times of the fabric as in Fig. 55 but in which adhesive particles or flakes have been sprinkled on the tuft areas and in which the particles or flakes of adhesive have been partially fused.

This same fabric produced under slightly different conditions to provide narrower bands may be treated with a powdered adhesive such as nylon powder which is sprinkled onto the back of the rearranging plate after the formation is complete. As is seen in Fig. 59, in the rearranging process the bands between bud areas 615 have been compacted and the bud areas are seen to contain adhering globules of resin. These globules result from the partial fusing of the powder adhered to the bud portions.

In particular, the apparatus which is described and illustrated in Fig. 36 is that capable of producing the fabric shown in Fig. 59.

Figure 58:
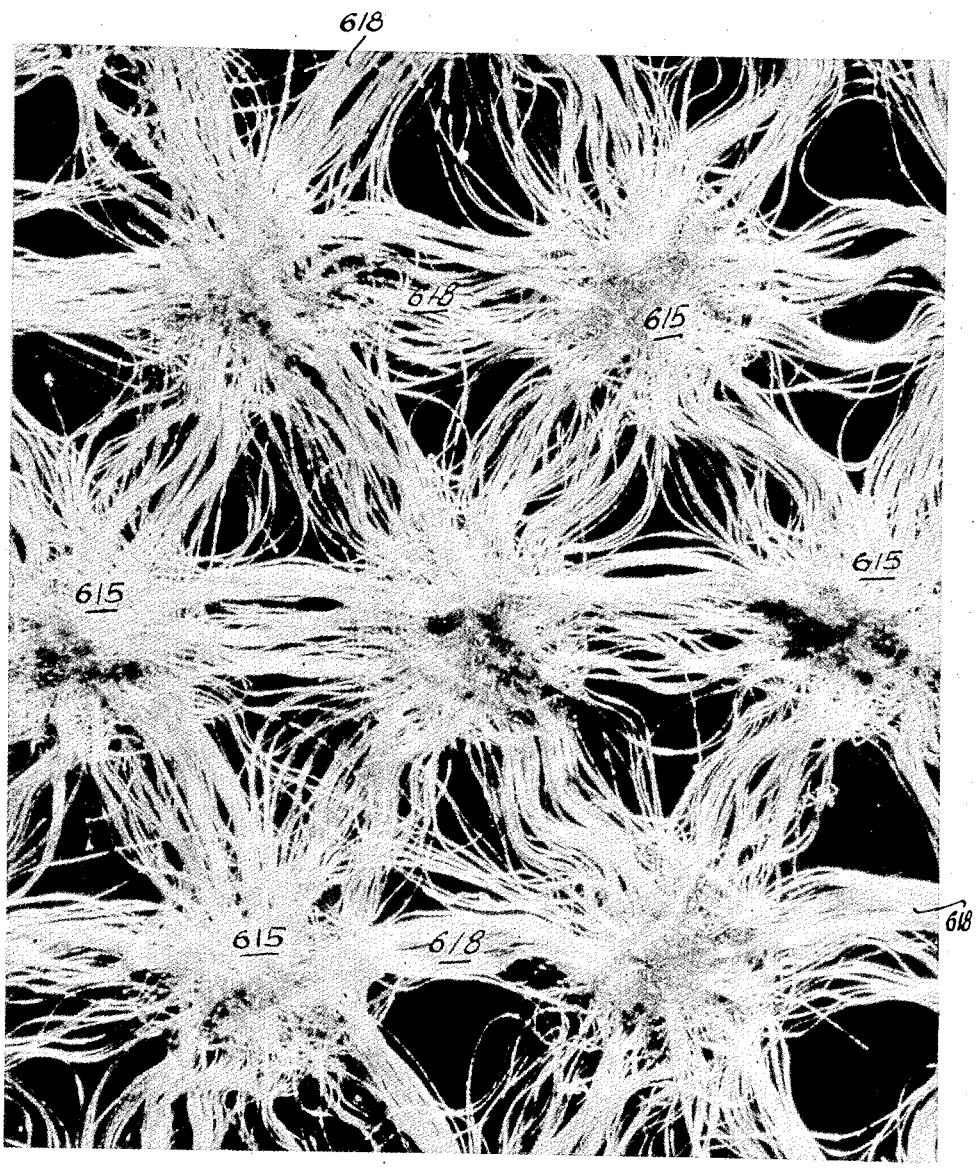
Fig. 58 is a photomicrograph at an original enlargement of approximately thirty times of the fabric shown in Fig. 57 but after the rods have been fused by heat and pressing.

In Fig. 58, the use of a larger proportion of $\frac{1}{32}$ inch 15 denier nylon rods than was employed in Fig. 57 results in the concentration of these rods in the tufted portions 615. In fact, no adhesive rods are located in any of the band areas. The rods have been fused and the fabric has been flattened in a roller. As a result, the bands 618 are spread out and there is a typical fabric-like biasability.

The rods congregate on the tufted fibers of the web rearrangement of the fibrous layer. The rods may be introduced into the starting web by a number of conventional techniques as are used for depositing or arranging fibers in a web or layer. These techniques include carding, garnetting, air laying, papermaking methods and the like. It is also possible to apply the adhesive rods onto the already prepared layer of starting material as for example, by sprinkling the rods onto a web of fibers as it issues from a web preparation means such as a card, wet formation machine and the like.

Figure 52:
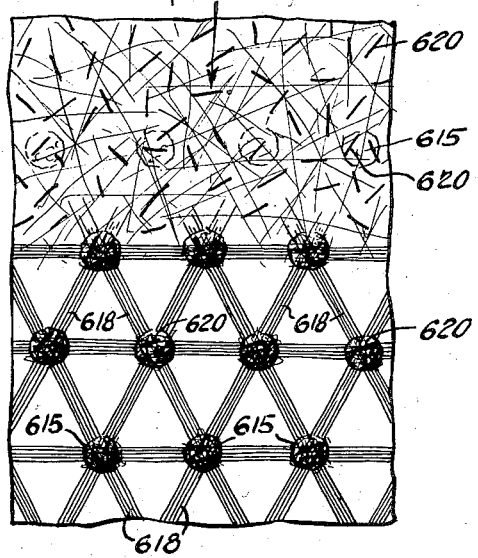
Fig. 52 is a schematic diagram as in Fig. 49 in which "rodding" (bonding) fibers are added.

The adhesive rods may be distributed in the layer during formation in carding, garnetting, and the like, by blending rods with the other fibers such as viscose rayon by conventional textile blending techniques and then carding or garnetting the blended mixture. Likewise, the fibers from such a mixture may be dispersed in an air stream and collected on foraminous means to form a layer by any of a variety of well-known techniques, although shorter rods may be used for this purpose. Rods as short as $\frac{1}{32}$ of an inch or shorter may be mixed with other fibers such as viscose rayon fibers in an aqueous slurry and then run over a papermaking screen or wire, in accordance with conventional papermaking techniques, to produce a rod-containing three-dimensional fabric as shown in Fig. 52 and Fig. 58 in accordance with this invention.

Rod length may be important both from the standpoint of effective bonding and the ease and flexibility of fiber rearrangement. The lengths of the rods which may be used are, of course, dependent upon the spatial relationship between the tufted portions of the fabric and if congregation of the rods in these tufted portions is desired during web rearrangement, the rods must be shorter than the spaces between the centers of the tufts.

Figs. 41, 42, and 43 illustrate schematically the apparatus for applying adhesive to the protuberances of the three-dimensional rearranged fabric by a kissing technique. The fiber rearrangement which has occurred on the flexible belt machine of Fig. 23 with the belts reversed as shown in Fig. 31 provides a budded fabric 293 at the exit of the flexible belt machine. The fabric is taken into the nip of positioning roller 650 and kissing roller 651 which move in the directions of the arrows as shown in Figs. 41 and 42. The protuberant bud portions 615 are spaced from the resin adhesive or other adhesive coated surface of the kissing drum 651 at such a distance that only the bud elements are wetted with adhesive while the intervening spaces or bands between the bud elements 615 are kept free of adhesive.

In Fig. 43, the enlarged view shows the action of the buds in lifting out portions of the adhesive film 654 to leave pockets 655 after contact by kissing has been made between the protuberant portions 615 and film 654. The fabric containing adhesive coated protuberant portions 615a may then be dried or it may be further heated if desired to either set the adhesive or to spread the adhesive as may be indicated in view of the particular adhesive employed. For this purpose, rolls 656 and 656' bring the web 693 through the appropriate treating zone to deliver the product to a roll 657.

The kissing roll is immersed in a resin bath 653 in container 652 and provided at one edge with a doctor blade 660 in order to control the depth of the adhesive film thereon as shown in Figs. 41 and 42.

The rolls 656 and 656' aid in drying of the fabric. They may be internally heated drying drums such as a "Yankee" type of drier drum which is used for drying paper by the paper industry.

The liquid adhesive in aqueous bath 653 may be an aqueous dispersion of polyvinyl acetate at a concentration of about 3 to 50 percent, which may be thickened as desired in order to obtain the proper consistency of the film of adhesive 654 as it passes around the kissing roller 651.

The budded protuberances of the three-dimensional fabric point outwardly as they leave the nip between rolls 260 and 249 in Fig. 41. They project sufficiently to contact or "kiss" the adhesive film 654 as shown in detail in Fig. 43.

Depending upon the dimensions of the projections from the base of the three-dimensional fabric, the resin may be thin or thick in order that the appropriate amount of resin be applied to the budded protuberances.

The kissing drum may be operated at any speed desired consistent with the physical properties of the thickened resin film and the properties of the three-dimensional fabric. Where the protuberances are formed of fibers which are strong, relatively speaking, higher speeds may be attained without impairing the structure of the protuberances. Also the thickness of the web is of importance since thinner webs may be easily stretched or torn by the action of the thickened adhesive. The viscosity of the binder is controlled by thickening agents which are well known for polyvinyl acetate suspensions or solutions or the polyvinyl acetate concentration may be adjusted to provide a suitable high viscosity. The clearance between the rolls is aided by the control of the depth of the film, which is adjusted by the knife blade.

The following are illustrative examples of methods for rearranging fabrics which utilize preferred apparatus in accordance with the invention:

*Example 1*

In apparatus as illustrated in Fig. 21 a web 135 of loosely assembled fibers, such as may be obtained by carding, weighing about 300 grains per square yard and with a fiber orientation ratio of approximately 6 to 1 in the direction of travel, is fed through the nip of a pair of feed rollers 136 and 137 into fiber rearranging apparatus as is described hereinbefore in connection with Figs. 7 through 10. The web, which may comprise 75 percent viscose rayon fibers approximately 2 inches long and 25 percent bleached cotton fibers averaging about ½ to ¾ of an inch in length, both of approximately 1½ denier, is fed over a positioning roller 138 into the sandwich formed by a foraminous belt backing screen 139 and a perforated drum 141.

The apertured drum 141 comprises about 250 substantially round holes per square inch of approximately 0.045 inch in diameter arranged in a square pattern, and has a wall approximately 1/32 of an inch thick. The foraminous belt 139 comprises a woven stainless steel screen of approximately 200 mesh or substantially 40,000 openings per square inch. Water is projected through the apertures in the drum 141 and thence through the fibrous web 135 and the screen 139 by nozzles 148 arranged radially inside the drum. The drum 141 is approximately 30 inches in diameter and the nozzles 148 are arranged in four banks approximately 6 inches from its inside surface. The nozzles are conventional solid cone nozzles in overlapping relation which are capable of delivering approximately 1.3 gallons per minute, with a water pressure inside the cylinder of approximately 90 to 100 pounds per square inch, which water pressure is suitable for use in accordance with the method and apparatus described, to produce the desired streams of water for projection against the drum.

With the drum driven at 50 feet per minute and a velocity of water leaving the nozzles at approximately 100 feet per second, an excellent continuous fabric production was obtained as in Figs. 47 and 48.

Intermittent operation under the same conditions of speed of water leaving the nozzles and the same nozzle spacing, drum size, etc., as above provided equally good results. At the highest point of wetting of the fibers in the web the web contains about 15 to 30 times its weight of water and the belt is tensioned to reduce this to about 7 to 15 times its weight of water.

After the drum rotates through the spray area and the fabric structure desired is produced, the resulting fabric, indicated by the numeral 152, is carried on the screen up over the second positioning roller 145 and through the pressure nip between the rollers 143 and 144 where its water content is decreased as has previously been described.

*Example 2*

A mixture containing 25% of paper-making fibers, 2 to 3 millimeters average length and 75% of ⅜ inch, 1.5 denier viscose rayon fibers is water-laid to provide a web having a grain weight of 250 grains per square yard and is employed in the same drum machine as in Example 1 and under the same conditions shown in Example 1. A satisfactory web structure having the same appearance and properties as the product of Example 1 is obtained.

The web is bonded into a fabric by application of an adhesive.

*Example 3*

In a belt machine illustrated in Fig. 23, a carded web of 75% viscose rayon fibers approximately 2 inches long and 25% of bleached cotton fibers averaging about ½ to ¾ of an inch in length, both viscose and cotton fibers being approximately 1½ denier having a weight of 300 grains per square yard and with a fiber orientation ratio of approximately 6 to 1 in the direction of travel is fed at a rate of 50 feet per minute into the flexible belt machine to produce the foraminated fabric structure as shown in Figs. 47 and 48. The flexible rearranging belt is thin stainless steel which is provided with about 225 openings per square inch, each opening is 0.040 inch in diameter and the flexible backing belt is nylon with 40,000 openings per square inch.

Using the solid cone nozzles which are employed in Example 1, the amount of water delivered by each nozzle is about 1.3 gallons per minute. The amount may vary from approximately .5 gallon per minute to 2 or more gallons per minute for each nozzle so as to deliver water at a rate varying from about 50 feet per second to 200 feet per second at the delivery end of the nozzle. The nozzles are spaced about 4 inches above the belt sandwich. There is provided throughout this range good fiber rearrangement in each of the three zones to produce the fabric shown in Figs. 47 and 48.

*Example 4*

With the belts reversed as shown in the modification of the apparatus illustrated in Fig. 31, a three-dimensional budded fabric is prepared with the aid of vacuum assist means or suction boxes as shown in Fig. 34 at each of the rearranging zones. The starting web of Example 1 is used and the conditions set forth in Example 3 were maintained.

With grain weights of web varying from 200 grains to 400 grains per square yard, excellent three-dimensional budded fabric structures are obtained.

The above description of this invention relates to the use of two means defining between them a forming region within which the fibers of the starting material can be rearranged by applied fluid forces. However, the invention is also useful in many cases in which only one means, a permeable backing member upon which the fibrous starting material is supported, is employed to define the rearranging region. As an example, under proper conditions a tufted three-dimensional fabric can be made employing only an apertured rearranging plate, applying water sprays directly to the fibrous layer rather than first against a foramina defining means as a dispersing screen.

In every case, the rearranging fluid forces are applied to the fibrous starting material while the material is supported on a permeable backing member having a predetermined topography and a predetermined arrangement of passages therethrough. The course followed by the fluid as it passes through the fibrous layer, and then over and through the permeable backing member upon which the fibers are supported, is determined by the topography of the backing member and by the arrangement of the passages which permit flow of fluid through the backing member. One portion of the fluid may be diverted to the left of a given protuberance or high point on the backing member, for example, while another portion is diverted to the right. These separate streams may then flow by way of separate passages through the backing member, or may in some cases be reunited to pass through the same passage, all depending upon the over-all topography of the whole backing member. The fluid passing through the fibrous starting layer and the permeable backing member supporting it is divided in the manner explained into a large number of separate streams, each following a characteristic course determined by the configuration and dimensions of the backing member.

The course followed by the applied fluid is further affected by whether the fluid is applied substantially uniformly over the entire area of the fibrous layer being processed, or is applied to only portions of the layer in a predetermined pattern. If no fluid is applied to a particular portion of the fibers and permeable backing member, no fluid stream can pass directly through the fibers and backing member in this area. This is the situation with the apparatus of Figs. 7–10 described above. As there explained, however, side currents or backwash may in some cases flow into the area from an adjacent portion of fibers against which the patterned fluid forces are directly applied. In such cases indirect fluid flow may occur even through portions of the fibers and backing member which are not directly exposed to the applied fluid forces.

The individual fibers of the fibrous starting material, being capable of movement under the influence of an applied fluid force, are rearranged by the applied fluid as it flows along the various courses determined by the factors mentioned. The individual fibers may be effectively picked up and swept along upon, or in the wake of, the various fluid streams passing through the fibrous material and backing member. A fiber so moved may be transported bodily in a single direction, or part of it may be moved in one direction while other parts or segments are moved in one or more other directions. In any event, the fiber will continue to move under the influence of various fluid streams until its further movement is stopped by the obstruction presented by the land areas of the permeable backing member that surround and define the open passages through the backing member. This is the type of movement involved in production of fabrics such as those shown in Figs. 53 to 55, for example.

On the other hand, instead of being swept along the path of various fluid streams passing through the fibrous starting material and the permeable backing member, the individual fibers in a fibrous layer against which fluid forces are applied in a predetermined pattern may be largely simply swept aside, out of the course of the onrushing streams, into quiescent zones to which no fluid forces are directly applied. Whether this is the case depends, among other things, upon the relative dimensions of the individual fibers and of the passages through the permeable backing member, the relative prominence of any protuberances upon the surface of the backing member, and the relative size of the areas to which fluid forces are directly applied in comparison to the size of the passages through the backing member. This latter type of fiber movement, it will be recognized, is the type occurring during production of fabrics such as those shown in Figs. 47 and 48.

Due to their structure and appearance and other qualities described in the foregoing paragraph, fabrics of this invention are particularly adapted for use in surgical dressing, absorbent dressings such as sanitary napkins and diapers, most suitably for covering sanitary napkins and diapers, in wiping cloths, toweling, filter materials, drapes, and lining materials, industrial base fabrics, as a substitute for gauze and gauze-like fabrics in general, and a variety of other applications.

When I use the terms "rearrange" and "rearranged," I mean the rearrangement of the fibers in a preformed web of fibrous material substantially within the plane of the web and with substantial maintenance of the original weight of the web.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

The claims are:

1. The method of producing a unitary nonwoven fabric having a patterned configuration from a layer of starting fibrous material the individual fibrous elements of which are capable of movement under applied fluid forces which comprises subjecting the said starting fibrous material to adjacent longitudinally and transversely spaced and simultaneously flowing streams of fluid particles while supporting the material upon a backing member having a predetermined topography and a predetermined arrangement of passages therethrough, to produce fluid flow along longitudinally and transversely spaced predetermined courses over and through said backing member, the particles in fluid streams which flow along adjacent ones of said courses applying to individual groups of fibers in directions parallel to the plane of said backing member, opposing components of force to overcome the friction between individual fibers in said groups and the fibers and said backing member, and to move the fibers in directions having components parallel to the plane of the backing member, so that the individual groups of fibers are packed together by the adjacent opposing components of force in a predetermined pattern throughout the fabric.

2. The method of producing a unitary non-woven fabric having a patterned configuration from a layer of starting fibrous material the individual fibrous elements of which are capable of movement under applied fluid forces which comprises subjecting the said starting fibrous material to adjacent longitudinally and transversely spaced and simultaneously flowing streams of liquid particles while supporting the material upon a backing member having a predetermined topography and a predetermined arrangement of passages therethrough, spaced some longitudinally and some transversely, to produce liquid flow along a predetermined pattern of courses over and through said backing member, the particles in said liquid streams which flow along adjacent ones of said courses applying to individual groups of fibers, in directions parallel to the plane of said backing member, opposing components of force to overcome the friction between individual fibers in said groups and the fibers and said backing member, and to move the fibers in directions having components parallel to the plane of the backing member, so that the individual groups of fibers are packed together by the adjacent opposing components of force in a predetermined pattern throughout the fabric.

3. A machine for producing a unitary foraminous fabric from a layer of starting fibrous material the individual fibrous elements of which are capable of movement under the influence of applied fluid forces, which comprises a rotatable hollow drum defining longitudinally and transversely spaced apertures arranged in a pattern, a flexible foraminous belt having foramina smaller than the apertures in the drum adapted to pass around a portion of the periphery of said drum with said layer positioned between the drum and the belt, means located inside the drum for projecting adjacent fluid streams simultaneously against the inside surface of the drum and thence through said apertures and into the said layer, and means for rotating said drum and moving said belt without relative translatory motion between them while said fluid is being projected between said apertures.

4. A machine for producing a unitary foraminous fabric from a layer of starting fibrous material the individual fibrous elements of which are capable of movement under the influence of applied fluid forces, which comprises a rotatable hollow drum defining longitudinally and transversely spaced apertures arranged in a pattern, a flexible foraminous belt having foramina smaller than the apertures in the drum adapted to pass around a portion of the periphery of said drum with said layer positioned between the drum and the belt, said belt being yieldable to provide a space between the drum and the belt, means located inside the drum for projecting adjacent fluid streams simultaneously against the inside surface of the drum and thence through said apertures and into the said layer, means for rotating said drum and moving said belt without relative translatory motions between them while said fluid is being projected through said apertures, and means for adjusting the tension of the foraminous belt to control the spacing between the drum and the belt during the time they are exposed to the action of said fluid.

5. A machine for producing a unitary foraminous fabric from a layer of starting fibrous material the individual fibrous elements of which are capable of movement under the influence of applied fluid forces, which comprises a cylinder for containing fluid under pressure having an orifice extending in a substantially axial direction, a hollow drum defining spaced apertures arranged in a pattern and mounted for rotative movement about said cylinder, a flexible foraminous belt having openings smaller than said apertures adapted to pass around a portion of the periphery of said drum to form with the periphery of said drum a zone permitting fiber rearrangement in which the layer is accommodated with one of its sides immediately adjacent the belt and the other of its sides immediately adjacent the drum, and means for moving said drum and said belt about the cylinder and past said orifice without relative translatory motion between them, whereby fluid is forced through the apertures in the drum as said apertures are moved in the way of said orifice during the rotative travel of the drum about the cylinder.

6. The method of producing a unitary nonwoven fabric having a pattern of holes from a layer of fibers in mechanical engagement with one another, which comprises positioning the layer between foraminous means and means comprising longitudinally and transversely spaced apertures larger than the openings in said foraminous means, moving fibers in registry with said apertures into the surrounding areas of said layer by projecting a fluid through said apertures and then against said layer to pass therethrough and then through said foraminous means, thereby spacing the foraminous means from the apertured means to provide a zone wherein the said movement of the fibers is permitted, while confining the layer by the said foraminous means to control the extent of movement of said fibers with respect to said apertured means, to produce a unitary fabric comprising holes of a desired size arranged substantially in accordance with the pattern of arrangement of said apertures.

7. The method of producing a unitary nonwoven fabric having a pattern of holes from a layer of fibers in mechanical engagement with one another, which comprises positioning the layer between foraminous means and means defining longitudinally and transversely spaced apertures arranged in a predetermined pattern, directing liquid against the side of said aperture defining means and thence in adjacent streams simultaneously through said apertures, said adjacent streams then passing simultaneously through the layer and said foraminous means to move the foraminous means away from the apertured means to provide a space therebetween and to move the fibers in the way of said streams aside and into the surrounding areas of said layer in the said space to produce holes in the layer corresponding in general with said pattern.

8. The method of producing a unitary nonwoven fabric having a pattern of holes from a layer of fibers in mechanical engagement with one another, which comprises positioning the layer between foraminous means and means defining longitudinally and transversely spaced apertures arranged in a predetermined pattern, projecting liquid in the form of a high velocity spray against the side of said aperture defining means and thence in adjacent streams simultaneously through said apertures, said adjacent streams then passing simultaneously through the layer and said foraminous means to move the foraminous means away from the apertured means to provide a space therebetween and to move the fibers in the way of said streams aside and into the surrounding areas of said layer in the said space to produce holes in the layer corresponding in general with said pattern.

9. The method of arranging fibers, which comprises positioning a layer of fibers between foraminous means and means defining longitudinally and transversely spaced apertures, and projecting adjacent liquid streams with force simultaneously through said longitudinally and transversely spaced apertures and then through said layer, said liquid being diverted laterally by said foraminous means and then passing therethrough to space the foraminous means from the apertured means and to compact said fibers in the portions of the spaces between said apertures.

10. In a machine for producing a unitary foraminous fabric from a layer of starting material capable of movement under the influence of applied fluid forces when positioned between a perforated means and a foraminous means having foramina smaller than the perforations in said perforated means, an interchangeable perforated means defining spaced apertures arranged in a pattern, a cantilever mounting for the perforated means including a vertical fixed supporting member and a horizontal supporting member mounted at one end in the fixed supporting member, a movable wall member, and a bearing device in the movable wall member for the other end of the supporting member, said movable wall member being swingable outwardly to provide access to said perforated means for interchangeability.

11. In a machine for producing a unitary foraminous fabric from a layer of starting material capable of movement under the influence of applied fluid forces when positioned between a perforated means and a foraminous means having foramina smaller than the perforations in said perforated means, a rotatable, hollow drum having in the drum wall spaced apertures arranged in a pattern, and a cantilevered mounting therefor including a support member for said drum and a bearing for said support member in a movable wall member, and a movable wall member which swings outwardly to provide access to said drum.

12. The method of producing a unitary patterned fabric from a layer of starting fibrous material the individual fibrous elements of which are capable of movement under the influence of an applied fluid force, which comprises positioning the starting material in a zone between fiber rearranging means defining longitudinally and transversely spaced apertures arranged in a pattern and means defining foramina smaller than said apertures, in which zone the individual fibrous elements are free to move under the influence of an applied force, and subjecting said starting material in said zone to streams of liquid particles forced into said zone through one of said means, to apply thereby a fluid force against said starting material to move individual fibrous elements in a direction generally parallel to the surface of that one of said means which is farthest from the source of said fluid force so that groups of fibers are packed together and are interconnected into a unitary fabric having a pattern generally corresponding to the pattern of said apertures, and bonding at least some of the packed groups of fibers with an adhesive.

13. The method of forming a unitary fabric having holes therein from a layer of starting fibrous material the individual fibers of which are capable of movement under the influence of applied fluid forces, which comprises supporting the starting material on means having holes throughout the area to be affected to maintain the integrity of the starting material, directing adjacent longitudinally and transversely spaced liquid streams simultaneously against the starting material, the liquid thus directed thence passing through the starting material to strike said supporting means and pass therethrough, adjacent portions of said liquid streams before passing through said supporting means being deflected thereby to exert opposing components of force parallel to said supporting means, to move fibers in individual groups of fibers, because of the adjacency of said liquid portions, out of the way of said streams and into the surrounding portions of the said layer to form the aforesaid unitary fabric.

14. The method of rearranging the fibers in a layer of a fibrous starting material the individual fibers of which are capable of movement under the influence of applied fluid forces, which comprises supporting the said starting material on means having holes, directing liquid streams against said starting material and passing the same therethrough at adjacent longitudinally and transversely spaced discontinuous regions thereof and, while said liquid streams are passing through the starting material, deflecting adjacent portions of said streams in directions to exert adjacent opposing components of force parallel to said supporting means, and moving fibers because of the adjacency of said liquid portions into individual groups of interconnected fibers, thereby forming a unitary nonwoven fabric structure having spaced openings therein.

15. The method of rearranging the fibers in a layer of a fibrous starting material the individual fibers of which are capable of movement under the influence of applied fluid forces, which comprises supporting the said starting material on means having holes, directing liquid streams against said starting material and passing the same therethrough simultaneously at adjacent longitudinally and transversely spaced discontinuous regions thereof and, while said streams are passing through the starting material, deflecting adjacent portions of said streams in directions to exert adjacent opposing components of force parallel to said supporting means and moving fibers because of the adjacency of said liquid portions into individual groups of interconnected fibers, thereby forming a unitary nonwoven fabric structure having spaced openings therein.

16. The method of rearranging the fibers in a layer of a fibrous starting material the individual fibers of which are capable of movement under the influence of applied fluid forces, which comprises supporting the said starting material on means having holes, directing fluid streams against said starting material and passing the same therethrough simultaneously at adjacent longitudinally and transversely spaced discontinuous regions thereof and, while said fluid streams are passing through the starting material, deflecting adjacent portions of said fluid streams in directions to exert adjacent opposing components of force parallel to said supporting means, and moving fibers because of the adjacency of said fluid portions into individual groups of interconnected fibers, thereby forming a unitary nonwoven fabric structure having spaced openings therein.

17. The method of rearranging the fibers in a layer of fibrous starting material whose individual fibers are capable of movement within the layer under the influence of applied fluid forces, which comprises supporting the layer locally on means having holes throughout the area to be affected to maintain its integrity, directing fluid streams against said layer from one side thereof and passing the same through the layer at a plurality of regions spaced some in a direction along the layer and others in a direction across the layer and, while said fluid is passing through the layer, deflecting portions of adjacent fluid streams out of their initial paths and in opposed directions having components generally parallel with the plane of the layer to exert, by the adjacency of the deflected portions of the said fluid streams, oppositely directed forces on individual groups of fibers of said layer to move fibers thereof simultaneously out of adjacent discontinuous regions spaced some in a longitudinal direction and others in a transverse direction and into closer proximity and increased parallelism to form individual groups of fiber segments located between said adjacent discontinuous regions without destroying the fibrous structure.

18. A method of rearranging the fibers in a layer of fibrous starting material whose individual fibers are capable of movement within the layer under the influence of applied fluid forces, which comprises supporting the layer locally on means having holes throughout the area to be affected to maintain its integrity, directing a plurality of liquid streams against the supported layer to pass the liquid through said layer, said streams as they impinge against the layer being spaced over the supported area thereof some in a direction along the layer and others in a direction across the layer, deflecting portions of adjacent streams out of their initial paths of flow and in opposed directions having components generally parallel with the plane of the layer to exert, by the adjacency of the deflected portions, oppositely directed forces on individual groups of fibers of said layer to move fibers initially in the paths of said streams into the surrounding portions of the starting material, thereby to rearrange fibers in the starting material to produce a web having an arrangement of holes, and removing at least some of the liquid from said web at the region thereof where it is supported.

19. The method of producing a nonwoven fabric containing spaced holes defined by groups of fiber segments from a layer of irregularly arranged overlapping fibers in frictional engagement with one another, said fibers being capable of movement in response to applied rearranging forces, which comprises supporting the layer locally on means having holes throughout the area to be affected to maintain its integrity; while the layer is so supported directing adjacent fluid streams to pass through said layer from one side thereof at a plurality of regions spaced some in a direction along the web and others in a direction across the web, said streams applying to individual groups of fibers in said layer fluid forces having adjacent, oppositely directed components acting parallel to the plane of the layer and other cooperating components of force, to move segments of said fibers sideways into closer proximity and increased parallelism with segments of adjacent fibers, said various components of force moving individual fibers in the direction of their respective longitudinal axes with respect to other fibers in the layer with which they overlap and are frictionally engaged so as to permit segments of said individual fibers to remain in mechanical equilibrium and in relatively unstressed condition in the most extreme lateral positions into which they are moved by said fiber rearranging forces; and continuing the application of said forces to cause segments of individual fibers to move into closer proximity and increased parallelism with adjacent fibers so as to define a plurality of holes surrounded by groups of fiber segments.

20. The method of producing a nonwoven fabric containing spaced holes defined by groups of fiber segments from a layer of irregularly arranged overlapping fibers in frictional engagement with one another, said fibers being capable of movement in response to applied rearranging forces, which comprises supporting the layer locally on means having holes throughout the area to be affected to maintain its integrity; while the layer is so supported directing adjacent liquid streams to pass through said layer from one side thereof at a plurality of regions spaced some in a direction along the web and others in a direction across the web, said streams applying to individual groups of fibers in said layer liquid forces having adjacent, oppositely directed components acting parallel to the plane of the layer and other cooperating components of force, to move segments of said fibers sideways into closer proximity and increased parallelism with segments of adjacent fibers, said various components of force moving individual fibers in the direction of their respective longitudinal axes with respect to other fibers in the layer with which they overlap and are frictionally engaged so as to permit segments of said individual fibers to remain in mechanical equilibrium and in relatively unstressed condition in the most extreme lateral positions into which they are moved by said fiber rearranging forces; and continuing the application of said forces to cause segments of individual fibers to move into closer proximity and increased parallelism with adjacent fibers so as to define a plurality of holes surrounded by groups of fiber segments.

21. The method of producing a nonwoven fabric containing spaced holes defined by groups of fiber segments from a layer of irregularly arranged overlapping fibers in frictional engagement with one another, said fibers being capable of movement in response to applied rearranging forces, which comprises supporting the layer locally on means having holes throughout the area to be affected to maintain its integrity; while the layer is so supported directing adjacent liquid streams to pass through said layer from one side thereof at a plurality of regions spaced some in a direction along the web and others in a direction across the web, said streams applying to individual groups of fibers in said layer liquid forces having adjacent, oppositely directed components acting parallel to the plane of the layer and other cooperating components of force, to move segments of said fibers sideways into closer proximity and increased parallelism with segments of adjacent fibers, said various components of force moving individual fibers in the direction of their respective longitudinal axes with respect to other fibers in the layer with which they overlap and are frictionally engaged so as to permit segments of said individual fibers to remain in mechanical equilibrium and in relatively unstressed condition in the most extreme lateral positions into which they are moved by said fiber rearranging forces; continuing the application of said forces to cause segments of individual fibers to move into closer proximity and increased parallelism with adjacent fibers so as to define a plurality of holes surrounded by groups of fiber segments; and removing at least some of the liquid from said rearranged fabric at the supporting region.

22. The method of producing a nonwoven fabric containing spaced holes defined by groups of fiber segments from a layer of irregularly arranged overlapping fibers in frictional engagement with one another, said fibers being capable of movement in response to applied rearranging forces, which comprises supporting the layer locally on means having holes throughout the area to be affected to maintain its integrity; while the layer is so supported directing adjacent liquid streams to pass through said layer from one side thereof at a plurality of regions spaced some in a direction along the web and others in a direction across the web, said streams applying to individual groups of fibers in said layer liquid forces having adjacent, oppositely directed components acting parallel to the plane of the layer and other cooperating components of force, to move segments of said fibers sideways into closer proximity and increased parallelism with segments of adjacent fibers, said various components of force moving individual fibers in the direction of their respective longitudinal axes with respect to other fibers in the layer with which they overlap and are frictionally engaged so as to permit segments of said individual fibers to remain in mechanical equilibrium and in relatively unstressed condition in the most extreme lateral positions into which they are moved by said fiber rearranging forces; continuing the application of said forces to cause segments of individual fibers to move into closer proximity and increased parallelism with adjacent fibers so as to define a plurality of holes surrounded by groups of fiber segments; removing at least some of the liquid from said rearranged fabric at the supporting region; and adhesively bonding fibers of the rearranged fabric.

23. The method of rearranging the fibers in a unitary web of fibrous starting material whose individual fibers are capable of movement within the web under the influence of applied fluid forces, which comprises supporting the web locally on means having holes throughout the area to be affected to maintain its integrity, directing fluid streams against one side of said web and passing the same through the web at a plurality of regions spaced some in a direction along the web and others in a direction across the web, while said fluid is passing through the web deflecting portions of adjacent fluid streams out of their initial paths and in opposed directions having components generally parallel with the plane of the web to exert, by the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions, without destroying the unitary nature of the fibrous structure, and exerting suction on said web on the side thereof opposite the first mentioned side to assist in the aforementioned rearrangement of fibers.

24. The method of rearranging the fibers in a unitary web of fibrous starting material whose individual fibers are capable of movement within the web under the influence of applied fluid forces, which comprises supporting the web locally on means having holes throughout the area to be affected to maintain its integrity, directing liquid streams against one side of said web and passing the same through the web at a plurality of regions spaced some in a direction along the web and others in a direction across the web and, while said liquid is passing through the web, deflecting portions of adjacent liquid streams out of their initial paths and in opposed directions having components generally parallel with the plane of the web to exert, by the adjacency of the deflected portions of said liquid streams, oppositely directed forces on individual groups of fibers of said web to move fibers of said groups out of their initial positions in the web and into closer proximity to form individual groups of fiber segments of increased parallelism defining spaced adjacent discontinuous regions, without destroying the unitary nature of the fibrous structure, and exerting suction on said web on the side thereof opposite the first mentioned side to assist in the aforementioned rearrangement of fibers and in the removal of liquid therefrom.

25. A method of rearranging the fibers in a unitary web of fibrous starting material whose individual fibers are capable of movement within the web under the influence of applied fluid forces, which comprises supporting the web locally on means having holes throughout the area to be affected to maintain its integrity, directing a plurality of liquid streams against the supported web to pass the liquid through said web, said streams as they impinge against the web being spaced over the supported area thereof some in a direction along the web and others in a direction across the web, deflecting portions of adjacent streams out of their initial paths of flow and in opposed directions having components generally parallel with the plane of the web to exert, by the adjacency of the deflected portions, oppositely directed forces on individual groups of fibers of said web to move fibers initially in the paths of said streams into the surrounding portions of the starting material, thereby to rearrange fibers in the starting material into a web having an arrangement of holes without destroying the unitary nature of the starting web, and creating a reduced pressure in the vicinity of the web in the region thereof where it is supported to assist in the rearrangement of its fibers and in the removal of liquid therefrom.

26. The method of producing a nonwoven fabric containing spaced holes defined by groups of fiber segments from a layer of irregularly arranged overlapping fibers in frictional engagement with one another, said fibers being capable of movement in response to applied rearranging forces, which comprises supporting the layer locally on means having holes throughout the area to be affected to maintain its integrity; while the layer is so supported directing adjacent liquid streams through said layer from one side thereof at a plurality of regions spaced some in a direction along the web and others in a direction across the web, said streams applying to individual groups of fibers in said layer liquid forces having adjacent, oppositely directed lateral translatory components acting parallel to the plane of the layer and other cooperating components of force, to move segments of said fibers sideways into closer proximity and increased parallelism with segments of adjacent fibers, said translatory and cooperating components of force moving individual fibers in the direction of their respective longitudinal axes with respect to other fibers in the layer with which they overlap and are frictionally engaged so as to permit segments of said individual fibers to remain in mechanical equilibrium and in relatively unstressed condition in the most extreme lateral positions into which they are moved by said fiber rearranging forces; continuing the application of said forces to cause segments of individual fibers to move into closer proximity and increased parallelism with adjacent fibers so as to define a plurality of holes surrounded by groups of fiber segments; creating a reduced pressure in the vicinity of the web in the region thereof where it is supported to assist in the rearrangement of its fibers and in the removal of liquid therefrom.

27. A method of producing a unitary patterned fabric from a layer of starting fibrous material whose individual fibrous elements are capable of movement under the influence of an applied fluid force, which comprises positioning the starting material in a zone between fiber rearranging means defining longitudinally and transversely spaced apertures arranged in a pattern and means defining foramina smaller than said apertures, in which zone the individual fibrous elements are free to move under the influence of an applied fluid force, and subjecting said starting material in said zone to streams of liquid particles forced into said zone through one of said means and withdrawn by suction from said zone through the other of said means to apply thereby a fluid force against said starting material to move individual fibrous elements in a direction generally parallel to the surface of that one of said means which is closest to the source of suction so that groups of fibers are packed together and are interconnected into a unitary fabric having a pattern generally corresponding to the pattern of said apertures, and bonding at least some of the packed groups of fibers with an adhesive.

28. The method of rearranging the fibers in a unitary web of fibrous starting material whose individual fibers are capable of movement within the web under the influence of applied fluid forces, which comprises sandwiching the web between, and with its opposite sides closely adjacent to, opposed confining surfaces, one having foramina and the other a pattern of apertures and between them defining a rearranging zone in which the web is locally supported throughout the area to be affected to maintain its overall integrity while permitting relative fiber movement within the web, said apertures being of larger size than said foramina and adjacently spaced in accordance with said pattern some in a direction longitudinally of said area and some in a direction transversely of said area, and moving fibers from individual groups thereof out of their initial positions in the web and into closer proximity to form individual groups of fiber segments of increased parallelism defining spaced adjacent discontinuous regions in the web, without destroying the unitary nature of the fibrous structure, said movement of the fibers being effected by passing streams of fluid into the zone through the passageways provided in one zone-defining surface and out of the zone through the passageways provided in the other zone-defining surface, and, while the said fluid streams are in said zone, by deflecting portions of adjacent ones of said fluid streams in opposed directions having components generally parallel with the plane of the web to exert, because of the adjacency of said deflected portions, oppositely directed forces on the fibers in adjacent ones of said discontinuous regions.

29. The method of rearranging the fibers in a unitary web of fibrous starting material whose individual fibers are capable of movement within the web under the influence of applied fluid forces, which comprises sandwiching the web between, and with its opposite sides closely adjacent to, opposed confining surfaces, one having foramina and the other a pattern of apertures and between them defining a rearranging zone in which the web is locally supported throughout the area to be affected to maintain its overall integrity while permitting relative fiber movement within the web, said apertures being of larger size than said foramina and adjacently spaced in accordance with said pattern some in a direction longitudinally of said area and some in a direction transversely of said area, and moving fibers from individual groups thereof out of their initial positions in the web and into closer proximity to form individual groups of fiber segments of increased parallelism defining spaced adjacent discontinuous regions in the web, without destroying the unitary nature of the fibrous structure, said movement of the fibers being effected by passing streams of fluid into the zone through the passageways provided by the apertures and out of the zone through the passageways provided by the foramina, and, while the said fluid streams are in said zone, by deflecting portions of adjacent ones of said fluid streams in opposed directions having components generally parallel with the plane of the web to exert, because of the adjacency of such deflected portions, oppositely directed forces on the fibers in adjacent ones of said discontinuous regions.

30. The method of rearranging the fibers in a unitary web of fibrous starting material whose individual fibers are capable of movement within the web under the influence of applied fluid forces, which comprises sandwiching the web between, and with its opposite sides closely adjacent to, opposed confining surfaces, one having foramina and the other a pattern of apertures and between them defining a rearranging zone in which the web is locally supported throughout the area to be affected to maintain its overall integrity while permitting relative fiber movement within the web, said apertures being of larger size than said foramina and adjacently spaced in accordance with said pattern some in a direction longitudinally of said area and some in a direction transversely of said area, and moving fibers from individual groups thereof out of their initial positions in the web and into closer proximity to form individual groups of fiber segments of increased parallelism defining spaced adjacent discontinuous regions in the web, without destroying the unitary nature of the fibrous structure, said movement of the fibers being effected by passing streams of fluid into the zone through the passageways provided by the foramina and out of the zone through the passageways provided by the apertures, and, while the said fluid streams are in said zone, by deflecting adjacent portions of adjacent ones of said fluid streams in opposed directions having components generally parallel with the plane of the web to exert, because of the adjacency of such deflected portions, oppositely directed forces on the fibers in adjacent ones of said discontinuous regions.

31. The method of rearranging the fibers in a unitary web of fibrous starting material whose individual fibers are capable of movement within the web under the influence of applied fluid forces, which comprises sandwiching the web between, and with its opposite sides closely adjacent to, opposed confining surfaces, one having foramina and the other a pattern of apertures and between them defining a rearranging zone in which the web is locally supported throughout the area to be affected to maintain its overall integrity while permitting relative fiber movement within the web, said apertures being of larger size than the said foramina and adjacently spaced in accordance with said pattern some in a direction longitudinally of said area and some in a direction transversely of said area, and moving fibers from individual groups thereof out of their initial positions in the web and into closer proximity to form individual groups of fiber segments of increased parallelism defining spaced adjacent discontinuous regions in the web, without destroying the unitary nature of the fibrous structure, said movement of the fibers being effected by directing streams of fluid towards the web from one side of the zone and by reducing the pressure at the opposite side of said zone by the aid of suction, thereby causing the fluid streams to pass into the zone, through the passageways provided in one zone-defining surface and out of the zone through the passageways provided in the other zone-defining surface, and, while the said fluid streams are in said zone, by deflecting adjacent portions of said fluid streams in opposed directions having components generally parallel with the plane of the web to exert, because of the adjacency of said deflected portions, oppositely directed forces in the fibers in said discontinuous groups of fibers.

32. The method of rearranging the fibers in a unitary web of fibrous starting material whose individual fibers are capable of movement within the web under the influence of applied fluid forces, which comprises sandwiching the web between, and with its opposite sides closely adjacent to, opposed confining surfaces, one having foramina and the other a pattern of apertures and between them defining a rearranging zone in which the web is locally supported throughout the area to be affected to maintain its overall integrity while permitting relative fiber movement within the web, said apertures being of larger size than the said foramina and spaced in accordance with said pattern some in a direction longitudinally of said area and some in a direction transversely of said area, and moving fibers from groups thereof out of their initial positions in the web some into closer proximity to form individual groups of fiber segments of increased parallelism defining spaced adjacent discontinuous regions in the web and some into groups of fibers packed together in the vicinity of said apertures and interconnecting said groups of fiber segments, without destroying the unitary nature of the fibrous structure, said movement of the fibers being effected by directing streams of fluid towards one side of said zone through the foramina and by reducing the pressure at the opposite side of the said zone by the aid of suction exerted through said apertures, thereby causing the fluid streams to pass into said zone through the passageways provided by the foramina and out of said zone through the passageways provided by said apertures, and, while the said fluid streams are in said zone, by deflecting adjacent portions of said fluid streams on their way to the apertures in opposed directions having components generally parallel with the plane of the web to exert, because of the adjacency of said deflected portions, oppositely directed forces on the fibers in said discontinuous groups of fibers.

33. The method of rearranging the fibers in a unitary web of fibrous starting material whose individual fibers are capable of movement within the web under the influence of applied fluid forces, which comprises sandwiching of the web between, and with its opposite sides closely adjacent to, opposed confining surfaces, one having foramina and the other a pattern of apertures and between them defining a rearranging zone in which the web is locally supported throughout the area to be affected to maintain its overall integrity while permitting relative fiber movement within the web, said apertures being of larger size than said foramina and adjacently spaced in accordance with said pattern some in a direction longitudinally of said area and some in a direction transversely of said area, and moving fibers from individual groups thereof out of their initial positions in the web and into closer proximity to form individual groups of fiber segments of increased parallelism defining spaced adjacent discontinuous regions in the web, without destroying the unitary nature of the fibrous structure, said movement of the fibers being effected by passing streams of liquid into the zone through the passageways provided in one zone-defining surface and out of the zone through the passageways provided in the other zone-defining surface, and, while the said liquid streams are in said zone, by deflecting portions of adjacent ones of said liquid streams in opposed directions having components generally parallel with the plane of the web to exert, because of the adjacency of said deflected portions, oppositely directed forces on the fibers in adjacent ones of said discontinuous regions.

34. The method of rearranging the fibers in a unitary web of fibrous starting material whose individual fibers are capable of movement within the web under the influence of applied fluid forces, which comprises sandwiching the web between, and with its opposite sides closely adjacent to, opposed confining surfaces, one having foramina and the other a pattern of apertures and between them defining a rearranging zone in which the web is locally supported throughout the area to be affected to maintain its overall integrity while permitting relative fiber movement within the web, said apertures being of larger size than said foramina and adjacently spaced in accordance with said pattern some in a direction longitudinally of said area and some in a direction transversely of said area, and moving fibers from individual groups thereof out of their initial positions in the web and into closer proximity to form individual groups of fiber segments of increased parallelism defining spaced adjacent discontinuous regions in the web, without destroying the unitary nature of the fibrous structure, said movement of the fibers being effected by passing streams of liquid into the zone through the passageways provided by the apertures and out of the zone through the passageways provided by the foramina, and, while the said liquid streams are in said zone, by deflecting portions of adjacent ones of said liquid streams in opposed directions having components generally parallel with the plane of the web to exert, because of the adjacency of such deflected portions, oppositely directed forces on the fibers in adjacent ones of said discontinuous regions.

35. The method of rearranging the fibers in a unitary web of fibrous starting material whose individual fibers are capable of movement within the web under the influence of applied fluid forces, which comprises sandwiching the web between, and with its opposite sides closely adjacent to, opposed confining surfaces, one having foramina and the other a pattern of apertures and between them defining a rearranging zone in which the web is locally supported throughout the area to be affected to maintain its overall integrity while permitting relative fiber movement within the web, said apertures being of larger size than said foramina and adjacently spaced in accordance with said pattern some in a direction longitudinally of said area and some in a direction transversely of said area, and moving fibers from individual groups thereof out of their initial positions in the web and into closer proximity to form individual groups of fiber segments of increased parallelism defining spaced adjacent discontinuous regions in the web, without destroying the unitary nature of the fibrous structure, said movement of the fibers being effected by passing streams of liquid into the zone through the passageways provided by the foramina and out of the zone through the passageways provided by the apertures, and, while the said liquid streams are in said zone, by deflecting adjacent portions of adjacent ones of said liquid streams in opposed directions having components generally parallel with the plane of the web to exert, because of the adjacency of such deflected portions, oppositely directed forces on the fibers in adjacent ones of said discontinuous regions.

36. The method of rearranging the fibers in a unitary web of fibrous starting material whose individual fibers are capable of movement within the web under the influence of applied fluid forces, which comprises sandwiching the web between, and with its opposite sides closely adjacent to, opposed confining surfaces, one having foramina and the other a pattern of apertures and between them defining a rearranging zone in which the web is locally supported throughout the area to be affected to maintain its overall integrity while permitting relative fiber movement within the web, said apertures being of larger size than the said foramina and adjacently spaced in accordance with said pattern some in a direction longitudinally of said area and some in a direction transversely of said area, and moving fibers from individual groups thereof out of their initial positions in the web and into closer proximity to form individual groups of fiber segments of increased parallelism defining spaced adjacent discontinuous regions in the web, without destroying the unitary nature of the fibrous structure, said movement of the fibers being effected by directing streams of liquid towards the web from one side of the zone and by reducing the pressure at the opposite side of said zone by the aid of suction thereby causing the liquid streams to pass into the zone, through the passageways provided in one zone-defining surface and out of the zone through the passageways provided in the other zone-defining surface, and, while the said liquid streams are in said zone, by deflecting adjacent portions of said liquid streams in opposed directions having components generally parallel with the plane of the web to exert, because of the adjacency of said deflected portions, oppositely directed forces in the fibers in said discontinuous groups of fibers.

37. The method of rearranging the fibers in a unitary web of fibrous starting material whose individual fibers are capable of movement within the web under the influence of applied fluid forces, which comprises sandwiching the web between, and with its opposite sides closely adjacent to, opposed confining surfaces, one having foramina and the other a pattern of apertures and between them defining a rearranging zone in which the web is locally supported throughout the area to be affected to maintain its overall integrity while permitting relative fiber movement within the web, said apertures being of larger size than the said foramina and spaced in accordance with said pattern some in a direction longitudinally of said area and some in a direction transversely of said area, and moving fibers from groups thereof out of their initial positions in the web some into closer proximity to form individual groups of fiber segments of increased parallelism defining spaced adjacent discontinuous regions in the web and some into groups of fibers packed together in the vicinity of said apertures and interconnecting said groups of fiber segments, without destroying the unitary nature of the fibrous structure, said movement of the fibers being effected by directing streams of liquid towards one side of the zone through the foramina and by reducing the pressure at the opposite side of the said zone by the aid of suction exerted through said apertures, thereby causing the liquid streams to pass into said zone through the passageways provided by the foramina and out of said zone through the passageways provided by said apertures, and, while the said liquid streams are in said zone, by deflecting adjacent portions of said liquid streams on their way to the apertures in opposed directions having components generally parallel with the plane of the web to exert, because of the adjacency of said deflected portions, oppositely directed forces on the fibers in said discontinuous groups of fibers.

38. The method of forming a unitary fabric having holes therein from a layer of fibrous starting material the individual fibers of which are capable of movement under the influence of applied fluid forces, which comprises introducing the layer between flexible foraminous means and means defining longitudinally and transversely spaced apertures larger than the openings in said foraminous means, directing fluid streams simultaneously through said apertures and thence through the said layer to strike said flexible foraminous means and push the same away from said aperture-defining means to provide a fiber rearranging zone and to deflect portions of said fluid in directions having components parallel to said foraminous means to move fibers from the regions in said zone adjacent said apertures and into surrounding portions of the layer, and passing portions of said fluid through the said foraminous means.

39. The method of forming a unitary fabric having holes therein from a layer of fibrous starting material the individual fibers of which are capable of movement under the influence of applied fluid forces, which comprises introducing the layer between flexible foraminous means and means defining longitudinally and transversely spaced apertures larger than the openings in said foraminous means, directing liquid streams simultaneously through said apertures and thence through the said layer to strike said flexible foraminous means and push the same away from said aperture-defining means to provide a fiber rearranging zone and to deflect portions of said liquid in directions having components parallel to said foraminous means to move fibers from the regions in said zone adjacent said apertures and into surrounding portions of the layer, and passing portions of said liquid through the said foraminous means.

40. The method of forming a unitary fabric having a pattern of holes therein from a layer of fibrous starting material the individual fibers of which are capable of movement under the influence of applied fluid forces, which comprises introducing the said layer in a zone located in a space permitting fiber rearrangement between means defining longitudinally and transversely spaced apertures and means defining foramina smaller than said apertures, directing fluid streams simultaneously through said apertures and thence through the layer while the same is in said zone, and deflecting portions of said fluid in directions having components parallel to said foraminous means to move fibers from the regions in said zone adjacent said apertures and into surrounding portions of the layer.

41. The method of forming a unitary fabric having a pattern of holes therein from a layer of fibrous starting material the individual fibers of which are capable of movement under the influence of applied fluid forces, which comprises introducing the said layer in a zone permitting fiber rearrangement between means defining longitudinally and transversely spaced apertures and means defining foramina smaller than said apertures, and directing liquid streams simultaneously through said apertures and thence through the layer while the same is in said zone, and deflecting portions of said liquid in directions having components parallel to said foraminous means to move fibers from the regions in said zone adjacent said apertures and into the surrounding portions of the layer.

42. The method of forming a unitary nonwoven fabric having a pattern of holes from a layer of fibrous starting material the individual fibers of which are capable of movement under the influence of applied fluid forces, which comprises introducing the said layer between foraminous means and means defining longitudinally and transversely spaced apertures larger than the openings in said foraminous means, said foraminous means and said aperture defining means being spaced to provide a fiber rearranging zone wherein limited movement of fibers is permitted, directing liquid in the form of a high velocity spray from a plurality of nozzles against the aperture-defining means and thence through said apertures in longitudinally and transversely spaced, simultaneously flowing streams, said streams then passing through the layer and said foraminous means, whereby the fibers in the way of said streams will be moved aside and into the surrounding areas of said layer to form holes in the layer corresponding in general with the pattern of arrangement of said apertures.

43. The method of forming a unitary nonwoven fabric having a pattern of holes from a layer of fibrous starting material the individual fibers of which are capable of movement under the influence of applied fluid forces, which comprises introducing the said layer between foraminous means and means defining longitudinally and transversely spaced apertures larger than the openings in said foraminous means, said foraminous means and said aperture defining means being spaced to provide a fiber rearranging zone wherein limited movement of fibers is permitted, directing liquid traveling in a fixed path at a relatively high velocity against the aperture-defining means and thence through said apertures in longitudinally and transversely spaced, simultaneously flowing streams, said streams then passing through the layer and said foraminous means, whereby the fibers in the way of said streams will be moved aside and into the surrounding areas of said layer to form holes in the layer corresponding in general with the pattern of arrangement of said apertures.

44. A machine for forming a unitary fabric having holes therein from a web of fibrous starting material whose fibers are capable of movement within the web under the influence of applied fluid forces, which comprises a member having holes for supporting on one side thereof a web of such fibrous starting material and means for directing adjacent fluid streams simultaneously against said starting material thus supported and for passing the same through said material at a plurality of adjacent regions spaced some in a longitudinal direction and others in a transverse direction, and means including the supporting member and cooperating with the holes thereof to deflect portions of said adjacent fluid streams simultaneously to exert oppositely directed forces on individual groups of fibers of said web because of the adjacency of said deflected portions, said oppositely directed forces serving as they act simultaneously upon the web to move fibers thereof into closer proximity and increased parallelism to form individual groups of fiber segments defining spaced adjacent discontinuous regions in the web.

45. A machine for forming a unitary fabric having holes therein from a web of fibrous starting material whose fibers are capable of movement within the web under the influence of applied fluid forces, which comprises a member having holes for supporting on one side thereof a web of such fibrous starting material and means for directing adjacent spaced streams of a liquid simultaneously against said starting material thus supported and for passing the same through said material at a plurality of adjacent discontinuous regions spaced some in a longitudinal direction and others in a transverse direction, and means including the supporting member and cooperating with the holes thereof to deflect portions of said adjacent fluid streams simultaneously to exert oppositely directed forces on individual groups of fibers of said web because of the adjacency of said deflected portions, said oppositely directed forces serving as they act simultaneously upon the web to move fibers thereof into closer proximity and increased parallelism to form individual groups of fiber segments defining spaced adjacent discontinuous regions in the web.

46. A machine for forming a unitary fabric having holes therein from a web of fibrous starting material whose fibers are capable of movement within the web under the influence of applied fluid forces, which comprises a member having holes for supporting on one of its sides a web of such fibrous material, devices for directing adjacent fluid streams simultaneously against the supported web to pass into and through said web at adjacent regions spaced some in a longitudinal direction and others in a transverse direction, and means including the supporting member and cooperating with the holes thereof to deflect portions of said adjacent fluid streams simultaneously to exert oppositely directed forces on individual groups of fibers of said web because of the adjacency of said deflected portions, at a plurality of regions spaced some in a direction along the web and others in a direction across the web, said oppositely directed forces serving as they act simultaneously upon the web to move fibers thereof into closer proximity and increased parallelism to form individual groups of fiber segments defining spaced adjacent discontinuous regions in the web.

47. A machine for forming a unitary fabric having holes therein from a web of fibrous starting material whose fibers are capable of movement within the web under the influence of applied fluid forces, which comprises a member having holes for supporting on one of its sides a web of such fibrous material, devices for directing longitudinally and transversely spaced adjacent liquid streams simultaneously against the supported web to pass into and through said web, at adjacent regions spaced some in a longitudinal direction and others in a transverse direction and means including the supporting member and cooperating with the holes thereof to deflect portions of said adjacent liquid streams simultaneously to exert oppositely directed forces on individual groups of fibers of said web at the said adjacent regions because of the adjacency of said deflected portions, said oppositely directed forces serving as they act simultaneously upon the web to move fibers thereof into closer proximity and increased parallelism to form individual groups of fiber segments defining spaced adjacent discontinuous regions in the web.

48. A machine for forming a unitary fabric having holes therein from a web of fibrous starting material whose fibers are capable of movement within the web under the influence of applied fluid forces, which comprises a member having holes for supporting on one side thereof a web of such fibrous material, devices for directing adjacent fluid streams simultaneously initially toward that side of the said supporting member adapted to support the web to cause the fluid to pass through a web thus supported at adjacent regions spaced some in a longitudinal direction and others in a transverse direction, and means including the said supporting member for deflecting some of the fluid of the said streams directed against the web in opposing lateral directions with respect to the initial direction of the fluid simultaneously at a plurality of discontinuous regions spaced some in a longitudinal direction and others in a transverse direction, to exert oppositely directed forces on individual groups of fibers of said web by the adjacency of the fluid streams, thereby to rearrange fibers in the starting material into a web having an arrangement of holes.

49. A machine for forming a unitary fabric having holes therein from a web of fibrous starting material whose fibers are capable of movement within the web under the influence of applied fluid forces, which comprises a member having holes for supporting on one side thereof a web of such fibrous material, a plurality of adjacent nozzles arranged in spaced relation with the said supporting member for directing adjacent liquid streams simultaneously initially toward the side of the said supporting member adapted to support the web and with force to cause the liquid to pass through a web thus supported at adjacent regions spaced some in a longitudinal direction and others in a transverse direction, and means including the said supporting member for deflecting some of the liquid of the said streams directed against the web in opposing lateral directions with respect to the initial direction of the liquid at a plurality of discontinuous regions spaced some in a longitudinal direction and others in a transverse direction, to exert oppositely directed forces on individual groups of fibers of said web by the adjacency of the liquid streams, thereby to rearrange fibers in the starting material into a web having an arrangement of holes.

50. A machine for forming a unitary fabric having holes therein from a web of fibrous starting material whose fibers are capable of movement within the web under the influence of applied fluid forces, which comprises a member having holes for supporting on one of its sides a web of such fibrous material, devices including some for directing adjacent fluid streams against the supported web at one side thereof and others for exerting suction on the supported web at the opposite side thereof to cause said fluid to pass into and through the web, and means including the supporting member and cooperating with the holes thereof to deflect portions of said adjacent fluid streams simultaneously to exert oppositely directed forces on individual groups of fibers of said web because of the adjacency of said deflected portions, at a plurality of regions spaced some in a direction along the web and others in a direction across the web, said oppositely directed forces serving as they act upon the web simultaneously to move fibers thereof into closer proximity and increased parallelism to form individual groups defining spaced adjacent discontinuous regions in the web.

51. A machine for forming a unitary foraminous fabric from a layer of fibrous starting material the individual fibers of which are capable of movement under the influence of applied fluid forces when positioned between the following first two means, which comprises means defining longitudinally and transversely spaced apertures, foraminous backing means having openings smaller in size than said apertures, and means for directing a fluid simultaneously through said longitudinally and transversely spaced apertures, means providing a fiber rearranging zone between said foraminous backing means and said aperture-defining means in which movement of deflected fluid and fibers from the regions in said zone adjacent said apertures into surrounding portions of said zone is permitted, to form the aforesaid unitary fabric structure, while free movement of said fluid and fibers which would result in destruction of the said fabric structure is prevented.

52. A machine for forming a unitary foraminous fabric from a layer of fibrous starting material the individual fibers of which are capable of movement under the influence of applied fluid forces when positioned between the following first two means, which comprises means defining longitudinally and transversely spaced apertures, foraminous backing means having openings smaller in size than said apertures, and means for directing a fluid through said apertures, said foraminous backing means being capable of being spaced from said aperture-defining means to provide a fiber rearranging zone in which movement of deflected fluid and fibers from the regions in said zone adjacent said apertures into surrounding portions of said zone is permitted, to form the aforesaid unitary fabric structure, while free movement of said fluid and fibers which would result in destruction of the said fabric structure is prevented, and tensioning means for controlling the spacing between said foraminous backing means and said aperture-defining means as aforesaid.

53. A machine for forming a unitary fabric having holes from a layer of starting material the individual fibers of which are capable of movement under the influence of applied fluid forces, which comprises a rotatable hollow drum defining longitudinally and transversely spaced apertures in the drum surface, a flexible foraminous belt having openings smaller than said apertures, said belt passing around a portion of the periphery of said drum, said belt and drum being adapted to receive the said layer therebetween, said belt being adapted throughout an area corresponding to an area of the drum including both longitudinally and transversely spaced apertures to be moved away from said drum surface under the influence of an applied fluid force to provide a fiber rearranging space between said belt and said drum of substantially corresponding area, means located inside the drum for directing fluid against the inside surface of the drum and thence through said apertures and against the said layer and said belt to provide the said fiber rearranging space and to form the said fabric, and means for rotating said drum and moving said belt without relative translatory motion between them while said fluid is being projected through said apertures.

54. A machine for forming a unitary fabric having holes therein from a web of fibrous starting material whose fibers are capable of movement within the web under the influence of applied fluid forces, which comprises a foraminous member for supporting on one side thereof a web of such fibrous material, devices for directing fluid initially toward that side of the foraminous supporting member adapted to support the web to cause the fluid to pass through a web thus supported and to impinge against the foraminous supporting member, and a perforated plate having a plurality of apertures spaced some in a longitudinal direction and others in a transverse direction interposed in the path of the fluid and located with respect to the foraminous supporting member such that a web when supported on said member is sandwiched between said member and said plate, the apertures in said plate being larger than the openings in said foraminous supporting member, said foraminous supporting member and said perforated plate cooperating to divert some of the fluid impinging against the foraminous supporting member in lateral directions with respect to the initial direction of the fluid, and to present a zone between the foraminous supporting member and the perforated plate in the vicinity of the spaced apertures and whose area incorporates apertures in the plate spaced both in a longitudinal direction and in a transverse direction, thereby enabling fiber rearrangement in the zone under the influence of the fluid diverted in such lateral directions.

55. A machine for forming a unitary fabric having holes therein from a web of fibrous starting material whose fibers are capable of movement within the web under the influence of applied fluid forces, which comprises a foraminous member for supporting on one side thereof a web of such fibrous material, devices for directing liquid initially toward that side of the foraminous supporting member adapted to support the web to cause the liquid to pass through a web thus supported and to impinge against the foraminous supporting member, and a perforated plate having a plurality of apertures spaced some in a longitudinal direction and others in a transverse direction interposed in the path of the liquid and located with respect to the foraminous supporting member such that a web when supported on said member is sandwiched between said member and said plate, the apertures in said plate being larger than the openings in said foraminous supporting member, said foraminous supporting member and said perforated plate cooperating to divert some of the liquid impinging against the foraminous supporting member in lateral directions with respect to the initial direction of the liquid, and said foraminous supporting member being yieldable to present a zone between the foraminous supporting member and the perforated plate in the vicinity of the spaced apertures and whose area incorporates apertures in the plate spaced both in a longitudinal direction and in a transverse direction, thereby enabling fiber rearrangement in the zone under the influence of the liquid diverted in such lateral directions.

56. A machine for forming a unitary fabric having holes therein from a web of fibrous starting material whose fibers are capable of movement within the web under the influence of applied fluid forces, which comprises a foraminous member for supporting on one side thereof a web of such fibrous material, devices for directing liquid initially toward that side of the foraminous supporting member adapted to support the web to cause the liquid to pass through a web thus supported and to impinge against the foraminous supporting member, and a perforated plate having a plurality of apertures spaced some in a longitudinal direction and others in a transverse direction located with said plurality of apertures simultaneously in the path of the liquid and with respect to the foraminous supporting member such that a web when supported on said member is sandwiched between said member and said plate, the apertures in said plate being larger than the openings in said foraminous supporting member, said foraminous supporting member and said perforated plate cooperating to divert some of the liquid impinging against the foraminous supporting member in lateral directions with respect to the initial direction of the liquid, and said foraminous supporting member being yieldable to present a zone between the foraminous supporting member and the perforated plate in the vicinity of the spaced apertures enabling fiber rearrangement therein under the influence of the liquid diverted in such lateral directions, and means for controlling the yieldability of said supporting member.

57. A machine for forming a unitary fabric having holes therein from a web of fibrous starting material whose fibers are capable of movement within the web under the influence of applied fluid forces, which comprises a foraminous member for supporting on one side thereof a web of such fibrous material, a perforated plate having a plurality of apertures spaced some in a longitudinal direction and others in a transverse direction and located with respect to the foraminous supporting member such that a web when supported on said member is sandwiched between said member and said plate, the apertures in said plate being larger than the openings in said foraminous supporting member, devices for directing streams of liquid in a given direction, and means for moving the foraminous member and the perforated plate as a unit without relative translatory motion between them past said stream projecting devices in manner such as to permit streams issuing from said devices to be projected through said apertures and to impinge against said foraminous member, said foraminous supporting member and said perforated plate cooperating to divert some of the liquid impinging against the foraminous member in lateral directions with respect to the direction of liquid flow through said apertures, and said foraminous supporting member being yieldable under the influence of the liquid flow throughout an area corresponding to an area of the plate including apertures spaced both in a longitudinal and in a transverse direction to present a zone between the foraminous supporting member and the perforated plate wherein the fibers in a fibrous web of starting material supported by the foraminous member may be rearranged.

58. A machine for forming a unitary fabric having holes therein from a web of fibrous starting material whose fibers are capable of movement within the web under the influence of applied fluid forces, which comprises a rotatable hollow drum defining apertures in the drum surface spaced some in a longitudinal direction and others in a transverse direction, a flexible foraminous belt arranged to pass around a portion of the periphery of said drum with a web of said material positioned between the drum and the belt, the apertures in said drum being larger than the openings in said belt, means located inside the drum for directing liquid against the inside surface of the drum and thence through said apertures, and means for rotating said drum and moving said belt without relative translatory motion between them while said liquid is being projected through said apertures, said flexible foraminous belt and said hollow drum being arranged to divert some of the liquid that passes through said apertures in lateral direction with respect to its direction of flow through said apertures, and said flexible foraminous belt being yieldable under the influence of liquid flowing simultaneously through a group of said apertures spaced both in a longitudinal and in a transverse direction to provide a zone between the said belt and the said drum for fiber rearrangement therein by said laterally diverted liquid.

59. A machine for forming a unitary fabric having holes therein from a web of fibrous starting material whose fibers are capable of movement under the influence of applied fluid forces, which comprises a rotatable hollow drum defining apertures in the drum surface spaced some in a longitudinal direction and others in a transverse direction, a flexible foraminous belt arranged to pass around a portion of the periphery of said drum with a web of said material positioned between the drum and the belt, the apertures in said drum being larger than the openings in said belt, means located inside the drum for directing liquid against the inside surface of the drum and thence through said apertures, means for rotating said drum and moving said belt without relative translatory motions between them while said liquid is being projected through said apertures, and means for adjusting the tension of the foraminous belt to control the spacing between the drum and the belt during the time they are exposed to the action of said liquid as hereinafter set forth, said flexible foraminous belt and said hollow drum being arranged to divert some of the liquid that passes through said apertures in lateral direction with respect to its direction of flow through said apertures, and said flexible foraminous belt being yieldable under the influence of liquid flowing through said apertures to provide a zone between the said belt and the said drum for fiber rearrangement therein by said laterally diverted liquid.

60. A machine for forming a unitary fabric having holes therein from a web of fibrous starting material whose fibers are capable of movement within the web under the influence of applied fluid forces, which comprises a cylinder for containing fluid under pressure having an orifice extending in a substantially axial direction, a hollow drum presenting apertures in the drum surface spaced some in a longitudinal direction and others in a transverse direction, said drum being mounted for rotative movement about, and with its inner surface in contact with the outer surface of, said cylinder, a flexible foraminous belt arranged to pass around a portion of the periphery of said drum with a web of said material positioned between the drum and the belt, the apertures in said drum being larger than the openings in said belt, and means for moving said drum and said belt about the cylinder and past said orifice without relative translatory motion between them, whereby liquid is directed through the apertures in the drum as said apertures are moved in the way of said orifice during the rotative travel of the drum about the cylinder, said flexible foraminous belt and said hollow drum being arranged to divert some of the liquid that passes through said apertures in lateral direction with respect to its direction of flow through said apertures, and said flexible foraminous belt being yieldable under the influence of liquid flowing through said apertures to provide a zone between the said belt and the said drum for fiber rearrangement therein by said laterally diverted liquid.

61. A machine for rearranging the fibers in a unitary web of fibrous starting material whose individual fibers are capable of movement within the web under the influence of applied fluid forces, which comprises one member having a foraminous structure and a second member having a plurality of apertures of larger size than the foramina of the foraminous structure, said apertures being arranged in a pattern and adjacently spaced some in a longitudinal direction and some in a transverse direction, said members being disposed with surfaces presenting the foramina and the apertures, respectively, in close adjacency throughout a substantial area coextensive with an area of the apertured member having apertures spaced both in a longitudinal direction and in a transverse direction to provide therebetween a zone to support a web of starting material with the foraminous member immediately adjacent one side thereof and the apertured member immediately adjacent the other side thereof locally to maintain the integrity of the web throughout the area to be affected, and devices for causing fluid to pass into said zone through one of said members, through a web of starting material supported in said zone, and out of said zone through the other of said members, said fluid passing through said web in the form of fluid streams at a plurality of regions as determined by the arrangement and spacing of the apertures in said apertured member, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions without destroying the unitary nature of the fibrous structure.

62. A machine for rearranging the fibers in a unitary web of fibrous starting material whose individual fibers are capable of movement within the web under the influence of applied fluid forces, which comprises one member having a foraminous structure and a second member having a plurality of apertures of larger size than the foramina of the foraminous structure, said apertures being arranged in a pattern and adjacently spaced some in a longitudinal direction and some in a transverse direction, said members being disposed with surfaces presenting the foramina and the apertures, respectively, in close adjacency throughout a substantial area coextensive with an area of the apertured member having apertures spaced both in a longitudinal direction and in a transverse direction to provide therebetween a zone to support a web of starting material with the foraminous member immediately adjacent one side thereof and the apertured member immediately adjacent the other side thereof locally to maintain the integrity of the web throughout the area to be affected, and devices for causing fluid to pass into said zone through one of said members, through a web of starting material supported in said zone, and out of said zone through the other of said members, said fluid passing through said web in the form of fluid streams at a plurality of regions as determined by the arrangement and spacing of the apertures in said apertured member, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions without destroying the unitary nature of the fibrous structure, said devices for causing fluid to pass through the zone which accommodates the web of starting material including nozzle means for directing fluid toward and against that one of said members through which the fluid enters said zone.

63. A machine for rearranging the fibers in a unitary web of fibrous starting material whose individual fibers are capable of movement within the web under the influence of applied fluid forces, which comprises one member having a foraminous structure and a second member having a plurality of apertures of larger size than the foramina of the foraminous structure, said apertures being arranged in a pattern and adjacently spaced some in a longitudinal direction and some in transverse direction, said members being disposed with surfaces presenting the foramina and the apertures, respectively, in close adjacency throughout a substantial area to provide therebetween a zone to support a web of starting material locally to maintain its integrity throughout the area to be affected, and devices for causing fluid to pass into said zone through one of said members, through a web of starting material supported in said zone, and out of said zone through the other of said members, said fluid passing through said web in the form of fluid streams at a plurality of regions as determined by the arrangement and spacing of the apertures in said apertured member, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions without destroying the unitary nature of the fibrous structure, said devices for causing fluid to pass through the zone which accommodates the web of starting material including vacuum means located adjacent that one of said members through which the fluid leaves said zone to create a reduced pressure on the web in said zone to assist in the rearrangement of its fibers and in the removal of fluid therefrom.

64. A machine for rearranging the fibers in a unitary web of fibrous starting material whose individual fibers are capable of movement within the web under the influence of applied fluid forces, which comprises a pair of traveling members, said members having continuous surfaces and arranged with substantial areas of said surfaces in close adjacency and for travel in the same direction and at the same linear speed, means for effecting travel of said members, said members throughout their continuous surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said members throughout the region where their surfaces travel in close adjacency providing therebetween a zone coextensive with an area of the apertured member having apertures spaced both in a longitudinal direction and in a transverse direction to support a portion of a traveling web of starting material with the foraminous member immediately adjacent one side thereof and the apertured member immediately adjacent the other side thereof locally to maintain its integrity while undergoing fiber rearrangement, and devices for causing fluid to pass into said zone through one of said members, through that portion of the web of starting material supported in said zone, and out of said zone through the other of said members, said fluid passing through said web in the form of fluid streams at a plurality of regions as determined by the arrangement and spacing of the apertures in said apertured member, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions without destroying the unitary nature of the fibrous structure.

65. A machine for rearranging the fibers in a unitary web of fibrous starting material whose individual fibers are capable of movement within the web under the influence of applied fluid forces, which comprises a pair of members having continuous surfaces and arranged with substantial areas of said surfaces in close adjacency and for travel in the same direction and at the same linear speed, said members throughout their continuous surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said members throughout the region where their surfaces travel in close adjacency providing therebetween a zone coextensive with an area of the apertured member having apertures spaced both in a longitudinal direction and in a transverse direction to support a web of starting material with the foraminous member immediately adjacent one side thereof and the apertured member immediately adjacent the other side thereof locally to maintain its integrity while undergoing fiber rearrangement, devices for causing fluid to pass into said zone through one of said members, through a web of starting material supported in said zone, and out of said zone through the other of said members, said fluid passing through said web in the form of fluid streams at a plurality of regions as determined by the arrangement and spacing of the apertures in said apertured member, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions without destroying the unitary nature of the fibrous structure, and means for driving said members to move the web of starting material through the fiber rearranging zone.

66. A machine for rearranging the fibers in a unitary web of fibrous starting material whose individual fibers are capable of movement within the web under the influence of applied fluid forces, which comprises a pair of members having continuous surfaces and arranged with substantial areas of said surfaces in close adjacency and for travel in the same direction and at the same linear speed, said members throughout their continuous surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said members throughout the region where their surfaces travel in close adjacency providing therebetween a zone to support a web of starting material locally to maintain its integrity while undergoing fiber rearrangement, devices for causing fluid to pass into said zone through one of said members, through a web of starting material supported in said zone, and out of said zone through the other of said members, said fluid passing through said web in the form of fluid streams at a plurality of regions as determined by the arrangement and spacing of the apertures in said apertured member, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions without destroying the unitary nature of the fibrous structure, aid devices for causing fluid to pass through said zone including means for directing fluid toward and against that one of said members through which the fluid enters said zone and vacuum means located adjacent that one of said members through which the fluid leaves said zone to create a reduced pressure on the web in said zone to assist in the rearrangement of its fibers and in the removal of fluid therefrom, and means for driving said members to cause the web of starting material to travel through said fiber rearranging zone.

67. A machine for rearranging the fibers in a unitary web of fibrous starting material whose individual fibers are capable of movement within the web under the influence of applied fluid forces, which comprises one member having a foraminous structure and a second member having a plurality of apertures of larger size than the foramina of the foraminous structure, said apertures being arranged in a pattern and adjacently spaced some in a longitudinal direction and some in transverse direction, said members being disposed with surfaces presenting the foramina and the apertures, respectively, in close adjacency throughout a substantial area to provide therebetween a zone to support a web of starting material locally to maintain its integrity throughout the area to be affected, and devices for causing fluid to pass into said zone through the member having the foraminous structure, through a web of starting material supported in said zone, and out of said zone through the apertured member, said fluid passing through said web in the form of fluid streams at a plurality of regions as determined by the arrangement and spacing of the apertures in said apertured member, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web, some into closer proximity to form individual groups of fiber segments of increased parallelism defining spaced adjacent discontinuous regions in the web and some into groups of fibers packed together in the vicinity of said apertures and interconnecting said groups of fiber segments, without destroying the unitary nature of the fibrous structure.

68. A machine for rearranging the fibers in a unitary web of fibrous starting material whose individual fibers are capable of movement within the web under the influence of applied fluid forces, which comprises one member having a foraminous structure and a second member having a plurality of apertures of larger size than the foramina of the foraminous structure, said apertures being arranged in a pattern and adjacently spaced some in a longitudinal direction and some in a transverse direction, said members being disposed with surfaces presenting the foramina and the apertures, respectively, in close adjacency throughout a substantial area to provide therebetween a zone to support a web of starting material locally to maintain its integrity throughout the area to be affected, and devices for causing fluid to pass into said zone through the member having the foraminous structure, through a web of starting material supported in said zone, and out of said zone through the apertured member, said fluid passing through said web in the form of fluid streams at a plurality of regions as determined by the arrangement and spacing of the apertures in said apertured member, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web, some into closer proximity to form individual groups of fiber segments of increased parallelism defining spaced adjacent discontinuous regions in the web and some into groups of fibers packed together in the vicinity of said apertures and interconnecting said groups of fiber segments, without destroying the unitary nature of the fibrous structure, said devices for causing fluid to pass through the zone which accommodates the web of starting material including vacuum means located exteriorly of the zone and adjacent the apertured member to create reduced pressure on the web in said zone to assist in packing the fibers in the vicinity of said apertures.

69. A machine for rearranging the fibers in a unitary web of fibrous starting material whose individual fibers are capable of movement within the web under the influence of applied fluid forces, which comprises a rotatable drum member and a traveling flexible belt member, said members having continuous surfaces arranged with substantial areas of said surfaces in close adjacency and for travel in the same direction at the same linear speed, means for rotating said drum member and for effecting travel of said belt member, said members throughout their continuous surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said members throughout the region where their surfaces travel in close adjacency providing therebetween a zone to support a web of starting material locally to maintain its integrity while undergoing fibrous rearrangement, and devices for causing fluid to pass into said zone through the member having the foraminous structure, through a web of starting material supported in said zone, and out of said zone through the apertured member, said fluid passing through said web in the form of fluid streams at a plurality of regions as determined by the arrangement and spacing of the apertures in said apertured member, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web, some into closer proximity to form individual groups of fiber segments of increased parallelism defining spaced adjacent discontinuous regions in the web and some into groups of fibers packed together in the vicinity of said apertures and interconnecting said groups of fiber segments, without destroying the unitary nature of the fibrous structure, said devices for causing fluid to pass through the zone which accommodates the web of starting material including vacuum means located exteriorly of the zone and adjacent the apertured member to create reduced pressure on the web in said zone to assist in packing the fibers in the vicinity of said apertures.

70. A machine for rearranging the fibers in a unitary web of fibrous starting material whose individual fibers are capable of movement within the web under the influence of applied fluid forces, which comprises a pair of flexible endless belts with one flight of each disposed in close adjacency throughout a substantial area for travel in the same direction and at the same linear speed, said belts throughout their endless surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said belts throughout the region where their flights travel in close adjacency providing therebetween a zone coextensive with an area of the apertured belt having apertures spaced both in a longitudinal direction and in a transverse direction to support a web of starting material with the foraminous belt immediately adjacent one side thereof and the apertured belt immediately adjacent the other side thereof locally to maintain its integrity while undergoing fiber rearrangement, means for driving said belts to move said adjacent flights at the same linear speed as aforesaid, and devices for causing fluid to pass into said zone through one of said flights, through the web material supported in said zone, and out of said zone through the other of said flights, said fluid passing through said web in the form of fluid streams at a plurality of regions as determined by the arrangement and spacing of the apertures in said apertured belt, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions, without destroying the unitary nature of the fibrous structure.

71. A machine for rearranging the fibers in a unitary web of fibrous starting material whose individual fibers are capable of movement within the web under the influence of applied fluid forces, which comprises a pair of flexible endless belts with one flight of each disposed in close adjacency throughout a substantial area for travel in the same direction and at the same linear speed, said belts throughout their endless surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said belts throughout the region where their flights travel in close adjacency providing therebetween a zone coextensive with an area of the apertured belt having apertures spaced both in a longitudinal direction and a transverse direction to support a web of starting material with the foraminous belt immediately adjacent one side thereof and the apertured belt immediately adjacent the other side thereof locally to maintain its integrity while undergoing fiber rearrangement, means for driving said belts to move said flights at the same linear speed as aforesaid, and devices for causing fluid to pass into said zone through that one of said flights presenting the pattern of apertures, through the web material supported in said zone, and out of said zone through the other of said flights presenting the foraminous structure, said fluid passing through said web in the form of fluid streams at a plurality of regions as determined by the arrangement and spacing of the apertures in said apertured belt, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions, without destroying the unitary nature of the fibrous structure.

72. A machine for rearranging the fibers in a unitary web of fibrous starting material whose individual fibers are capable of movement within the web under the influence of applied fluid forces, which comprises a pair of flexible endless belts with one flight of each disposed in close adjacency throughout a substantial area for travel in the same direction and at the same linear speed, said belts throughout their endless surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said belts throughout the region where their flights travel in close adjacency providing therebetween a zone to support a web of starting material locally to maintain its integrity while undergoing fiber rearrangement, means for driving said belts to move said flights at the same linear speed as aforesaid, and devices for causing fluid to pass into said zone through that one of said flights presenting the foraminous structure, through the web material supported in said zone, and out of said zone through the other of said flights presenting the pattern of apertures, said fluid passing through said web in the form of fluid streams at a plurality of regions as determined by the arrangement and spacing of the apertures in said apertured belt, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions, without destroying the unitary nature of the fibrous structure.

73. A machine for rearranging the fibers in a unitary web of fibrous starting material whose individual fibers are capable of movement within the web under the influence of applied fluid forces, which comprises a pair of flexible endless belts with one flight of each disposed in close adjacency throughout a substantial area for travel in the same direction and at the same linear speed, said belts throughout their endless surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said members throughout the region where their flights travel in close adjacency providing therebetween a zone coextensive with an area of the apertured belt having apertures spaced both in a longitudinal direction and in a transverse direction to support a web of starting material with the foraminous belt immediately adjacent one side thereof and the apertured belt immediately adjacent the other side thereof locally to maintain its integrity while undergoing fiber rearrangement, means for driving said belts to move said flights at the same linear speed as aforesaid, and devices including a manifold having a plurality of jets associated therewith operable for causing fluid to pass into said zone through one of said flights, through the web material supported in said zone, and out of said zone through the other of said flights, said fluid passing through said web in the form of fluid streams at a plurality of regions as determined by the arrangement and spacing of the apertures in said apertured belt, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions, without destroying the unitary nature of the fibrous structure.

74. A machine for rearranging the fibers in a unitary web of fibrous starting material whose individual fibers are capable of movement within the web under the influence of applied fluid forces, which comprises a pair of flexible endless belts with one flight of each disposed in close adjacency throughout a substantial area for travel in the same direction and at the same linear speed, said belts throughout their endless surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said members throughout the region where their flights travel in close adjacency providing therebetween a zone to support a web of starting material locally to maintain its integrity while undergoing fiber rearrangement, means for driving said belts to move said flights at the same linear speed as aforesaid, and devices for causing fluid to pass into said zone through one of said flights, through the web material supported in said zone, and out of said zone through the other of said flights, said fluid passing through said web in the form of fluid streams at a plurality of regions as determined by the arrangement and spacing of the apertures in said apertured belt, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions, without destroying the unitary nature of the fibrous structure, said devices for causing fluid to pass through said zone including means for diverting fluid toward and against that one of said belts through which the fluid enters said zone and vacuum means located adjacent that one of said belts through which the fluid leaves said zone to create a reduced pressure on the web in said zone to assist in the rearrangement of its fibers and in the removal of fluid therefrom.

75. A machine for rearranging the fibers in a unitary web of fibrous starting material whose individual fibers are capable of movement within the web under the influence of applied fluid forces, which comprises a pair of flexible endless belts with one flight of each disposed in close adjacency throughout a substantial area for travel in the same direction and at the same linear speed, said belts throughout their endless surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said members throughout the region where their flights travel in close adjacency providing therebetween a zone to support a web of starting material locally to maintain its integrity while undergoing fiber rearrangement, means for driving said belts to move said flights at the same linear speed as aforesaid, and devices for causing fluid to pass into said zone through that one of said flights presenting the foraminous structure, through the web material supported in said zone and out of said zone, and through the other of said flights presenting the pattern of apertures, said fluid passing through said web in the form of fluid streams at a plurality of regions as determined by the arrangement and spacing of the apertures in said apertured belt, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions, without destroying the unitary nature of the fibrous structure, said devices for causing fluid to pass through the zone which accommodates the web of starting material including vacuum means located exteriorly of the zone and adjacent the apertured belt to create reduced pressure on the web in said zone to assist in rearranging the fibers and in packing the fibers in the vicinity of said apertures.

76. A machine for rearranging the fibers in a unitary web of fibrous starting material whose individual fibers are capable of movement within the web under the influence of applied fluid forces, which comprises a pair of flexible endless belts with one flight of each disposed in close adjacency throughout a substantial area for travel in the same direction and at the same linear speed, said belts throughout their endless surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said members throughout the region where their flights travel in close adjacency providing therebetween a zone to support a web of starting material locally to maintain its integrity while undergoing fiber rearrangement, a plurality of rotatable pulley drums for each of said belts and on which said belts are mounted for travel, means for driving one drum associated with each belt to move adjacent flights of the respective belts at the same linear speed as aforesaid, devices for causing fluid to pass into said zone through one of said flights, through the web material supported in said zone, and out of said zone through the other of said flights, said flights because of the flexibility and tension of the belts being adapted to yield relatively under the influence of the fluid passing therethrough to render said fiber rearranging zone adjustable in size, said fluid passing through said web in the form of fluid streams at a plurality of regions as determined by the arrangement and spacing of the apertures in said apertured belt, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions, without destroying the unitary nature of the fibrous structure, and means for relatively adjusting the axial positions of the drums on which each belt is mounted to vary the tension of the belts, thereby to adjust the size of the rearranging zone.

77. A machine for rearranging the fibers in a unitary web of fibrous starting material whose individual fibers are capable of movement within the web under the influence of applied fluid forces, which comprises a pair of flexible endless belts with one flight of each disposed in close adjacency throughout a substantial area for travel in the same direction and at the same linear speed, said belts throughout their endless surfaces presenting one, a foraminous structure, and the other, a plurality of apertures of larger size than the foramina of the foraminous structure, said apertures being arranged in a pattern and adjacently spaced some longitudinally of the direction of travel and some transversely of the direction of travel, said members throughout the region where their flights travel in close adjacency providing therebetween a zone to support a web of starting material locally to maintain its integrity while undergoing fiber rearrangement, means for driving said belts to move said flights at the same linear speed as aforesaid, and devices for causing fluid to pass into said zone through one of said flights, through the web material supported in said zone, and out of said zone through the other of said flights, said fluid passing through said web in the form of fluid streams at a plurality of regions as determined by the arrangement and spacing of the apertures in said apertured belt, to deflect adjacent portions of said fluid streams in opposed directions having components generally parallel with the plane of the web to exert, because of the adjacency of the deflected portions of said fluid streams, oppositely directed forces on individual groups of fibers of said web to move fibers of said groups out of their initial positions in the web and into closer proximity to form individual groups of fiber segments of increased parallelism defining spaced adjacent discontinuous regions, without destroying the unitary nature of the fibrous structure, and means responsive to lateral movement of each of said belts out of its normal path of linear travel automatically to return such belt back into its normal path of travel.

References Cited in the file of this patent

UNITED STATES PATENTS

| Number | Name | Date |
|---|---|---|
| 347,360 | Lorimer | Aug. 17, 1886 |
| 720,593 | Lindberg | Feb. 17, 1903 |
| 720,857 | Tourigny | Feb. 17, 1903 |
| 995,602 | Howes | June 20, 1911 |
| 1,989,435 | Wallquist | Jan. 29, 1935 |
| 2,080,635 | Schramek et al. | May 18, 1937 |
| 2,152,901 | Manning | Apr. 4, 1939 |
| 2,168,775 | Hurst et al. | Aug. 8, 1939 |
| 2,302,020 | Frederick | Nov. 17, 1942 |
| 2,351,039 | Hanson | June 13, 1944 |
| 2,416,390 | Hitt | Feb. 25, 1947 |
| 2,494,807 | Haeberlin | Jan. 17, 1950 |
| 2,528,793 | Secrist | Nov. 7, 1950 |
| 2,537,323 | Wurzburger | Jan. 9, 1951 |
| 2,705,688 | Ness et al. | Apr. 5, 1955 |
| 2,720,005 | Clark et al. | Oct. 11, 1955 |